United States Patent
Lang et al.

(10) Patent No.: US 10,954,256 B2
(45) Date of Patent: Mar. 23, 2021

(54) PROCESS FOR RECOVERING A MIXTURE COMPRISING A (THIO)PHOSPHORIC ACID DERIVATIVE

(71) Applicant: BASF SE, Ludwigshafen am Rhein (DE)

(72) Inventors: Tobias Lang, Dossenheim (DE); Karl-Heinrich Schneider, Kleinkarlbach (DE); Zoltan Baan, Maxdorf (DE); Philip Muelheims, Ludwigshafen (DE); Steffen Tschirschwitz, Mannheim (DE); Sascha Shuxia Zhu, Viernheim (DE)

(73) Assignee: BASF SE, Ludwigshafen am Rhein (DE)

( * ) Notice: Subject to any disclaimer, the term of this patent is extended or adjusted under 35 U.S.C. 154(b) by 226 days.

(21) Appl. No.: 15/763,651

(22) PCT Filed: Sep. 30, 2016

(86) PCT No.: PCT/EP2016/073517
§ 371 (c)(1),
(2) Date: Mar. 27, 2018

(87) PCT Pub. No.: WO2017/055610
PCT Pub. Date: Apr. 6, 2017

(65) Prior Publication Data
US 2018/0273557 A1    Sep. 27, 2018

(30) Foreign Application Priority Data
Oct. 1, 2015    (EP) ...................... 15187997

(51) Int. Cl.
*C07F 9/22*    (2006.01)
*C07F 9/24*    (2006.01)

(52) U.S. Cl.
CPC .............. *C07F 9/224* (2013.01); *C07F 9/222* (2013.01); *C07F 9/24* (2013.01); *C07F 9/242* (2013.01);
(Continued)

(58) Field of Classification Search
None
See application file for complete search history.

(56) References Cited

U.S. PATENT DOCUMENTS 3,084,190 A * 4/1963 Miller ...................... C07F 9/224
564/14
3,525,774 A    8/1970 Clarke
(Continued)

FOREIGN PATENT DOCUMENTS

DE    102005053541 A1    5/2007
EP        0119487 A1      9/1984
(Continued)

OTHER PUBLICATIONS

Pubchem entry for THF, downloaded from https://pubchem.ncbi.nlm.nih.gov/compound/Tetrahydrofuran#section=Boiling-Point&fullscreen=true on Jan. 8, 2020 (Year: 2020).*

(Continued)

*Primary Examiner* — Amy C Bonaparte
(74) *Attorney, Agent, or Firm* — Armstrong Teasdale LLP

(57) ABSTRACT

Provided herein is a use of a high-boiling solvent in a mixture comprising a (thio)phosphoric acid derivative and a process including the addition of a high-boiling solvent to a mixture comprising a (thio)phosphoric acid derivative to recover the (thio)phosphoric acid from the mixture by an evaporation process.

6 Claims, 2 Drawing Sheets

(52) U.S. Cl.
CPC .......... *C07F 9/2458* (2013.01); *C07F 9/2466* (2013.01); *C07F 9/2475* (2013.01)

(56) References Cited

U.S. PATENT DOCUMENTS

| | | |
|---|---|---|
| 4,159,289 A | 6/1979 | Anderson et al. |
| 4,530,714 A | 7/1985 | Kolc et al. |
| 5,188,736 A | 2/1993 | Pen et al. |
| 5,770,771 A | 6/1998 | Sulzer et al. |
| 5,955,630 A | 9/1999 | Cheng et al. |
| 8,513,460 B2 | 8/2013 | Kysilka et al. |
| 2008/0287709 A1* | 11/2008 | Huttenloch ............. C07F 9/224 564/14 |
| 2012/0218575 A1 | 8/2012 | Paxton et al. |

FOREIGN PATENT DOCUMENTS

| | | |
|---|---|---|
| EP | 2204372 A1 | 7/2010 |
| WO | 9831693 A1 | 7/1998 |
| WO | 2007054392 A1 | 5/2007 |
| WO | 2008000196 A1 | 1/2008 |
| WO | 2009121786 A1 | 10/2009 |
| WO | 2015001391 A1 | 1/2015 |

OTHER PUBLICATIONS

Pubchem entry for ammonia, downloaded from https://pubchem.ncbi.nlm.nih.gov/compound/222#section=Boiling-Point&fullscreen=true on Jan. 8, 2020 (Year: 2020).*
Merriam Webster definition for "derivative" (noun), downloaded from https://www.merriam-webster.com/dictionary/derivative on Mar. 10, 2020 (Year: 2020).*
P-xylene boiling point (approx. 138 C), downloaded from https://pubchem.ncbi.nlm.nih.gov/compound/7809#section=Boiling-Point&fullscreen=true on Mar. 11, 2020 (Year: 2020).*
M-xylene boiling point (approx. 139 C), downloaded form https://pubchem.ncbi.nlm.nih.gov/compound/7929#section=Boiling-Point&fullscreen=true on Mar. 11, 2020 (Year: 2020).*
O-xylene boiling point (approx. 144 C), downloaded from https://pubchem.ncbi.nlm.nih.gov/compound/7237#section=Boiling-Point&fullscreen=true on Mar. 11, 2020 (Year: 2020).*
Dimethylamine boiling point, downloaded from https://pubchem.ncbi.nlm.nih.gov/compound/Dimethylamine#section=Boiling-Point&fullscreen=true on Mar. 11, 2020 (Year: 2020).*
Definition of "solvent" as provided by Merriam-Webster, downloaded from https://www.merriam-webster.com/dictionary/solvent on Mar. 12, 2020 (Year: 2020).*
Tetrahydrofuran, downloaded from https://pubchem.ncbi.nlm.nih.gov/compound/Tetrahydrofuran#section=Boiling-Point&fullscreen=true on Mar. 12, 2020 (Year: 2020).*
Ammonia, downloaded from https://pubchem.ncbi.nlm.nih.gov/compound/222#section=Boiling-Point&fullscreen=true on Mar. 12, 2020 (Year: 2020).*
Wiped Film Distillation Equipment, downloaded from https://www.popeinc.com/still-products/wiped-film-stills-evaporators/ on Mar. 12, 2020 (Year: 2020).*
"Ullmanns Enzyklopadie der Technischen Chemie", vol. 8, 1974, pp. 212-213.
Chem. Eng., vol. 72, 1965, pp. 175-190.
Chemical Engineering Progress, Dec. 1989 (Dec. 1, 1989), pp. 12-15.
Goehring, M.; Niedenzu, K., Chemische Berichte, vol. 89, No. 7, 1956, pp. 1768-1771.
Kiss, S.; Simihaian, M.: "Improving Efficiency of Urea Fertilizers by Inhibition of Soil Urease Activity", 2002, Kluwer Academic Publishers pp. 1-4, 142-155.
Rompps: "Chemie Lexikon", 1992, pp. 3532-3533.
International Search Report and Written Opinion for International Application No. PCT/EP2016/073517, dated Jan. 17, 2017, 13 pages.
Communication pursuant to Article 94(3) EPC for corresponding EP Patent Application No. 16782198.2, dated May 18, 2020, 11 pages.

* cited by examiner

PROCESS FOR RECOVERING A MIXTURE COMPRISING A (THIO)PHOSPHORIC ACID DERIVATIVE

CROSS-REFERENCE TO RELATED APPLICATIONS

This application is the national stage entry of PCT/EP2016/073517, filed on Sep. 30, 2016, which claims the benefit of priority to European Patent Application No. 15187997.0, filed Oct. 1, 2015, which is incorporated by reference in its entirety herein.

FIELD OF THE INVENTION

The present invention relates to the use of at least one high-boiling solvent in a mixture comprising at least one (thio)phosphoric acid derivative and at least one volatile component for preventing decomposition or solids formation of the at least one (thio)phosphoric acid derivative in an evaporation process, wherein in said evaporation process the at least one (thio)phosphoric acid derivative is separated from the at least one volatile component and recovered as the bottom product in the form of a mixture (1) comprising as components (1a) the at least one (thio)phosphoric acid derivative; and
(1b) the at least one high-boiling solvent.

The present invention further relates to a process for recovering at least one (thio)phosphoric acid derivative from a mixture comprising the at least one (thio)phosphoric acid derivative, at least one solvent and optionally at least one HCl scavenger, wherein the process comprises adding at least one high-boiling solvent to the mixture so as to form a mixture (2) comprising as components (2a) at least one (thio)phosphoric acid derivative;
(2b) at least one high-boiling solvent;
(2c) at least one solvent having a boiling point, which is at least 30° C. lower than the boiling point of the at least one high-boiling solvent; and
(2d) optionally at least one HCl scavenger having a boiling point, which is at least 30° C. lower than the boiling point of the at least one high-boiling solvent;
and separating a mixture (1) from said mixture (2), wherein said mixture (1) comprises as components
(1a) the at least one (thio)phosphoric acid derivative; and
(1b) the at least one high-boiling solvent;
by evaporating components (2c) and (2d) of mixture (2) and collecting mixture (1) as the bottom product.

The present invention further relates to a mixture (2) comprising components (2a), (2b), (2c), and (2d).

Worldwide there is an increasing need for urease inhibitors and convenient and cost-effective large-scale processes for preparing them.

Urease inhibitors are used in combination with urea-based fertilizers to inhibit the hydrolysis of urea by the enzyme urease, which is present ubiquitously in the soil, thereby preventing a loss of nitrogen from the fertilizer due to the formation of gaseous ammonia (for a general review see Kiss, S.; Simihăian, M. (2002) Improving Efficiency of Urea Fertilizers by Inhibition of Soil Urease activity, ISBN 1-4020-0493-1, Kluwer Academic Publishers, Dordrecht, The Netherlands).

(Thio)phosphoric acid derivatives such as (thio)phosphoric acid triamides and (thio)phosphoric acid ester amides are known to be effective urease inhibitors for use in combination with urea-based fertilizers. N-hydrocarbylthiophosphoric acid triamides and N-hydrocarbylphosphoric acid triamides for use as urease inhibitors are, e.g., described in U.S. Pat. No. 4,530,714. Among the most potent known urease inhibitors are N-alkylthiophosphoric acid triamides and N-alkylphosphoric acid triamides, which are described in EP 0 119 487, for example. Additionally, mixtures of N-(n-butyl)thiophosphoric acid triamide (NBPT) and N-(n-propyl)thiophosphoric acid triamide (NPPT) can advantageously be used. Such mixtures are described in US 2012/218575 A1.

Known processes for preparing N-hydrocarbyl(thio)phosphoric acid triamides involve a two-step procedure, in which an N-hydrocarbylamino(thio)phosphoryl dichloride (e.g. $R^1R^2NP(=O)Cl_2$ or $R^1R^2NP(=S)Cl_2$) is formed in a first reaction by reacting (thio)phosphoryl trichloride with an amine, and in which, in a second reaction, the N-hydrocarbylamino(thio)phosphoryl dichloride is reacted with ammonia to produce a slurry, from which the co-product ammonium chloride is removed by aqueous extraction after removing the ammonia under reduced pressure, or by filtration after removing the ammonia under reduced pressure and dissolving the product (e.g. $R^1R^2NP(=O)(NH_3)_2$ or $R^1R^2NP(=S)(NH_3)_2$) through increasing the temperature, or by separating a phase rich in ammonia and ammonium chloride from the organic product phase under pressure being high enough to keep the ammonia liquid. The reactions of the procedure may be summarized as follows.

Preparation of N-Hydrocarbylphosphoric Acid Triamides:

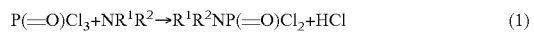

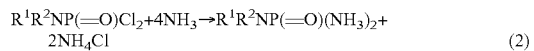

Preparation of N-Hydrocarbylthiophosphoric Acid Triamides:

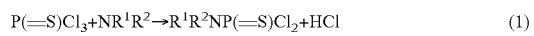

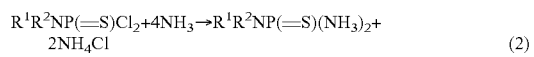

$R^1$ and $R^2$ are defined below. A skilled person will understand that in the second reaction, also amines different from ammonia can be used. However, amide formation with ammonia is preferred for most (thio)phosphoric acid triamides, which are used as urease inhibitors.

Known processes for preparing O-hydrocarbyl(thio)phosphoric acid ester diamides involve a two-step procedure, in which an O-hydrocarbyloxy(thio)phosphoryl dichloride (e.g. $R^7OP(=O)Cl_2$ or $R^7OP(=S)Cl_2$) is formed in a first reaction by reacting (thio)phosphoryl trichloride with an alcohol, and in which, in a second reaction, the O-hydrocarbyloxy(thio)phosphoryl dichloride is reacted with ammonia to produce a slurry, from which the co-product ammonium chloride is removed by aqueous extraction after removing the ammonia under reduced pressure, or by filtration after removing the ammonia under reduced pressure and dissolving the product (e.g. $R^1R^2NP(=O)(NH_3)_2$ or $R^1R^2NP(=S)(NH_3)_2$) through increasing the temperature, or by separating a phase rich in ammonia and ammonium chloride from the organic product phase under pressure being high enough to keep the ammonia liquid. The reactions of the procedure may be summarized as follows.

Preparation of O-Hydrocarbylphosphoric Acid Ester Diamides:

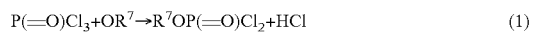

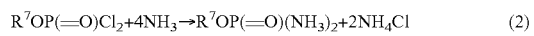

Preparation of O-Hydrocarbylthiophosphoric Acid Ester Diamides:

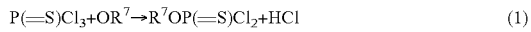  (1)

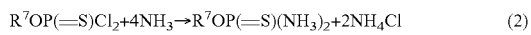  (2)

$R^7$ is defined below. A skilled person will understand that in the second reaction, also amines different from ammonia can be used. However, amide formation with ammonia is preferred for most (thio)phosphoric acid ester amides, which are used as urease inhibitors. A skilled person will also understand that the above procedure may be modified as such that (thio)phosphoric acid diester amides (e.g. $(R^7O)_2P(=O)NH_3$ or $(R^7O)_2P(=S)NH_3$) can be prepared.

The batchwise preparation of N-hydrocarbyl(thio)phosphoric acid triamides and O-hydrocarbyl(thio)phosphoric acid ester amides, respectively, involving the above described first and second reactions are, e.g., described in Goehring, M.; Niedenzu, K.; Chemische Berichte 89, Nr. 7, pp. 1768-1771 (1956), and in U.S. Pat. No. 4,530,714 A.

The first reaction typically requires the presence of an organic solvent and optionally an HCl scavenger, which is preferably a tertiary amine. Both, the organic solvent and the optionally present HCl scavenger typically have to be removed later on. Also for the second reaction, an organic solvent may be added, while an HCl scavenger is typically not required, as ammonia may function not only as the reactant, but also as HCl scavenger, if applied in sufficient amounts. After the ammonium chloride has been separated from the desired product as indicated above, the organic solvent and typically also the HCl scavenger, which is preferably used in the first reaction, have to be removed. An isolation/purification step is therefore principally required after both, the first and the second reaction, but it is preferred to perform such an isolation/purification step only after the second reaction. This is particularly advantageous for large scale processes because the crude product of the first reaction can directly be converted into the desired product of the second reaction. In addition, solvent removal is only required once, and the same solvent as used in the first reaction may also be used for the second reaction, which saves time and costs.

Processes for the preparation of (thio)phosphoric acid derivatives comprising the above described two reaction steps are, e.g., described in U.S. Pat. No. 5,770,771 A and DE 10 2005 053 541 A1. In addition, reference is made to WO 2009/121786 describing an optimized process for the preparation of (thio)phosphoric acid triamides.

However, the recovery of the desired (thio)phosphoric acid derivative from the product mixture, which is obtained by these batch-wise or continuous processes and which typically comprises the product, an organic solvent, and a tertiary amine as HCl scavenger, poses certain problems, as it is difficult to separate the desired product at minimum losses from the organic solvent and the tertiary amine.

U.S. Pat. No. 8,513,460 B1 discloses a process of recovering an N-hydrocarbyl(thio)phosphoric acid triamide from a reaction mixture by a precipitation step. However, methods of recovering (thio)phosphoric acid triamides and (thio)phosphoric acid ester amides from reaction mixtures by crystallization and freeze drying are expensive to perform and involve troublesome solids processing as well as product losses through the mother liquors.

It is therefore generally desired to recover the (thio)phosphoric acid triamides or (thio)phosphoric acid ester amides by distilling off the organic solvents and the optionally present tertiary amines. However, (thio)phosphoric acid triamides and (thio)phosphoric acid ester amides are unfortunately relatively unstable when subjected to elevated temperatures. Consequently, when recovering these compounds as reaction products from mixtures with organic solvents and tertiary amines, using various conventional distillation procedures to distill off the organic solvent(s) and HCl scavenger(s), the (thio)phosphoric acid triamides or (thio)phosphoric acid ester amides, which are obtained as bottom products, tend to undergo an undesirable degree of thermal degradation. Not only is this a waste of the desired product, but the formation of thermally degraded species in the product also reduces its purity and sales appeal.

Nevertheless, based on the concept of distillation, processes for recovering (thio)phosphoric acid triamides and (thio)phosphoric acid ester amides have been described in the art. According to EP 2 204 372 B1, the organic solvent may be removed to a high extend from a mixture comprising a thiophosphoric acid amide, an organic solvent, and an HCl scavenger by means of distillation. U.S. Pat. No. 5,770,771 A1 discloses a process, wherein ammonia and parts of the organic solvent are removed from a mixture comprising an N-hydrocarbylthiophosphoric acid triamide, an organic solvent, an HCl scavenger, and ammonia. Further purification may be achieved by distillation, flash distillation, or other separation techniques including the use of a wiped film evaporator. Furthermore, it is described in U.S. Pat. No. 5,955,630 that N-hydrocarbyl(thio)phosphoric acid triamides, such as N-(n-butyl)thiophosphoric acid triamide (NBPT), can be isolated from mixtures with organic solvents and tertiary amines by using a wiped film evaporator. According to U.S. Pat. No. 5,955,630, the N-hydrocarbyl(thio)phosphoric acid triamide can be recovered by introducing a liquid mixture comprising the N-hydrocarbyl(thio)phosphoric acid triamide, the organic solvent, and optionally the tertiary amine into a wiped film evaporator operating at a temperature in the range of about 60 to 140° C., and at a pressure that avoids solids formation on the heating surface of the wiped film evaporator, and continuously collecting the purified N-hydrocarbyl(thio)phosphoric acid triamide so formed.

However, it has been found that at least in case of certain (thio)phosphoric acid derivatives, such as N-(n-propyl)thiophosphoric acid triamide (NPPT), already temperatures around the melting point of the compounds, in particular temperatures of about 100° C. or more or about 110° C. or more, cause significant decomposition of (thio)phosphoric acid derivatives, if the residence time within a thin film evaporator is about 30 seconds to 1 minute or about 1 minute or more, e.g. 2 minutes. In this connection, "significant decomposition" means that more than 1 mol %/min, preferably more than 2 mol %/min, more preferably more than 5 mol %/min, most preferably more than 10 mol %/min of the product decompose. On the other hand "no significant decomposition" means that less than 10 mol %/min, preferably less than 5 mol %/min, more preferably less than 2 mol %/min, most preferably less than 1 mol %/min of the product decompose.

In this connection, it has been found that it is a major drawback that, if (thio)phosphoric acid derivatives with rather high melting points of at least 60° C., preferably at least 80° C., more preferably at least 85° C., such as N-(n-propyl)thiophosphoric acid triamide (NPPT), are to be purified by the process as described in U.S. Pat. No. 5,955,630, it is in any case required to apply rather high temperatures for the wiped film evaporation so as to ensure that the (thio)phosphoric acid derivatives are present in the form of a melt because otherwise solids formation on the heating surface of the wiped film evaporator occurs. However, as indicated above, such high temperatures enhance the risk of significant decomposition.

As a consequence, in particular temperature sensitive and/or high melting (thio)phosphoric acid derivatives will significantly decompose during the recovery process according to U.S. Pat. No. 5,955,630, which is not only a problem in terms of a loss of the yield and the appearance of the desired product as indicated above, but also in view of the fact that $H_2S$ may be released and decomposition products are formed on the heating surface of the wiped film evaporator resulting in an unsteady and ineffective operation of the wiped film evaporator.

DESCRIPTION

Figure 1:
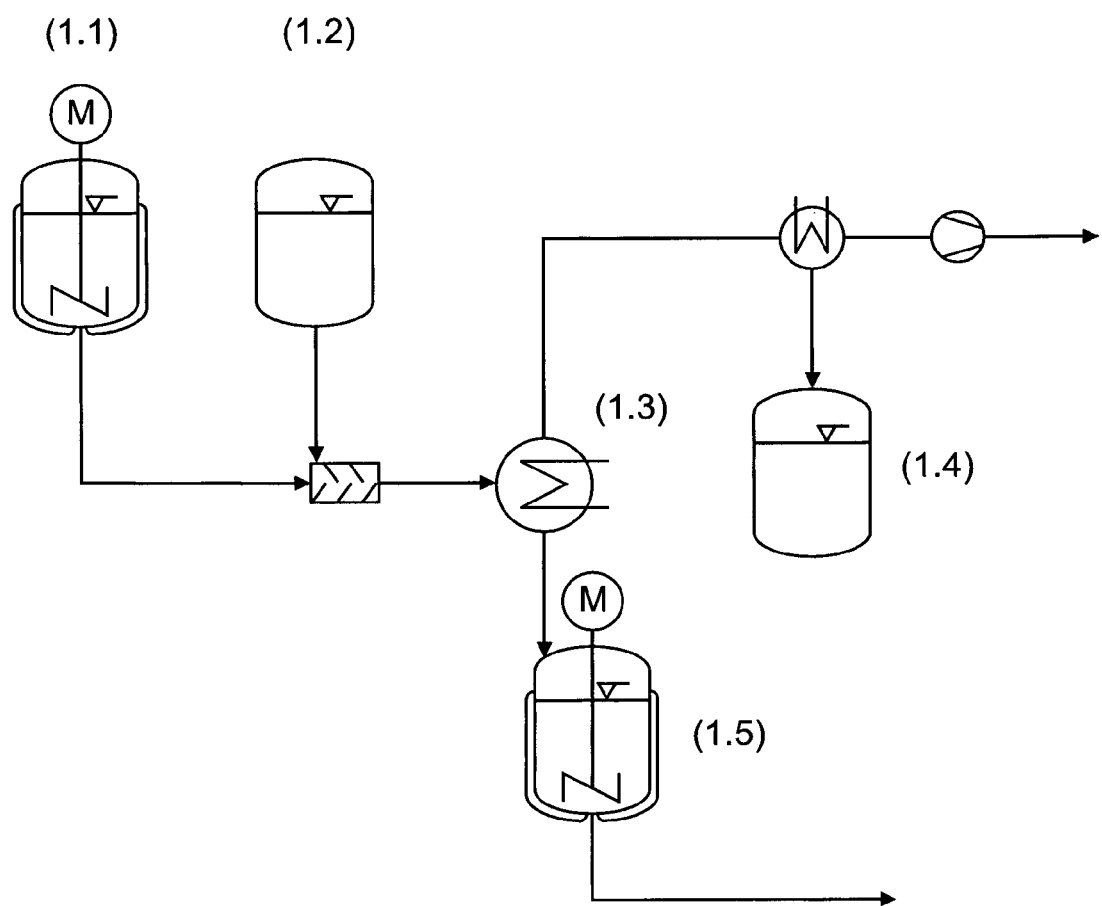
FIG. 1 is a schematic of an exemplary process for obtaining mixtures.

It was therefore an object of the present invention to provide a process for recovering (thio)phosphoric acid derivatives from mixtures comprising said (thio)phosphoric acid derivatives, a solvent, and optionally an HCl scavenger, which overcomes the disadvantages of the prior art.

In particular, it was an object of the present invention to provide a process for recovering (thio)phosphoric acid derivatives from mixtures comprising said (thio)phosphoric acid derivatives, a solvent, and optionally an HCl scavenger, which is suitable for temperature-sensitive (thio)phosphoric acid derivatives. Furthermore, it was an object of the present invention to provide a process for recovering (thio)phosphoric acid derivatives from mixtures comprising said (thio) phosphoric acid derivatives, a solvent, and optionally an HCl scavenger, which is not only suitable for low-melting (thio)phosphoric acid derivatives with a melting point in the range of from 40° C. to below 60° C., but which is also particularly suitable for the recovery of high-melting (thio) phosphoric acid derivatives with a melting point of at least 60° C., preferably at least 80° C., more preferably at least 85° C.

It has surprisingly been found by the inventors of the present invention, that the above objects can be achieved by adding a high-boiling solvent to the mixture comprising the (thio)phosphoric acid derivative, the solvent, and optionally the HCl scavenger.

Due to the addition of the high-boiling solvent, the solvent and optionally the HCl scavenger can much more effectively and gently be removed from the mixture.

In the recovery process according to the present invention, an evaporation step is performed, wherein preferably a stream of said mixture is introduced into at least one thin film evaporator, and the high-boiling solvent advantageously dissolves the (thio)phosphoric acid derivative under the conditions of thin film evaporation, so that solids formation on the heating surface can be avoided at operating temperatures, which are suitable for avoiding significant decomposition of the (thio)phosphoric acid derivative, and which are preferably below 110° C., more preferably below 100° C., most preferably below 85° C. Solids formation on the heating surface can be avoided, not only in the case of (thio)phosphoric acid derivatives with a melting point of at least 40° C. or at least 50° C., but also in the case of (thio)phosphoric acid derivatives with a melting point of, e.g., at least 60° C., preferably at least 80° C., more preferably at least 85° C., as the operating temperature may be selected such that it is only slightly above or even below the melting point, which is possible due to the presence of the at least one high-boiling solvent. As the recovery process of the invention may therefore be performed at lower temperatures compared to the process according to U.S. Pat. No. 5,955,630, significant decomposition at typical residence times in the thin film evaporator of for example about 30 seconds to 1 minute or about 1 minute to 3 minutes can be avoided.

In connection with the residence times in the thin film evaporator, it is another advantage of the present invention that by increasing the volume flow of the stream, which is introduced into the thin film evaporator, by adding the high-boiling solvent, also shorter residence times within the thin film evaporator can be realized. A shorter residence time also reduces the risk of decomposition of the desired product.

In addition, thin film evaporation according to the present invention is improved by the addition of the high-boiling solvent, as a more uniform film can formed within the thin film evaporator.

The above mentioned advantages in connection with the addition of the at least one high-boiling solvent may also apply to other evaporator types.

Another advantage resulting from the addition of the high-boiling solvent is based on the fact that the mixture comprising the (thio)phosphoric acid derivative, the solvent, and optionally the HCl scavenger will have a reduced viscosity once the high-boiling solvent is added. This effect generally allows for the use of various evaporator types for removing the solvent and optionally the HCl scavenger, so that the invention is not limited to the use of a thin film evaporator.

In the bottom product, which is collected after evaporation, not only the (thio)phosphoric acid derivative, but also the added high-boiling solvent remains, which is another advantage of the present invention, because the high-boiling solvent will also be present in the formulation of the (thio)phosphoric acid derivative. Accordingly, the purified product may be obtained in dissolved or dispersed form after evaporation. Preferably, the purified product is homogeneously dissolved in the high-boiling solvent. However, the purified product may also at least partly precipitate from the mixture. In any case, the purified product is obtained in a form that is suitable for handling or storage or for being combined with further formulation auxiliaries to provide a suitable formulation of the product for treating urea-based fertilizers.

Accordingly, the high-boiling solvent is used as a bifunctional solvent in the process of the invention, namely for avoiding product degradation and solids formation during the evaporation process, and for providing the purified (thio)phosphoric acid derivative in pre-formulated form. It is of particular advantage, if the high-boiling solvent satisfies certain needs of the formulation, for example acts as an additive selected from stabilizers, low-temperature stabilizers, solvents, and fragrances.

The high-boiling solvent may also advantageously be used as a trifunctional solvent, if it is added to the reaction mixture earlier in the process, preferably in the first reaction, wherein (thio)phosphoric trichloride is reacted with an amine or an alcohol. It may then function as a co-solvent for this reaction by improving the solubility of the resulting N-hydrocarbylamino(thio)phosphoryl dichloride (e.g. $R^1R^2NP(=O)(NH_3)_2$ or $R^1R^2NP(=S)(NH_3)_2$) or O-hydrocarbyloxy(thio)phosphoryl dichloride (e.g. $R^7OP(=O)(NH_3)_2$ or $R^7OP(=S)(NH_3)_2$), or it may function as an HCl scavenger, if it contains a basic group. For this purpose, it is required, however, that the high-boiling solvent is not protic, and in particular does not comprise an alcohol or a primary or secondary amino group. If the high-boiling solvent is used as an HCl scavenger, it is another important advantage of the invention that it is not required to remove the HCl scavenger later on, as the high-boiling solvent will also be present in the formulation of the (thio)phosphoric acid derivative, and therefore does not have to be removed.

The present invention therefore relates to the use of at least one high-boiling solvent in a mixture comprising at least one (thio)phosphoric acid derivative and at least one volatile component for preventing decomposition or solids formation of the at least one (thio)phosphoric acid derivative in an evaporation process, wherein in said evaporation process the at least one (thio)phosphoric acid derivative is separated from the at least one volatile component and recovered as the bottom product in the form of a mixture (1) comprising as components (1a) the at least one (thio)phosphoric acid derivative; and
(1b) the at least one high-boiling solvent.

As explained in further detail below, the at least one volatile component comprises at least one solvent having a boiling point, which is at least 30° C. lower than the boiling point of the at least one high-boiling solvent, and optionally at least one HCl scavenger having a boiling point, which is at least 30° C. lower than the boiling point of the at least one high-boiling solvent.

Thus, in a preferred embodiment of the above defined use, by adding the at least one high-boiling solvent to a mixture comprising at least one (thio)phosphoric acid derivative and at least one volatile component, a mixture (2) is formed, which comprises (2a) at least one (thio)phosphoric acid derivative;
(2b) at least one high-boiling solvent;
(2c) at least one solvent having a boiling point, which is at least 30° C. lower than the boiling point of the at least one high-boiling solvent; and
(2d) optionally at least one HCl scavenger having a boiling point, which is at least 30° C. lower than the boiling point of the at least one high-boiling solvent.

From this mixture, the mixture (1) may then be separated without decomposition of the at least one (thio)phosphoric acid derivative in an evaporation process. Furthermore, solids formation of the (thio)phosphoric acid derivative in the evaporator, especially on the heating surface of the evaporator, can be prevented.

In said evaporation process, the evaporator is preferably operated at a temperature in the range of from 50° C. to 110° C. and at a pressure of from 5 mbar to 250 mbar (0.5 kPa to 25 kPa). It is particularly surprising that rather high temperatures of from 50° C. to 105° C. or from 60° C. to 100° C. may be applied without decomposition of the at least one (thio)phosphoric acid derivative. Especially preferred in terms of optimizing the required pressure are temperatures in the range of from 80° C. to 100° C.

As used herein, the term "decomposition" preferably refers to "significant decomposition" as defined above.

In a preferred embodiment of the above defined use, the at least one high-boiling solvent is further used as a formulation agent for the at least one (thio)phosphoric acid derivative in the recovered mixture (1).

Preferably, the (thio)phosphoric acid derivative is homogeneously dissolved in the high-boiling solvent. However, the (thio)phosphoric acid derivative may also at least partly precipitate from the mixture (1). In any case, the (thio) phosphoric acid derivative is obtained in a form that is suitable for handling or storage or for being combined with further formulation auxiliaries to provide a suitable formulation of the product for treating urea-based fertilizers.

In line with the above use, the present invention also relates to a process for recovering at least one (thio)phosphoric acid derivative from a mixture comprising the at least one (thio)phosphoric acid derivative, at least one solvent and optionally at least one HCl scavenger, wherein the process comprises adding at least one high-boiling solvent to the mixture so as to form a mixture (2) comprising as components (2a) at least one (thio)phosphoric acid derivative;
(2b) at least one high-boiling solvent;
(2c) at least one solvent having a boiling point, which is at least 30° C. lower than the boiling point of the at least one high-boiling solvent; and
(2d) optionally at least one HCl scavenger having a boiling point, which is at least 30° C. lower than the boiling point of the at least one high-boiling solvent;

and separating a mixture (1) from said mixture (2), wherein said mixture (1) comprises as components (1a) the at least one (thio)phosphoric acid derivative; and
(1b) the at least one high-boiling solvent;

by evaporating components (2c) and (2d) of mixture (2) and collecting mixture (1) as the bottom product.

As used in the context of the above process, "recovering at least one (thio)phosphoric acid derivative" means recovering the at least one (thio)phosphoric acid derivative together with up to 20 wt.-% of impurities, primarily phosphorus containing byproducts. As the mixture (1) is collected as the bottom product of the evaporation step, only volatile components, such as components (2c) and (2d) of mixture (2), can be removed. However, to the extent that phosphorus containing byproducts have been obtained in the preparation of the (thio)phosphoric acid derivative and have not been separated otherwise, they will be recovered together with the (thio)phosphoric acid derivative in the process of the invention, as they are typically non-volatile. It is preferred, however, that the amount of byproducts is as low as possible, i.e. that component (1a) of mixture (1) comprises the at least one (thio)phosphoric acid derivative in an amount of at least 80 wt.-%.

In the evaporation step, the evaporator is preferably operated at a temperature in the range of from 50° C. to 110° C. and at a pressure of from 5 mbar to 250 mbar (0.5 kPa to 25 kPa).

In a preferred embodiment of the process, evaporating components (2c) and (2d) of mixture (2) and collecting mixture (1) as the bottom product is performed by:

(i) continuously introducing a stream of the mixture (2) into at least one thin film evaporator operating at a temperature of from 40° C. to 160° C. and at a pressure of from 5 mbar to 300 mbar (0.5 kPa to 30 kPa), and (ii) continuously collecting the bottom product, wherein preferably the at least one thin film evaporator is operated at a temperature in the range of from 50° C. to 110° C. and at a pressure of from 5 mbar to 250 mbar (0.5 kPa to 25 kPa).

It is particularly surprising that rather high temperatures of from 50° C. to 105° C. or from 60° C. to 100° C. may be applied without decomposition of the at least one (thio) phosphoric acid derivative. Especially preferred in terms of optimizing the required pressure are temperatures in the range of from 80° C. to 100° C.

In another embodiment, the present invention relates to a process for separating or recovering a mixture (1) comprising as components (1a) a product comprising at least one (thio)phosphoric acid derivative, which is selected from (i) (thio)phosphoric acid triamides according to general formula (I)

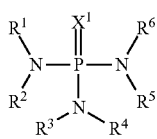

wherein
X$^1$ is O or S;
R$^1$ is C$_1$-C$_{20}$-alkyl, C$_3$-C$_{20}$-cycloalkyl, C$_6$-C$_{20}$-aryl, C$_6$-C$_{20}$-aryl-C$_1$-C$_4$-alkyl, or C$_1$-C$_6$-(di)alkylaminocarbonyl;
R$^2$ is H, C$_1$-C$_{20}$-alkyl, C$_3$-C$_{20}$-cycloalkyl, C$_6$-C$_{20}$-aryl, C$_6$-C$_{20}$-aryl-C$_1$-C$_4$-alkyl, or C$_1$-C$_6$-(di)alkylaminocarbonyl; or
R$^1$ and R$^2$ together with the nitrogen atom linking them define a 5- or 6-membered saturated or unsaturated heterocyclic radical, which optionally comprises 1 or 2 further heteroatoms selected from the group consisting of N, O, and S; and
R$^3$, R$^4$, R$^5$, and R$^6$ are independently of each other selected from the group consisting of H and C$_1$-C$_4$-alkyl;
and
(ii) (thio)phosphoric acid ester amides according to any one of general formula (IIa)

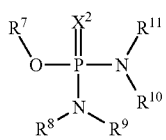

wherein
X$^2$ is O or S;
R$^7$ is C$_1$-C$_{20}$-alkyl, C$_3$-C$_{20}$-cycloalkyl, C$_6$-C$_{20}$-aryl, C$_6$-C$_{20}$-aryl-C$_1$-C$_4$-alkyl, or C$_1$-C$_6$-(di)alkylaminocarbonyl; and
R$^8$, R$^9$, R$^{10}$, and R$^{11}$ are independently of each other selected from the group consisting of H and C$_1$-C$_4$-alkyl;
or general formula (IIb)

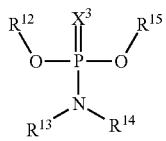

wherein
X$^3$ is O or S;
R$^{12}$ is C$_1$-C$_{20}$-alkyl, C$_3$-C$_{20}$-cycloalkyl, C$_6$-C$_{20}$-aryl, C$_6$-C$_{20}$-aryl-C$_1$-C$_4$-alkyl, or C$_1$-C$_6$-(di)alkylaminocarbonyl;
R$^{15}$ is C$_1$-C$_{20}$-alkyl, C$_3$-C$_{20}$-cycloalkyl, C$_6$-C$_{20}$-aryl, C$_6$-C$_{20}$-aryl-C$_1$-C$_4$-alkyl, or C$_1$-C$_6$-(di)alkylaminocarbonyl; and
R$^{13}$ and R$^{14}$ are independently of each other selected from the group consisting of H and C$_1$-C$_4$-alkyl;
and
(1b) at least one high-boiling solvent;
from a mixture (2) comprising as components
(2a) component (1a) of mixture (1);
(2b) component (1b) of mixture (1);
(2c) at least one solvent having a boiling point, which is at least 30° C. lower than the boiling point of the at least one high-boiling solvent of component (1b) of mixture (1); and
(2d) optionally at least one HCl scavenger having a boiling point, which is at least 30° C. lower than the boiling point of the at least one high-boiling solvent of component (1b) of mixture (1);
wherein the process comprises evaporating components (2c) and (2d) of mixture (2) and collecting mixture (1) as the bottom product.

In one preferred embodiment, the process comprising evaporating components (2c) and (2d) of mixture (2) and collecting mixture (1) as the bottom product is performed by:
(i) continuously introducing a stream of the mixture (2) into at least one thin film evaporator operating at a temperature of from 40° C. to 160° C. and at a pressure of from 5 mbar to 300 mbar (0.5 kPa to 30 kPa), and
(ii) continuously collecting the bottom product.

The term "at least one" as used throughout herein above and below means one or more, preferably one or two, and thus typically refers individual compounds or mixtures/combinations.

Further embodiments of the present invention can be found in the claims, the description and the examples. Preferred embodiments of the use and the process of the present invention are defined hereinafter. It is to be understood that the preferred embodiments are preferred on their own as well as in combination with each other. The preferences regarding the components described herein also apply to mixture (2) of the invention.

Firstly, mixture (1), which is separated or recovered from mixture (2) according to the process of the invention, is described in further detail. As already indicated above, mixture (1) preferably comprises as component (1a) a product comprising at least one (thio)phosphoric acid derivative, which is selected from (i) (thio)phosphoric acid triamides according to general formula (I), and (ii) (thio)phosphoric acid ester amides according to any one of general formula (IIa) or general formula (IIb); and as component (1b) at least one high-boiling solvent. The following definitions and preferred embodiments apply with regard to components (1a) and (1b) of mixture (1).

The at least one (thio)phosphoric acid derivative will be referred to as component (1a) of mixture (1), and the at least one high-boiling solvent will be referred to as component (1b) of mixture (1). However, it is to be understood that the preferences regarding the at least one (thio)phosphoric acid derivative and the at least one high-boiling solvent defined hereinafter apply to the above defined use and the above defined process of the invention as well as to the above defined mixture (2) of the invention, irrespective of whether the at least one (thio)phosphoric acid derivative and the at least one high-boiling solvent are explicitly referred to as components (1a) and (1b), respectively.

As used herein, the term "(thio)phosphoric acid derivative" in each case covers thiophosphoric acid derivatives and phosphoric acid derivatives. Thus, the prefix "(thio)" as used herein in each case indicates that a group P=S or a group P=O is covered. Preferably, the term "(thio)phosphoric acid derivative" covers "(thio)phosphoric acid triamides", i.e. thiophosphoric acid triamides or phosphoric acid triamides, and "(thio)phosphoric acid ester amides", i.e. thiophosphoric acid ester amides or phosphoric acid ester amides. In connection with "(thio)phosphoric acid ester amides", it is to be understood that this term covers "(thio)phosphoric acid ester diamides" and "(thio)phosphoric acid diester amides". It is noted that the terms "(thio)phosphoric acid triamide" and "(thio)phosphoric triamide" may interchangeably be used. Similarly, the terms "(thio)phosphoric acid ester amide" and "(thio)phosphoric ester amide" may interchangeably be used.

In one embodiment of the invention, the at least one (thio)phosphoric acid derivative is selected from the group consisting of (thio)phosphoric acid triamides according to general formula (I) and (thio)phosphoric acid ester amides according to general formula (IIa) or (IIb), which are defined hereinafter.

It is to be understood that the at least one (thio)phosphoric acid derivative is preferably one derivative selected from the options (thio)phosphoric acid triamides (I), (thio)phosphoric ester diamides (IIa) and (thio)phosphoric acid diester amides (IIb), and not a combination of these options.

Thus, in one embodiment, the at least one (thio)phosphoric acid derivative is a (thio)phosphoric acid triamide (I).

In another embodiment, the at least one (thio)phosphoric acid derivative is a (thio)phosphoric ester diamide (IIa).

In yet another embodiment, the at least one (thio)phosphoric acid derivative is a (thio)phosphoric acid diester amides (IIb).

As used herein, "(thio)phosphoric acid triamides" may be represented by the following general formula (I)

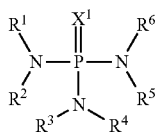

(I)

wherein
$X^1$ is O or S;
$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
$R^2$ is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or
$R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and
$R^3$, $R^4$, $R^5$, and $R^6$ are independently of each other selected from the group consisting of H and $C_1$-$C_4$-alkyl.

As used herein, "(thio)phosphoric acid ester amides" may be represented by any one of general formula (IIa)

(IIa)

wherein
$X^2$ is O or S;
$R^7$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and
$R^8$, $R^9$, $R^{10}$, and $R^{11}$ are independently of each other selected from the group consisting of H and $C_1$-$C_4$-alkyl;
or general formula (IIb)

(IIb)

wherein
$X^3$ is O or S;
$R^{12}$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
$R^{15}$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and
$R^{13}$ and $R^{14}$ are independently of each other selected from the group consisting of H and $C_1$-$C_4$-alkyl;
wherein general formula (IIa) represents "(thio)phosphoric acid ester diamides" and general formula (IIb) represents "(thio)phosphoric acid diester amides".

The organic moieties mentioned in the above definitions of the variables are collective terms for individual listings of the individual group members. The prefix $C_n$-$C_m$ indicates in each case the possible number of carbon atoms in the group.

The term "alkyl" as used herein denotes in each case a straight-chain or branched alkyl group having usually from 1 to 20 carbon atoms, preferably from 1 to 10 carbon atoms, frequently from 1 to 6 carbon atoms, more preferably 1 to 4 carbon atoms, e.g. 3 or 4 carbon atoms. Examples of alkyl groups are methyl, ethyl, n-propyl, iso-propyl, n-butyl, 2-butyl, iso-butyl, tert-butyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, and 1-ethyl-2-methylpropyl. Preferred alkyl groups are methyl, ethyl, n-propyl, isopropyl, n-butyl, isobutyl, sec-butyl, tert-butyl, n-pentyl, isopentyl, neopentyl, tert-pentyl, hexyl, 2-methylpentyl, n-heptyl, n-octyl, 2-ethylhexyl, isooctyl, nonyl, isononyl, decyl, and isodecyl.

The term "cycloalkyl" as used herein denotes in each case a monocyclic cycloaliphatic radical having usually from 3 to 20 carbon atoms, preferably from 3 to 10 carbon atoms, more preferably from 3 to 6 carbon atoms, such as cyclopropyl, cyclobutyl, cyclopentyl, cyclohexyl, cycloheptyl, cyclooctyl, cyclononyl and cyclodecyl or cyclopropyl, cyclobutyl, cyclopentyl and cyclohexyl.

The term "aryl" includes mono-, bi- or tricyclic aromatic radicals having usually from 6 to 14, preferably 6, 10, or 14 carbon atoms. Exemplary aryl groups include phenyl, naphthyl and anthracenyl. Phenyl is preferred as aryl group.

The term "arylalkyl" refers to aryl as defined above, which is bonded via a $C_1$-$C_4$-alkyl group, in particular a methyl group (=arylmethyl), to the remainder of the molecule, examples including benzyl, 1-phenylethyl, 2-phenylethyl, etc.

The term "heterocycle" or "heterocyclyl" includes 5- or 6-membered monocyclic heterocyclic non-aromatic radicals. The heterocyclic non-aromatic radicals usually comprise 1 or 2 heteroatoms selected from N, O and S as ring members, where S-atoms as ring members may be present as S, SO or $SO_2$. Examples of 5- or 6-membered heterocyclic radicals comprise saturated or unsaturated, non-aromatic heterocyclic rings, such as oxiranyl, oxetanyl, thietanyl, thietanyl-S-oxid (S-oxothietanyl), thietanyl-S-dioxid (S-dioxothiethanyl), pyrrolidinyl, pyrrolinyl, pyrazolinyl, tetrahydrofuranyl, dihydrofuranyl, 1,3-dioxolanyl, thiolanyl, S-oxothiolanyl, S-dioxothiolanyl, dihydrothienyl, S-oxodihydrothienyl, S-dioxodihydrothienyl, oxazolidinyl, oxazolinyl, thiazolinyl, oxathiolanyl, piperidinyl, piperazinyl, pyranyl, dihydropyranyl, tetrahydropyranyl, 1,3- and 1,4-dioxanyl, thiopyranyl, S-oxothiopyranyl, S-d ioxothiopyranyl, dihydrothiopyranyl, S-oxodihydrothiopyranyl, S-d ioxodihydrothiopyranyl, tetrahydrothiopyranyl, S-oxotetrahydrothiopyranyl, S-dioxotetrahydrothiopyranyl, morpholinyl, thiomorpholinyl, S-oxothiomorpholinyl, S-dioxothiomorpholinyl, thiazinyl and the like. Preferred examples of heterocyclic radicals are piperazinyl, morpholinyl, pyrrolyl, pyrazolyl, triazolyl, oxazolyl, thiazolyl, and imidazolyl groups.

The term "(di)alkylaminocarbonyl" refers to a (di)alkylamino group, i.e. an amino group comprising 1 or 2 alkyl substituents, which is bonded to the remainder of the molecule via the carbon atom of a carbonyl group (C=O).

It is to be understood that, preferably, also stereoisomers, tautomers, N-oxides, and salts of the (thio)phosphoric acid derivatives are covered by the term "(thio)phosphoric acid derivative". Stereoisomers are present, if the compounds contain one or more centers of chirality. In this case, the compounds will be present in the form of different enantiomers or diastereomers, if more than one center of chirality is present. The term "(thio)phosphoric acid derivative" preferably covers every possible stereoisomer, i.e. single enantiomers or diastereomers, as well as mixtures thereof. Tautomers include, e.g., keto-enol tautomers. N-oxides may be formed under oxidative conditions, if tertiary amino groups are present. Salts may be formed, e.g., with the basic amino groups of the (thio)phosphoric acid derivative. Anions, which stem from an acid, with which the (thio)phosphoric acid derivative may have been reacted, are e.g. chloride, bromide, fluoride, hydrogensulfate, sulfate, dihydrogenphosphate, hydrogenphosphate, phosphate, nitrate, bicarbonate, carbonate, hexafluorosilicate, hexafluorophosphate, benzoate, and the anions of $C_1$-$C_4$-alkanoic acids, preferably formate, acetate, propionate and butyrate.

The (thio)phosphoric acid derivatives according to the invention, of which at least one, preferably one or two, may be present as component (1a) of mixture (1), are preferably solid compounds with a melting point of at least 40° C., preferably at least 50° C., or with a melting point of at least 60° C., preferably at least 80° C., more preferably at least 85° C. Typically, the melting point is at most 200° C., preferably at most 185° C., more preferably at most 150° C., even more preferably at most 120° C., most preferably at most 100° C.

In connection with the melting points as provided herein above and below, it is to be understood that the defined melting points preferably refer to the melting points of the (thio)phosphoric acid derivatives in pure form, i.e. not contaminated with impurities of more than 5 wt.-%, preferably not contaminated with impurities of more than 2 wt.-%, and not in the form of a mixture with another (thio)phosphoric acid derivative.

If component (1a) of mixture (1) comprises two (thio)phosphoric acid derivatives, it is preferred in connection with the present invention that one (thio)phosphoric acid derivative has a melting point in the range of from 50° C. to 100° C., and the other one has a melting point in the range of from 60° C. to 185° C. Preferably, one (thio)phosphoric acid derivative has a melting point in the range of from 55° C. to 80° C., and the other one has a melting point of from 80° C. to 150° C.

If component (1a) of mixture (1) comprises one (thio)phosphoric acid derivative, said (thio)phosphoric acid derivative may preferably have a melting point in the range of from 50° C. to 185° C., preferably from 55° C. to 80° C. or from 80° C. to 150° C. If component (1a) of mixture (1) comprises only one (thio)phosphoric acid derivative, said (thio)phosphoric acid derivative may preferably have a melting point in the range of from 85° C. to 100° C.

As (thio)phosphoric acid derivatives with a melting point in the range of from 55° C. to 80° C., compounds with a melting point in the range of from 55 to 65° C. are particularly preferred. As (thio)phosphoric acid derivatives with a melting point in the range of from 80° C. to 150° C., compounds with a melting point in the range of from 85° C. to 120° C., preferably in the range of from 85° C. to 100° C., are particularly preferred.

In general, it is to be understood that component (1a) of mixture (1) may comprise at least one, i.e. one or more, preferably one, two or three, especially preferably one or two (thio)phosphoric acid derivatives, which is indicated by the expression "at least one (thio)phosphoric acid derivative". Thus, the term "at least one (thio)phosphoric acid derivative" may refer to a single (thio)phosphoric acid derivative or to a mixture of two or more, preferably two or three (thio)phosphoric acid derivatives. Preferably, component (1a) of mixture (1) comprises one or two (thio)phosphoric acid derivative(s). In one embodiment, it is preferred that component (1a) of mixture (1) comprises only one (thio)phosphoric acid derivative. In this connection, the term "at least one (thio)phosphoric acid derivative" is to be understood as "a (thio)phosphoric acid derivative" or "one (thio)phosphoric acid derivative". In another embodiment, it is preferred that component (1a) of mixture (1) comprises two or more, e.g. two or three, preferably two (thio)phosphoric acid derivatives. In this connection, the term "at least one (thio)phosphoric acid derivative" refers to a mixture of two or more (thio)phosphoric acid derivatives, preferably two (thio)phosphoric acid derivatives.

In one embodiment of the invention, component (1a) of mixture (1) comprises the at least one (thio)phosphoric acid derivative in an amount of at least 75 wt.-%, preferably at least 80 wt.-%, more preferably at least 85 wt.-%, most preferably at least 90 wt.-%, particularly preferably 95 wt.-%, based on the total weight of component (1a) of mixture (1). It is preferred that component (1a) exclusively comprises one or more (thio)phosphoric acid derivatives.

In one embodiment of the invention, in particular connection with the above defined use, process and mixture (2) of the invention, the at least one (thio)phosphoric acid derivative is selected from the group consisting of (thio)phosphoric acid triamides according to general formula (I) and (thio)phosphoric acid ester amides according to general formula (IIa) or (IIb);
wherein general formula (I) is

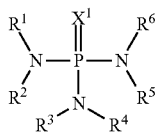
(I)

wherein
$X^1$ is O or S;
$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
$R^2$ is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or
$R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and
$R^3$, $R^4$, $R^5$, and $R^6$ are independently of each other selected from the group consisting of H and $C_1$-$C_4$-alkyl;
and wherein general formula (IIa) is

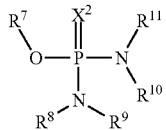
(IIa)

wherein
$X^2$ is O or S;
$R^7$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and
$R^8$, $R^9$, $R^{10}$, and $R^{11}$ are independently of each other selected from the group consisting of H and $C_1$-$C_4$-alkyl;
and wherein general formula (IIb) is

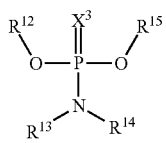
(IIb)

wherein
$X^3$ is O or S;
$R^{12}$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
$R^{15}$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and
$R^{13}$ and $R^{14}$ are independently of each other selected from the group consisting of H and $C_1$-$C_4$-alkyl.

In a preferred embodiment of the invention, the at least one (thio)phosphoric acid derivative is selected from the group consisting of (thio)phosphoric acid triamides according to general formula (I) and (thio)phosphoric acid ester amides according to general formula (IIa) or (IIb);
wherein general formula (I) is

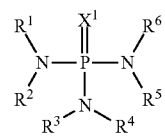
(I)

wherein
$X^1$ is O or S;
$R^1$ is $C_1$-$C_8$-alkyl, $C_5$-$C_6$-cycloalkyl, phenyl, or benzyl;
$R^2$ is H, or $C_1$-$C_4$-alkyl; and
$R^3$, $R^4$, $R^5$, and $R^6$ are each H;
and wherein general formula (IIa) is

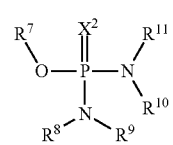
(IIa)

wherein
$X^2$ is O or S;
$R^7$ is $C_1$-$C_8$-alkyl, $C_5$-$C_6$-cycloalkyl, phenyl, or benzyl; and
$R^8$, $R^9$, $R^{10}$, and $R^{11}$ are each H;
and wherein general formula (IIb) is

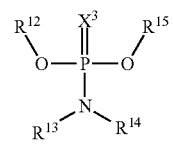
(IIb)

wherein
$X^3$ is O or S;
$R^{12}$ is $C_1$-$C_8$-alkyl, $C_5$-$C_6$-cycloalkyl, phenyl, or benzyl;
$R^{15}$ is $C_1$-$C_8$-alkyl, $C_5$-$C_6$-cycloalkyl, phenyl, or benzyl; and
$R^{13}$ and $R^{14}$ are each H.

Particularly preferred as the at least one (thio)phosphoric acid derivative is a (thio)phosphoric acid triamide according to general formula (I), wherein
$X^1$ is S;
$R^1$ is $C_1$-$C_8$-alkyl, $C_5$-$C_6$-cycloalkyl, phenyl, or benzyl;
$R^2$ is H or $C_1$-$C_4$-alkyl; and
$R^3$, $R^4$, $R^5$, and $R^6$ are each H;
and wherein preferably
$X^1$ is S;
$R^1$ is $C_1$-$C_8$-alkyl;
$R^2$ is H or $C_1$-$C_4$-alkyl; and
$R^3$, $R^4$, $R^5$, and $R^6$ are each H.

In one embodiment of the invention, component (1a) of mixture (1) comprises at least one (thio)phosphoric acid derivative, which is selected from
(i)
(thio)phosphoric acid triamides according to general formula (I)

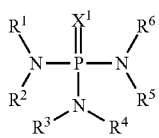

wherein
$X^1$ is O or S;
$R^1$ is $C_1$-$C_8$-alkyl, $C_5$-$C_6$-cycloalkyl, phenyl, or benzyl;
$R^2$ is H, or $C_1$-$C_4$-alkyl; and
$R^3$, $R^4$, $R^5$, and $R^6$ are each H;
and
(ii)
(thio)phosphoric acid ester amides according to any one of general formula (IIa)

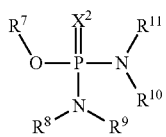

wherein
$X^2$ is O or S;
$R^7$ is $C_1$-$C_8$-alkyl, $C_5$-$C_6$-cycloalkyl, phenyl, or benzyl; and
$R^8$, $R^9$, $R^{10}$, and $R^{11}$ are each H;
or general formula (IIb)

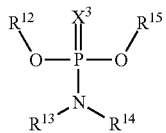

wherein
$X^3$ is O or S;
$R^{12}$ is $C_1$-$C_8$-alkyl, $C_5$-$C_6$-cycloalkyl, phenyl, or benzyl;
$R^{15}$ is $C_1$-$C_8$-alkyl, $C_5$-$C_6$-cycloalkyl, phenyl, or benzyl; and
$R^{13}$ and $R^{14}$ are each H.

In one preferred embodiment of the invention, component (1a) of mixture (1) comprises at least one (thio)phosphoric acid derivative, which is selected from
(i)
(thio)phosphoric acid triamides according to general formula (I)

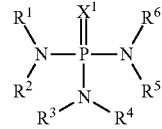

wherein
$X^1$ is O or S;
$R^1$ is $C_1$-$C_8$-alkyl, $C_5$-$C_6$-cycloalkyl, phenyl, or benzyl;
$R^2$ is H, or $C_1$-$C_4$-alkyl; and
$R^3$, $R^4$, $R^5$, and $R^6$ are each H.

In one preferred embodiment of the invention, component (1a) of mixture (1) comprises at least one (thio)phosphoric acid derivative, which is selected from
(ii)
(thio)phosphoric acid ester amides according to any one of general formula (IIa)

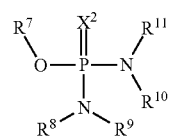

wherein
$X^2$ is O or S;
$R^7$ is $C_1$-$C_8$-alkyl, $C_5$-$C_6$-cycloalkyl, phenyl, or benzyl; and
$R^8$, $R^9$, $R^{10}$, and $R^{11}$ are each H;
or general formula (IIb)

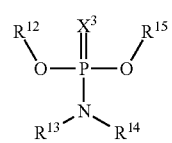

wherein
$X^3$ is O or S;
$R^{12}$ is $C_1$-$C_8$-alkyl, $C_5$-$C_6$-cycloalkyl, phenyl, or benzyl;
$R^{15}$ is $C_1$-$C_8$-alkyl, $C_5$-$C_6$-cycloalkyl, phenyl, or benzyl; and
$R^{13}$ and $R^{14}$ are each H.

It is preferred that component (1a) of mixture (1) comprises at least one (thio)phosphoric acid triamide, which is selected from (thio)phosphoric acid triamides according to general formula (I).

In one particularly preferred embodiment of the invention, component (1a) of mixture (1) comprises at least one thiophosphoric acid triamide, which is selected from (thio)phosphoric acid triamides according to general formula (I), wherein
$X^1$ is S;
$R^1$ is $C_1$-$C_8$-alkyl, $C_5$-$C_6$-cycloalkyl, phenyl, or benzyl;
$R^2$ is H or $C_1$-$C_4$-alkyl; and
$R^3$, $R^4$, $R^5$, and $R^6$ are each H;

and wherein preferably

X¹ is S;

R¹ is $C_1$-$C_8$-alkyl;

R² is H or $C_1$-$C_4$-alkyl; and

R³, R⁴, R⁵, and R⁶ are each H.

In one embodiment of the invention, component (1a) of mixture (1) comprises at least one (thio)phosphoric acid derivative, which has a melting point of at least 40° C., preferably at least 50° C., more preferably at least 60° C., most preferably at least 80° C., particularly preferably at least 85° C.

In one embodiment of the invention, component (1a) of mixture (1) comprises at least one (thio)phosphoric acid derivative, which has a melting point of at least 40° C., preferably at least 50° C.

Preferred (thio)phosphoric acid derivatives with a melting point of at least 40° C. are selected from the group consisting of N-benzyl-N-methylthiophosphoric acid triamide, N,N-diethylthiophosphoric acid triamide, N-(n-butyl)thiophosphoric acid triamide, N-isopropylphosphoric acid triamide, N-(n-hexyl)thiophosphoric acid triamide, N-(sec-butyl)thiophosphoric acid triamide, N,N-diethylphosphoric acid triamide, N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide;

O-ethylphosphoric acid ester diamide, O-phenylthiophosphoric acid ester diamide, O,O-diphenylphosphoric acid diester amide, and O-phenylphosphoric acid ester diamide.

In one embodiment of the invention, component (1a) of mixture (1) comprises N-benzyl-N-methylthiophosphoric acid triamide having the following chemical formula

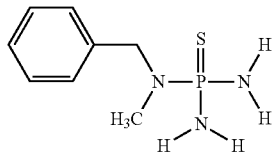

In another embodiment of the invention, component (1a) of mixture (1) comprises N,N-diethylthiophosphoric acid triamide having the following chemical formula

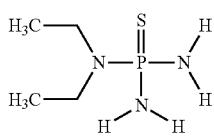

In another embodiment of the invention, component (1a) of mixture (1) comprises N-(n-butyl)thiophosphoric acid triamide having the following chemical formula

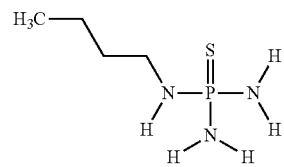

In another embodiment of the invention, component (1a) of mixture (1) comprises N-isopropylphosphoric acid triamide having the following chemical formula

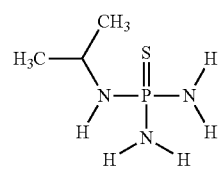

In another embodiment of the invention, component (1a) of mixture (1) comprises N-(n-hexyl)thiophosphoric acid triamide having the following chemical formula

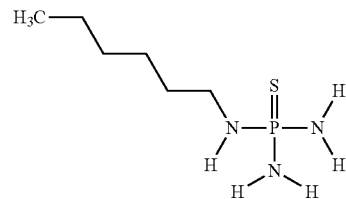

In another embodiment of the invention, component (1a) of mixture (1) comprises N-(sec-butyl)thiophosphoric acid triamide having the following chemical formula

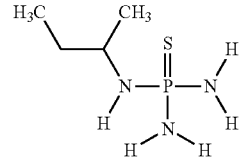

In another embodiment of the invention, component (1a) of mixture (1) comprises N,N-diethylphosphoric acid triamide having the following chemical formula

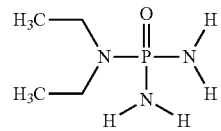

In another embodiment of the invention, component (1a) of mixture (1) comprises N-(n-propyl)thiophosphoric acid triamide having the following chemical formula:

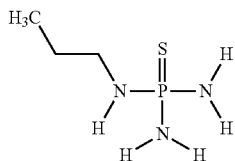

In another embodiment of the invention, component (1a) of mixture (1) comprises N,N-diisopropylthiophosphoric acid triamide having the following chemical formula:

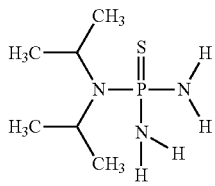

In another embodiment of the invention, component (1a) of mixture (1) comprises N,N-dimethylthiophosphoric acid triamide having the following chemical formula:

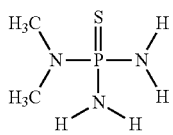

In another embodiment of the invention, component (1a) of mixture (1) comprises N-(n-octyl)phosphoric acid triamide having the following chemical formula:

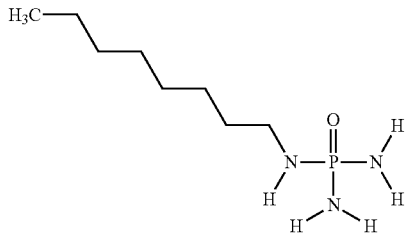

In another embodiment of the invention, component (1a) of mixture (1) comprises N-(n-butyl)phosphoric acid triamide having the following chemical formula:

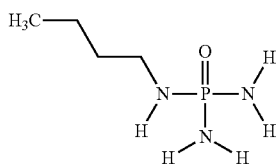

In another embodiment of the invention, component (1a) of mixture (1) comprises N-cyclohexylphosphoric acid triamide having the following chemical formula:

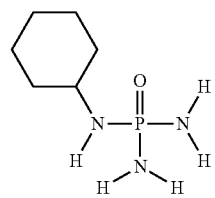 [SMILES: NP(N)(=O)NC1CCCCC1]

In another embodiment of the invention, component (1a) of mixture (1) comprises N-benzyl-N-methylphosphoric acid triamide having the following chemical formula:

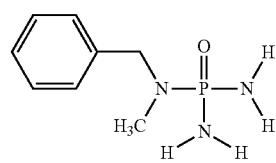

In another embodiment of the invention, component (1a) of mixture (1) comprises N,N-dimethylphosphoric acid triamide having the following chemical formula:

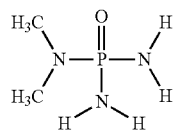

In another embodiment of the invention, component (1a) of mixture (1) comprises N-cyclohexylthiophosphoric acid triamide having the following chemical formula:

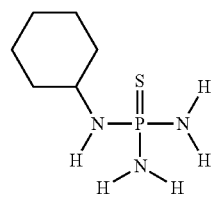 [SMILES: NP(N)(=S)NC1CCCCC1]

In another embodiment of the invention, component (1a) of mixture (1) comprises O-ethylphosphoric acid ester diamide having the following chemical formula:

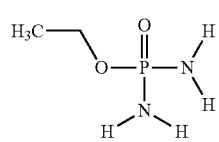

In another embodiment of the invention, component (1a) of mixture (1) comprises O-phenylthiophosphoric acid ester diamide having the following chemical formula:

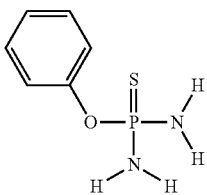 [SMILES: NP(N)(=S)Oc1ccccc1]

In another embodiment of the invention, component (1a) of mixture (1) comprises O,O-diphenylphosphoric acid diester amide having the following chemical formula:

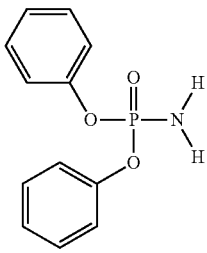 [SMILES: NP(=O)(Oc1ccccc1)Oc1ccccc1]

In another embodiment of the invention, component (1a) of mixture (1) comprises O-phenylphosphoric acid ester diamide having the following chemical formula:

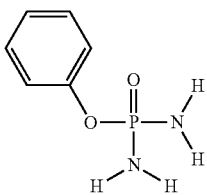 [SMILES: NP(N)(=O)Oc1ccccc1]

It is preferred according to the invention that component (1a) of mixture (1) comprises at least one of the above listed (thio)phosphoric acid derivatives, i.e. either one or more than one, e.g. two or three, of the above listed (thio) phosphoric acid derivatives.

In one preferred embodiment of the present invention, component (1a) of mixture (1) comprises one of the above listed (thio)phosphoric acid derivatives, and does not comprise any further (thio)phosphoric acid derivatives.

In another preferred embodiment of the present invention, component (1a) of mixture (1) comprises two or three, preferably two, of the above listed (thio)phosphoric acid derivatives, and does not comprise any further (thio)phosphoric acid derivatives. Thus, component (1a) of mixture (1) may preferably comprise two (thio)phosphoric acid derivatives selected from the group consisting of N-benzyl-N-methylthiophosphoric acid triamide, N,N-diethylthiophosphoric acid triamide, N-(n-butyl)thiophosphoric acid triamide, N-isopropylphosphoric acid triamide, N-(n-hexyl)thiophosphoric acid triamide, N-(sec-butyl)thiophosphoric acid triamide, N,N-diethylphosphoric acid triamide, N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide; O-ethylphosphoric acid ester diamide, O-phenylthiophosphoric acid ester diamide, O,O-diphenylphosphoric acid diester amide, and O-phenylphosphoric acid ester diamide.

Preferred (thio)phosphoric acid derivatives with a melting point of at least 50° C. are selected from the group consisting of N,N-diethylthiophosphoric acid triamide, N-(n-butyl) thiophosphoric acid triamide, N-isopropylphosphoric acid triamide, N-(n-hexyl)thiophosphoric acid triamide, N-(sec-butyl)thiophosphoric acid triamide, N,N-diethylphosphoric acid triamide, N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide;

O-ethylphosphoric acid ester diamide, O-phenylthiophosphoric acid ester diamide, O,O-diphenylphosphoric acid diester amide, and O-phenylphosphoric acid ester diamide.

It is preferred according to the invention that component (1a) of mixture (1) comprises at least one of the above listed (thio)phosphoric acid derivatives, i.e. either one or more than one, e.g. two or three, of the above listed (thio) phosphoric acid derivatives.

In one preferred embodiment of the present invention, component (1a) of mixture (1) comprises one of the above listed (thio)phosphoric acid derivatives, and does not comprise any further (thio)phosphoric acid derivatives.

In another preferred embodiment of the present invention, component (1a) of mixture (1) comprises two or three, preferably two, of the above listed (thio)phosphoric acid derivatives, and does not comprise any further (thio)phosphoric acid derivatives.

In one preferred embodiment of the invention, component (1a) of mixture (1) comprises N-(n-butyl)(thio)phosphoric acid triamide, N-(n-propyl)(thio)phosphoric acid triamide, or the combination thereof, preferably the combination of N-(n-butyl)(thio)phosphoric acid triamide and N-(n-propyl) (thio)phosphoric acid triamide.

Thus, component (1a) of mixture (1) may in one particularly preferred embodiment comprise N-(n-butyl)thiophosphoric acid triamide.

Thus, component (1a) of mixture (1) may in another particularly preferred embodiment comprise N-(n-butyl) phosphoric acid triamide.

Thus, component (1a) of mixture (1) may in another particularly preferred embodiment comprise N-(n-propyl) thiophosphoric acid triamide.

Thus, component (1a) of mixture (1) may in another particularly preferred embodiment comprise N-(n-propyl) phosphoric acid triamide.

Furthermore, component (1a) of mixture (1) may comprise a combination of any one of the foregoing N-alkyl (thio)phosphoric acid triamides, e.g. N-(n-butyl)thiophosphoric acid triamide and N-(n-propyl)thiophosphoric acid triamide, or N-(n-butyl)thiophosphoric acid triamide and N-(n-propyl)phosphoric acid triamide, or N-(n-butyl)phosphoric acid triamide and N-(n-propyl)thiophosphoric acid triamide, or N-(n-butyl)phosphoric acid triamide and N-(n-propyl)phosphoric acid triamide.

It can be preferred in connection with the above embodiments that component (1a) does not comprise any further (thio)phosphoric acid derivatives apart from the derivative(s) mentioned.

In one preferred embodiment of the invention, component (1a) of mixture (1) comprises N-(n-butyl)thiophosphoric acid triamide, N-(n-propyl)thiophosphoric acid triamide, or the combination thereof, preferably the combination of N-(n-butyl)thiophosphoric acid triamide and N-(n-propyl) thiophosphoric acid triamide. Preferably, component (1a) of mixture (1) comprises N-(n-butyl)thiophosphoric acid triamide, N-(n-propyl)thiophosphoric acid triamide, or the combination thereof, preferably the combination of N-(n-butyl)thiophosphoric acid triamide and N-(n-propyl)thiophosphoric acid triamide, and does not comprise any further (thio)phosphoric acid derivatives.

Thus, component (1a) of mixture (1) may in one particularly preferred embodiment comprise N-(n-butyl)thiophosphoric acid triamide.

Thus, component (1a) of mixture (1) may in another particularly preferred embodiment comprise N-(n-propyl) thiophosphoric acid triamide.

Thus, component (1a) of mixture (1) may in another particularly preferred embodiment comprise N-(n-butyl) thiophosphoric acid triamide and N-(n-propyl)thiophosphoric acid triamide.

It can be preferred in connection with the above embodiments that component (1a) does not comprise any further (thio)phosphoric acid derivatives apart from the derivative(s) mentioned.

In one embodiment of the invention, component (1a) of mixture (1) comprises at least one (thio)phosphoric acid derivative, which has a melting point of at least 60° C., preferably at least 80° C., more preferably at least 85° C.

Preferred (thio)phosphoric acid derivatives with a melting point of at least 60° C. are selected from the group consisting of N-isopropylphosphoric acid triamide, N-(n-hexyl)thiophosphoric acid triamide, N-(sec-butyl)thiophosphoric acid triamide, N,N-diethylphosphoric acid triamide, N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl) phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide;

O-ethylphosphoric acid ester diamide, O-phenylthiophosphoric acid ester diamide, O,O-diphenylphosphoric acid diester amide, and O-phenylphosphoric acid ester diamide.

It is preferred according to the invention that component (1a) of mixture (1) comprises at least one of the above listed (thio)phosphoric acid derivatives, i.e. either one or more than one, e.g. two or three, of the above listed (thio) phosphoric acid derivatives.

In one preferred embodiment of the present invention, component (1a) of mixture (1) comprises one of the above listed (thio)phosphoric acid derivatives, and does not comprise any further (thio)phosphoric acid derivatives.

In another preferred embodiment of the present invention, component (1a) of mixture (1) comprises two or three, preferably two, of the above listed (thio)phosphoric acid derivatives, and does not comprise any further (thio)phosphoric acid derivatives.

Preferred (thio)phosphoric acid derivatives with a melting point of at least 85° C. are selected from the group consisting of N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide;

O-ethylphosphoric acid ester diamide, O-phenylthiophosphoric acid ester diamide, O,O-diphenylphosphoric acid diester amide, and O-phenylphosphoric acid ester diamide.

It is preferred according to the invention that component (1a) of mixture (1) comprises at least one of the above listed (thio)phosphoric acid derivatives, i.e. either one or more than one, e.g. two or three, of the above listed (thio) phosphoric acid derivatives.

In one preferred embodiment of the present invention, component (1a) of mixture (1) comprises one of the above listed (thio)phosphoric acid derivatives, and does not comprise any further (thio)phosphoric acid derivatives.

In another preferred embodiment of the present invention, component (1a) of mixture (1) comprises two or three, preferably two, of the above listed (thio)phosphoric acid derivatives, and does not comprise any further (thio)phosphoric acid derivatives.

In one preferred embodiment of the invention, component (1a) of mixture (1) comprises N-(n-propyl)thiophosphoric acid triamide, and preferably does not comprise N-(n-butyl) thiophosphoric acid triamide.

In a more preferred embodiment of the invention, component (1a) of mixture (1) comprises N-(n-propyl)thiophosphoric acid triamide, and does not comprise any further (thio)phosphoric acid derivatives.

As used herein, the term "high-boiling solvent" refers to a solvent, preferably an organic solvent, which has a boiling point, which is at least 30° C. higher than the volatile components of mixture (2), i.e. the solvent representing component (2c) and optionally the HCl scavenger representing component (2d). In general, it is desired for the process of the present invention that the at least one high-boiling solvent remains in the bottom product of the evaporator together with the (thio)phosphoric acid derivative so as to recover the purified mixture (1). Accordingly, a certain difference between the boiling points of the volatile components of mixture (2) to be evaporated by the evaporator, and the at least one high-boiling solvent to be maintained in the bottom product is required, in order to achieve a good separation and purification of mixture (1).

As used herein above and below, the boiling points are to be understood as boiling points under atmospheric pressure.

In one embodiment of the invention, said temperature difference between the boiling points is at least 30° C., preferably said difference is at least 40° C., more preferably at least 50° C., even more preferably at least 60° C., most preferably at least 80° C.

In one embodiment, said temperature difference is at least 40° C.

In one embodiment, said temperature difference is at least 45° C.

In one embodiment, said temperature difference is at least 50° C.

In one embodiment, said temperature difference is at least 55° C.

In one embodiment, said temperature difference is at least 60° C.

In one embodiment, said temperature difference is at least 65° C.

In one embodiment, said temperature difference is at least 70° C.

In one embodiment, said temperature difference is at least 75° C.

In one embodiment, said temperature difference is at least 80° C.

In one embodiment, said temperature difference is at least 85° C.

In one embodiment, said temperature difference is at least 90° C.

In one embodiment, said temperature difference is at least 95° C.

In one embodiment, said temperature difference is at least 100° C.

It can be preferred that said temperature difference between the boiling points is even higher than 100° C., preferably at least 110° C., more preferably at least 120° C., most preferably at least 150° C., particularly preferably at least 180° C.

In one embodiment, said temperature difference is at least 105° C.

In one embodiment, said temperature difference is at least 110° C.

In one embodiment, said temperature difference is at least 115° C.

In one embodiment, said temperature difference is at least 120° C.

In one embodiment, said temperature difference is at least 125° C.

In one embodiment, said temperature difference is at least 130° C.

In one embodiment, said temperature difference is at least 135° C.

In one embodiment, said temperature difference is at least 140° C.

In one embodiment, said temperature difference is at least 145° C.

In one embodiment, said temperature difference is at least 150° C.

In one embodiment, said temperature difference is at least 155° C.

In one embodiment, said temperature difference is at least 160° C.

In one embodiment, said temperature difference is at least 165° C.

In one embodiment, said temperature difference is at least 170° C.

In one embodiment, said temperature difference is at least 175° C.

In one embodiment, said temperature difference is at least 180° C.

Thus, the term "high-boiling" preferably defines that the at least one high-boiling solvent has a boiling point, which is sufficiently higher than the boiling points of the volatile components of mixture (2) to be evaporated, so that the high-boiling solvent is not or at least not to a large extend, preferably not to an extend of more than 60 wt.-%, more preferably not to an extent of more than 30 wt.-%, most preferably not to an extent of more than 10 wt.-%, especially preferably not to an extent of more than 5 wt.-% based on the total amount of the high-boiling solvent, evaporated under the operating conditions of the evaporator. A skilled person understands that it is required to select the at least one high-boiling solvent, which is provided in mixture (2) depending on the boiling points of the volatile components of mixture (2).

It is to be understood that component (1b) of mixture (1) may comprise at least one, i.e. one or more, preferably one, two or three, especially preferably one or two high-boiling solvents, which is indicated by the expression "at least one high-boiling solvent". Thus, a single high-boiling solvent or a mixture of two or more, preferably two or three, more preferably two high-boiling solvents may be used in the process of the invention. In one embodiment, it is preferred that component (1b) of mixture (1) comprises only one high-boiling solvent. In this connection, the term "at least one high-boiling solvent" is to be understood as "a high-boiling solvent" or "one high-boiling solvent". In another embodiment, it is preferred that component (1b) of mixture (1) comprises two or more, preferably two or three, more preferably two high-boiling solvents. In this connection, the term "at least one high-boiling solvent" refers to a mixture of two or more high-boiling solvents.

In one embodiment of the invention, the at least one high-boiling solvent has a boiling point of at least 130° C., preferably at least 160° C., more preferably at least 190° C., most preferably at least 220° C., particularly preferably at least 250° C.

In one embodiment, the at least one high-boiling solvent has a boiling point of at least 130° C.

In one embodiment, the at least one high-boiling solvent has a boiling point of at least 135° C.

In one embodiment, the at least one high-boiling solvent has a boiling point of at least 140° C.

In one embodiment, the at least one high-boiling solvent has a boiling point of at least 145° C.

In one embodiment, the at least one high-boiling solvent has a boiling point of at least 150° C.

In one embodiment, the at least one high-boiling solvent has a boiling point of at least 155° C.

In one embodiment, the at least one high-boiling solvent has a boiling point of at least 160° C.

In one embodiment, the at least one high-boiling solvent has a boiling point of at least 165° C.

In one embodiment, the at least one high-boiling solvent has a boiling point of at least 170° C.

In one embodiment, the at least one high-boiling solvent has a boiling point of at least 175° C.

In one embodiment, the at least one high-boiling solvent has a boiling point of at least 180° C.

In one embodiment, the at least one high-boiling solvent has a boiling point of at least 185° C.

In one embodiment, the at least one high-boiling solvent has a boiling point of at least 190° C.

In one embodiment, the at least one high-boiling solvent has a boiling point of at least 195° C.

In one embodiment, the at least one high-boiling solvent has a boiling point of at least 200° C.

In one embodiment, the at least one high-boiling solvent has a boiling point of at least 205° C.

In one embodiment, the at least one high-boiling solvent has a boiling point of at least 210° C.

In one embodiment, the at least one high-boiling solvent has a boiling point of at least 215° C.

In one embodiment, the at least one high-boiling solvent has a boiling point of at least 220° C.

In one embodiment, the at least one high-boiling solvent has a boiling point of at least 225° C.

In one embodiment, the at least one high-boiling solvent has a boiling point of at least 230° C.

In one embodiment, the at least one high-boiling solvent has a boiling point of at least 235° C.

In one embodiment, the at least one high-boiling solvent has a boiling point of at least 240° C.

In one embodiment, the at least one high-boiling solvent has a boiling point of at least 245° C.

In one embodiment, the at least one high-boiling solvent has a boiling point of at least 250° C.

In one embodiment, the at least one high-boiling solvent has a boiling point of at least 255° C.

In one embodiment, the at least one high-boiling solvent has a boiling point of at least 260° C.

In one embodiment, the at least one high-boiling solvent has a boiling point of at least 265° C.

In one embodiment, the at least one high-boiling solvent has a boiling point of at least 270° C.

In one embodiment, the at least one high-boiling solvent has a boiling point of at least 275° C.

In one embodiment, the at least one high-boiling solvent has a boiling point of at least 280° C.

In one embodiment, the at least one high-boiling solvent has a boiling point of at least 285° C.

In one embodiment, the at least one high-boiling solvent has a boiling point of at least 300° C.

In one embodiment of the invention, the at least one high-boiling solvent has a boiling point of from 130° C. to 500° C., preferably from 160° C. to 450° C., more preferably from 180° C. to 400° C. In certain situations, it can be preferred that the high-boiling solvent has a boiling point of from 220° C. to 400° C., preferably from 250° C. to 400° C. In other situations, it can be preferred that the high-boiling solvent has a boiling point of from 160° C. to 250° C., preferably from 180° C. to 220° C.

It is to be understood that the at least one high-boiling solvent is selected as such that the boiling point differs from the boiling points of the volatile components of mixture (2), i.e. component (2c) and optional component (2d) of mixture (2), by at least 30° C. as outlined in detail above.

If the boiling points of the volatile components of mixture (2) are below 100° C., the at least one high-boiling solvent has a boiling point of at least 130° C., preferably at least 150° C., more preferably at least 180° C.

If the boiling points of the volatile components of mixture (2) are below 110° C., the at least one high-boiling solvent has a boiling point of at least 140° C., preferably at least 160° C., more preferably at least 190° C.

If the boiling points of the volatile components of mixture (2) are below 120° C., the at least one high-boiling solvent has a boiling point of at least 150° C., preferably at least 170° C., more preferably at least 200° C.

If the boiling points of the volatile components of mixture (2) are below 130° C., the at least one high-boiling solvent has a boiling point of at least 160° C., preferably at least 180° C., more preferably at least 210° C.

If the boiling points of the volatile components of mixture (2) are below 140° C., the at least one high-boiling solvent has a boiling point of at least 170° C., preferably at least 190° C., more preferably at least 220° C.

If the boiling points of the volatile components of mixture (2) are below 150° C., the at least one high-boiling solvent has a boiling point of at least 180° C., preferably at least 200° C., more preferably at least 230° C.

If the boiling points of the volatile components of mixture (2) are below 160° C., the at least one high-boiling solvent has a boiling point of at least 190° C., preferably at least 210° C., more preferably at least 240° C. If the boiling points of the volatile components of mixture (2) are below 170° C., the at least one high-boiling solvent has a boiling point of at least 200° C., preferably at least 220° C., more preferably at least 250° C.

In any case, it is preferred according to the present invention that the at least one high-boiling solvent is liquid at room temperature, or at least has a low melting point.

In one embodiment, the melting point of the at least one high-boiling solvent is at most 50° C.

In one embodiment, the melting point of the at least one high-boiling solvent is at most 40° C.

In one embodiment, the melting point of the at least one high-boiling solvent is at most 30° C.

In one embodiment, the melting point of the at least one high-boiling solvent is at most 20° C.

In one embodiment, the melting point of the at least one high-boiling solvent is at most 10° C.

In one embodiment, the melting point of the at least one high-boiling solvent is at most 0° C.

In one embodiment, the melting point of the at least one high-boiling solvent is at most −5° C.

With regard to the mixture (1) comprising as component (1a) the product comprising at least one (thio)phosphoric acid derivative as defined above, and as component (1b) the at least one high-boiling solvent, it is preferred that said mixture is liquid at room temperature, preferably at a temperature of below 20° C., more preferably below 10° C., most preferably below 0° C., particularly preferably below −5° C.

In one embodiment of the invention, the at least one high-boiling solvent is a polar protic or a polar aprotic high-boiling solvent. Furthermore, the at least one high-boiling solvent is preferably chemically inert, so that it does not chemically react with other compounds, e.g. under the reaction conditions of the preparation of the (thio)phosphoric acid derivative (if already present at this stage), or under the conditions of the recovery of mixture (1) according to the present invention. Moreover, it is preferred that the at least one high-boiling solvent is hydrophilic, i.e. easily miscible with water.

The at least one high-boiling solvent according to the invention may comprise one or more functional groups selected from amino groups, in particular tertiary amino groups, ether groups, alcohol groups, thioether groups, thiol groups, ester groups, keto groups, carbonate groups, urea groups, and sulfoxide groups.

In one embodiment of the invention, the at least one high-boiling solvent of component (1b) of mixture (1) comprises one or more functional groups selected from amino groups, ether groups, alcohol group, ester groups, and sulfoxide groups.

In a preferred embodiment of the invention, the at least one high-boiling solvent of component (1b) of mixture (1) comprises one or more functional groups selected from amino groups, ether groups, alcohol group, and ester groups.

In one embodiment of the invention, the at least one high-boiling solvent of component (1b) of mixture (1) is selected from the group consisting of (i) polyamines;
(ii) alcohols;
(iii) glycol ethers;
(iv) glycol thioethers;
(v) amino alcohols;
(vi) etheramines;
(vii) amines;
(viii) carboxylic acid amides;
(ix) carboxylic acid esters;
(x) ketones;
(xi) carbonate esters and ureas; and
(xii) sulfoxides.

All these high-boiling solvents have the advantage that they are not only suitable for improving the recovery process of the (thio)phosphoric acid derivative according to the invention, but that they are also suitable solvents, additives or auxiliaries for the formulation of the (thio)phosphoric acid derivative, so that it is not required to separate them from the at least one (thio)phosphoric acid derivative. Rather, mixture (1) may be considered as a pre-mix for preparing suitable formulations of the (thio)phosphoric acid derivative(s) for the application in agriculture.

The above listed subgroups (i) to (xii) of high-boiling solvents are described in further detail hereinafter.

Subgroup (i):

In one preferred embodiment of the invention, the at least one high-boiling solvent is a polyamine.

Polyamines include any polymeric polyamines. Preferably, the polyamine is a polyalkyleneimine or polyvinylamine, more preferably a polyalkyleneimine, most preferably a polyethyleneimine, polypropyleneimine, or polybutyleneimine.

In one embodiment of the invention, the at least one high-boiling solvent is a polyalkyleneimine, preferably a polyethyleneimine, which may function as a stabilizer of the urease inhibitor after application on the urea.

The polyethyleneimine as used herein is preferably a homopolymer comprising ethyleneimine (—CH$_2$CH$_2$NH—) as monomeric units. The monomeric units may be present in a number of 10 to 10$^5$.

The polyethyleneimine can be a linear polymer, a ring polymer, a cross-linked polymer, a branched polymer, a star polymer, a comb polymer, a brush polymer, a dendronized polymer, or a dendrimer, and may preferably be a linear polymer.

Polyethyleneimines may be further characterized by the ratio of primary, secondary and tertiary amino groups or by the branching degree. The ratio of primary/secondary/tertiary amino groups may preferably be 1 to (0.6-1.1) to (0.5-0.7), and may e.g. be 1/0.9/0.5, 1/0.9/0.6, 1/1.1/0.7, 1/1.0.6, 1/1.0.7, or 1/1.1/0.7. Preferably, the polyethyleneimine as used herein has a degree of branching in the range of from 0.1 to 0.95, preferably 0.25 to 0.90, more preferably 0.30 to 0.80, most preferably 0.50 to 0.80. The branching degree can be determined for example via $^{13}$C-NMR spectroscopy, preferably in D$_2$O, and is defined as follows:

Degree of branching=$D+T/D+T+L$

D (dendritic) equals the percentage of tertiary amino groups, L (linear) equals the percentage of secondary amino groups, and T (terminal) equals the percentage of primary amino groups.

Preferably, the polyethyleneimine has a weight average molecular weight in the range of from 200 to 1000000 g/mol. It is preferred that the polyethyleneimine has a weight average molecular weight of at least 400, preferably at least 550, more preferably at least 650, in particular at least 750. Furthermore, it is preferred that the weight average molecular weight is not more than 10000, preferably not more than 4000, more preferably not more than 1900, most preferably not more than 1500, particularly preferably not more than 1350, particularly most preferably not more than 1150, particularly not more than 1000, for example not more than 850. The weight average molecular weight can be determined by standard gel permeation chromatography (GPC).

Polyethyleneimines can be prepared by known processes, as described, for example, in Rompps Chemie Lexikon, 8$^{th}$ edition, 1992, pages 3532-3533, or in Ullmanns Enzyklopädie der Technischen Chemie, 4$^{th}$ edition, 1974, vol. 8, pages 212-213, and the literature cited therein. They are commercially available under the trade name Agnique® formerly known as Lupasol® from BASF SE.

Another class of polyamines includes polymers obtainable by condensation of at least one compound selected from N-(hydroxyalkyl)amines of formulae (I.a) and/or (I.b),

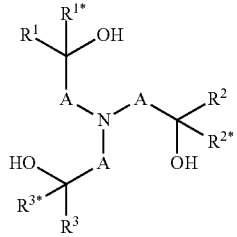

(I.a)

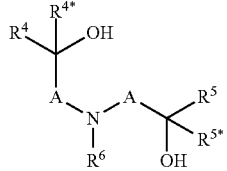

(I.b)

wherein

A are independently selected from C$_1$-C$_6$-alkylene;

R$^1$, R$^{1*}$, R$^2$, R$^{2*}$, R$^3$, R$^{3*}$, R$^4$, R$^{4*}$, R$^5$, and R$^{5*}$ are independently selected of one another selected from hydrogen, alkyl, cycloalkyl or aryl, wherein the at least three mentioned radicals may be optionally substituted; and R$^6$ is selected from hydrogen, alkyl, cycloalkyl or aryl, which may be optionally substituted.

Preferred are polyethanolamines. In this connection, polyethanolamines are preferred, wherein in the condensation product of the compounds of formulae (I.a) and/or (I.b) as defined above, A is C$_1$-alkylene, and R$^1$, R$^{1*}$, R$^2$, R$^{2*}$, R$^3$, R$^{3*}$, R$^4$, R$^{4*}$, R$^5$, and R$^{5*}$ are each H, and R$^6$ is selected from hydrogen and C$_2$-hydroxyalkyl.

In one preferred embodiment, the polyamine is a polyethanolamine, which is commercially available under the trade name Lupasol® EO.

Subgroup (ii):

In one preferred embodiment of the invention, the at least one high-boiling solvent is an alcohol.

Alcohols generally include organic compounds in which at least one hydroxyl functional group (—OH) is bound to a carbon atom. It is to be understood that the alcohol molecule may further comprise other functional groups such as ether groups (—O—), e.g. in case of diethylene glycol or propylene glycol, or aryl groups, as e.g. in case of benzyl alcohol. Thus, exemplary alcohols include not only alkanols, i.e. alkyl molecules with at least one hydroxyl group, but also aromatic alcohols as well as ether alcohols.

Preferably, the alcohols as used herein comprise from 1 to 20 carbon atoms, preferably from 2 to 10 carbon atoms.

The term "alcohol" generally includes mono alcohols (one hydroxyl group), diols (two hydroxyl groups), and triols (three hydroxyl groups). Particularly preferred are alkylene glycols, i.e. 1,2-diols such as butylene glycol, propylene glycol or ethylene glycol, and dialkylene glycols such as diethylene glycol, and poly(alkylene) glycols such as poly(ethylene) glycol. Further preferred are triols such as glycerin.

Preferred alcohols as used herein may generically be represented by the formula R$^A$—OH, wherein R$^A$ is selected from the group consisting of C$_1$-C$_{20}$-alkyl, C$_1$-C$_{20}$-hydroxyalkyl, C$_1$-C$_4$-hydroxyalkyl-O—C$_1$-C$_4$-alkyl, and C$_6$-aryl-C$_1$-C$_4$-alky.

Organic moieties have already been defined above in connection with the (thio)phosphoric acid derivatives. In addition, it is noted that the term "hydroxyalkyl" is to be understood as an alkyl group as defined above being substituted with 1, 2, or 3, preferably 1 hydroxyl group. Furthermore, the term "$C_1$-$C_4$-hydroxyalkyl-O—$C_1$-$C_4$-alkyl" is to be understood as a group, wherein a $C_1$-$C_4$-hydroxyalkyl group is bound via an oxygen atom (—O—) to a $C_1$-$C_4$-alkyl group.

Especially preferred alcohols as used herein are represented by the formula $R^4$—OH, wherein $R^4$ is selected from the group consisting of $C_2$-$C_{10}$-alkyl, $C_2$-$C_{10}$-hydroxyalkyl, $C_1$-$C_4$-hydroxyalkyl-O—$C_1$-$C_4$-alkyl, and $C_6$-aryl-$C_1$-alky.

Thus, the alcohol as used herein is preferably selected from aromatic alcohols, alkylene glycols, dialkylene glycols, and glycerin.

In one preferred embodiment of the invention, the at least one high-boiling solvent is an aromatic alcohol according to the formula $R^{41}$—$C(R^{42})(R^{43})$—OH, wherein $R^{41}$ is $C_6$-$C_{20}$-aryl or $C_6$-$C_{20}$-aryl-$C_1$-$C_4$-alkyl, $R^{42}$ is $C_1$-$C_{20}$-alkyl or H, and $R^{43}$ is $C_1$-$C_{20}$-alkyl or H, and wherein preferably $R^{41}$ is $C_6$-aryl or $C_6$-aryl-$C_1$-$C_2$-alkyl, $R^{42}$ is $C_1$-$C_4$-alkyl or H, and $R^{43}$ is $C_1$-$C_4$-alkyl or H. Especially preferred is benzyl alcohol.

In another preferred embodiment of the invention, the at least one high-boiling solvent is a diol, which is represented by the general formula $C_nH_{2n}(OH)_2$, where n is 2 or more, preferably 2, 3, 4, 5, or 6. Exemplary diols in this connection include ethylene glycol, propylene glycol, 1,4-butanediol, 1,5-pentanediol, 1,6-hexanediol, 1,7-heptanediol, 1,8-octanediol, 1,9-nonanediol, 1,10-decanediol, 1,3-propanediol, 2,3-butanediol, 2,4-pentanediol, 2,5-hexanediol, 4,5-octanediol, and 3,4-hexanediol. Examples of other noncyclic diols are neopentyl glycol, pinacol, 2,2-diethyl-1,3-propanediol, isobutylene glycol, 2,3-dimethyl-1,3-propanediol, 1,3-diphenyl-1,3-propanediol, 3-methyl-1,3-butanediol. Examples of cyclic glycols are 1,4-cyclohexanedimethanol and p-xylene glycol. Examples of polyglycols are polyethylene glycols and polypropylene glycols.

In another preferred embodiment of the invention, the at least one high-boiling solvent is an alkylene glycol selected from the group consisting of butylene glycol, propylene glycol and ethylene glycol, and is preferably propylene glycol.

In another preferred embodiment of the invention, the at least one high-boiling solvent is a dialkylene glycol, which is preferably diethylene glycol.

In yet another preferred embodiment, the at least one high-boiling solvent is glycerin.

Subgroup (iii):

In one preferred embodiment of the invention, the at least one high-boiling solvent is a glycol ether.

Glycol ethers are typically based on ethylene glycol or propylene glycol as core structure, wherein one or both hydroxyl groups have been alkylated to form ether groups.

Preferred glycol ether may therefore be described by any one of the formulae $C_1$-$C_{20}$-alkyl-[O—$CH_2CH_2$]$_n$—OH, $C_1$-$C_{20}$-alkyl-[O—$CH_2CH_2$]$_n$—O—$C_1$-$C_{20}$-alkyl, $C_1$-$C_{20}$-alkyl-[O—$CH_2CH(CH_3)$]$_n$—OH, $C_1$-$C_{20}$-alkyl-[O—CH($CH_3$)$CH_2$]$_n$—OH, and $C_1$-$C_{20}$-alkyl-[O—$CH_2CH(CH_3)$]$_n$—O—$C_1$-$C_{20}$-alkyl, wherein n is 1, 2, 3, 4, or 5. Particularly preferred are glycol ethers of any one of the formulae $C_1$-$C_4$-alkyl-[O—$CH_2CH_2$]$_n$—OH, $C_1$-$C_4$-alkyl-[O—$CH_2CH_2$]$_n$—O—$C_1$-$C_4$-alkyl, $C_1$-$C_4$-alkyl-[O—$CH_2CH(CH_3)$]$_n$—OH, $C_1$-$C_4$-alkyl-[O—CH($CH_3$)$CH_2$]$_n$—OH, and $C_1$-$C_4$-alkyl-[O—$CH_2CH(CH_3)$]$_n$—O—$C_1$-$C_4$-alkyl, wherein n is 1, 2, or 3.

A preferred glycol ether is, e.g., triethylene glycol-n-butylether, which may serve as low-temperature stabilizer.

Subgroup (iv):

In one preferred embodiment of the invention, the at least one high-boiling solvent is a glycol thioether.

Preferred glycol thioethers have a similar structure as dialkylene glycols, but the oxygen atom forming the ether group is replaced by a sulfur atom. For example, thiodiglycol (HO—$CH_2CH_2$—S—$CH_2CH_2$—OH) has a similar structure as diethylene glycol (HO—$CH_2CH_2$—O—$CH_2CH_2$—OH).

Preferred glycol thioethers may thus be represented by the formula HO—$C_1$-$C_{20}$-alkyl-S—$C_1$-$C_{20}$-alkyl-OH, preferably by the formula HO—$C_1$-$C_4$-alkyl-S—$C_1$-$C_4$-alkyl-OH.

A preferred glycolthioether is, e.g., thiodiglycol.

Subgroup (v):

In one preferred embodiment of the invention, the at least one high-boiling solvent is an amino alcohol.

Amino alcohols may also be referred to as alkanol amines and are characterized in that they comprise at least one hydroxyl group and at least one amino group.

In one embodiment, amino alcohols may be represented by the formula $(H)_aN(C_1$-$C_{10}$-hydroxyalkyl$)_b$, preferably by the formula $(H)_aN(C_1$-$C_8$-hydroxyalkyl$)_b$ wherein a is 0 or 1, and b is 2 when a is 1 and 3 when a is 0. In this connection, it is to be understood that the term "hydroxyalkyl" defines an alkyl group, which comprises at least one, preferably 1, 2, or 3 hydroxyl groups, especially preferably one hydroxyl group. Exemplary hydroxyalkyl groups include hydroxymethyl, 2-hydroxyethyl, 2-hydroxypropyl, and 3-hydroxypropyl.

In one embodiment, it is preferred that the amino alcohol comprises not more than one amino group and at least three hydroxyl substituted $C_2$-$C_8$—, preferably $C_2$-$C_5$-alkyl groups, wherein at least one of these hydroxyl substituted alkyl groups is different from the other hydroxyl substituted alkyl groups.

It is even more preferred that the amino alcohol comprises not more than one amino group and at least three hydroxyl substituted $C_2$-$C_3$-alkyl groups, wherein at least one of these hydroxyl substituted alkyl groups is different from the other hydroxyl substituted alkyl groups.

It is even more preferred that the amino alcohol comprises not more than one amino group and at least three hydroxyl-substituted $C_2$-$C_3$-alkyl groups, which are covalently bound to the amino group, wherein at least one of these hydroxyl substituted alkyl groups is different from the other hydroxyl substituted alkyl groups.

In other embodiments of the invention, amino alcohols may be represented by the generic formula A $(H)_xN((CH_2)_n$—OH$)_m$, wherein m is 1, 2, or 3, x is 0 or 1, and n is 2 when x is 1 and 3 when x is 0, or by generic formula B $(H)_yN((CH_2)$—CHOH—$CH_3)_z$, such that the length of the carbon chain where the secondary hydroxyl group is located is 3, y is 0 or 1, and z is 2 when y is 1 and 3 when y is 0.

In another embodiment of the invention, amino alcohols may be represented by the formula $(C_1$-$C_4$-alkyl$)_2$N—($C_1$-$C_4$-alkylene)-N($C_1$-$C_4$-alkyl)($C_1$-$C_4$-hydroxyalkyl). An exemplary amino alcohol in this connection is N,N,N'-trimethylaminoethylethanolamine.

Preferred amino alcohols according to the invention may be selected from the group consisting of ethanolamine, diethanolamine, methyl diethanolamine, butyl diethanolamine, monoisopropanolamine, diisopropanolamine, methyl diisopropanolamine, triethanolamine, tetrahydroxypropylethylenediamine, trimethylaminoethylethanolamine, N,N-bis(2-hydroxyethyl)isopropanolamine, N,N,N'-trimethylaminoethylethanolamine, and N,N,N',N'-tetrakis(2-hydroxypropyl)ethylenediamine.

Preferred amino alcohols according to the invention include ethanolamine, diethanolamine, methyl diethanolamine, butyl diethanolamine, monoisopropanolamine, diisopropanolamine, methyl diisopropanolamine, triethanolamine, tetrahydroxypropylethylenediamine, and trimethylaminoethylethanolamine.

A preferred amino alcohol is triethanolamine, which may function as stabilizer of the (thio)phosphoric acid derivative after application on the urea fertilizer.

Another preferred amino alcohol is N,N-bis(2-hydroxyethyl)isopropanolamine, also known as diethanolisopropanolamine (DEIPA).

Another preferred amino alcohol is N,N,N'-trimethylaminoethylethanolamine (CAS [2212-32-0], available as Lupragen® N400 from BASF).

Another preferred amino alcohol is N,N,N',N'-tetrakis(2-hydroxypropyl)ethylenediamine (CAS [102-60-3]).

Subgroup (vi):
In one preferred embodiment of the invention, the at least one high-boiling solvent is an ether amine.

Ether amines are characterized in that they comprise at least one ether group and at least one amino group.

In one embodiment of the invention, the ether amines may be represented by the generic formula $NR^aR^b$—$(CH_2)_n$—$[O$—$(CH_2)_m]_p$—$NR^cR^d$, wherein n is 1, 2, 3, 4, or 5, m is 1, 2, 3, 4, or 5, p is 1, 2, 3, 4, or 5, and $R^a$, $R^b$, $R^c$, and $R^d$ are independently of each other selected from H and $C_1$-$C_4$-alkyl, or $R^a$ and $R^b$ and/or $R^c$ and $R^d$ may together with the nitrogen atom to which they are bound form a 5- to 10-membered, preferably 5- to 6-membered heterocyclic ring, wherein the heterocycle may comprise 1, 2, or 3 additional heteroatoms selected from N, O, and S, wherein the N atom if present is further substituted by H or $C_1$-$C_4$-alkyl. Preferably n is 1 or 2, m is 1 or 2, p is 1 or 2, $R^a$, $R^b$, $R^c$, and $R^d$ are each independently selected from $C_1$-$C_2$-alkyl, or $R^a$ and $R^b$ and $R^c$ and $R^d$ each together with the nitrogen atom to which they are bound form a 5- or 6-membered heterocyclic ring, wherein the heterocycle may comprise 1 additional heteroatom selected from N, O, and S, wherein the N-atom if present is further substituted by a $C_1$-$C_2$-alkyl group.

In one embodiment of the invention, the ether amines are heterocyclic 5- to 10-membered, preferably 5- or 6-membered rings comprising an oxygen atom and a nitrogen atom to form the required amino and ether groups, and wherein the nitrogen atom is further substituted by H, $C_1$-$C_{10}$-alkyl, $C_1$-$C_{10}$-haloalkyl, C(=O)H, or C(=O)$C_1$-$C_{10}$-alkyl. Particularly preferred are morpholine compounds, wherein the nitrogen atom is substituted by $C_1$-$C_4$-alkyl, $C_1$-$C_4$-haloalkyl, C(=O)H, or C(=O)$C_1$-$C_4$-alkyl, preferably by $C_1$-$C_4$-alkyl, C(=O)H, or C(=O)$CH_3$.

Preferred ether amines include dimorpholinodiethylether, bis(2-dimethyl-aminoethyl)ether, N-acetylmorpholine, and N-formylmorpholine.

In one preferred embodiment of the invention, the at least one high-boiling solvent is dimorpholinodiethylether (available as Lupragen® N106 from BASF).

In one preferred embodiment of the invention, the at least one high-boiling solvent is bis(2-dimethyl-aminoethyl)ether (CAS [3033-62-3], available as Lupragen® N205 from BASF).

In one preferred embodiment of the invention, the at least one high-boiling solvent is a morpholine compound selected from N-acetylmorpholine and N-formylmorpholine, which may advantageously serve as low-temperature stabilizers.

Subgroup (vii):
In one preferred embodiment of the invention, the at least one high-boiling solvent is an amine, preferably a tertiary amine.

As used herein, the term "amine" is to be understood as an organic compounds, in which at least one amino group is bound to a carbon atom. In a primary amine, an $NH_2$ group is bound to a carbon atom, in a secondary amine an $NR^AH$ group is bound to a carbon atom, and in a tertiary amine an $NR^AR^B$ group is bound to a carbon atom, wherein $R^A$ and $R^B$ may each individually be selected from $C_1$-$C_{20}$-alkyl, di($C_1$-$C_4$-alkyl)amino-$C_1$-$C_{20}$-alkyl, and a $C_1$-$C_4$-alkylene chain, which is bound to the carbon atom to which the $NR^AH$ or $NR^AR^B$ group is bound so that a heterocyclic ring is formed, or $R^A$ and $R^B$ may together with the nitrogen atom to which they are bound form a 5- to 10-membered, preferably 5- to 6-membered heterocyclic ring, wherein the heterocycle may comprise 1, 2, or 3 additional heteroatoms nitrogen atoms, and wherein the N atoms if present are each individually further substituted by H, $C_1$-$C_4$-alkyl, di($C_1$-$C_4$-alkyl) amino-$C_1$-$C_4$-alkyl, or by a $C_1$-$C_4$-alkylene chain, which is bound to the carbon atom to which the $NR^AR^B$ group is bound, so that a further heterocyclic ring is formed. If the carbon atom to which the $NH_2$, $NR^AH$, or $NR^AR^B$ group is bound is not part of a heterocyclic ring, which is formed with $R^A$ or $R^B$ it is preferably part of a $C_1$-$C_{20}$-alkyl group or a di($C_1$-$C_4$-alkyl)amino-$C_1$-$C_{20}$-alkyl group, so that the amino group may be represented by the formula $C_1$-$C_{20}$-alkyl-$NH_2$, $C_1$-$C_{20}$-alkyl-$NR^AH$, or $C_1$-$C_{20}$-alkyl-$NR^AR^B$ or by the formula di($C_1$-$C_4$-alkyl)amino-$C_1$-$C_{20}$-alkyl-$NH_2$, di($C_1$-$C_4$-alkyl)amino-$C_1$-$C_{20}$-alkyl-$NR^AH$, or di($C_1$-$C_4$-alkyl)amino-$C_1$-$C_{20}$-alkyl-$NR^AR^B$, wherein $R^A$ and $R^B$ may each individually be selected from $C_1$-$C_{20}$-alkyl, and di($C_1$-$C_4$-alkyl)amino-$C_1$-$C_{20}$-alkyl, or $R^A$ and $R^B$ may together with the nitrogen atom to which they are bound form a 5- to 10-membered, preferably 5- to 6-membered heterocyclic ring, wherein the heterocycle may comprise 1, 2, or 3 additional heteroatoms nitrogen atoms, and wherein the N atoms if present are each individually further substituted by H, $C_1$-$C_4$-alkyl, or di($C_1$-$C_4$-alkyl)amino-$C_1$-$C_4$-alkyl.

In one embodiment of the invention, the at least one high-boiling solvent is a tertiary amine. In a preferred embodiment of the invention, the at least one high-boiling solvent is a tertiary amine, wherein from 1 to 6, preferably 2 or 6 tertiary amino groups are present.

In one preferred embodiment of the invention, the at least one high-boiling solvent is a tertiary amine, wherein 2 tertiary amino groups are present, and which may be represented by the formula —$R^aR^bN$—($C_1$-$C_{10}$-alkylene)-$NR^cR^d$, wherein $R^a$, $R^b$, $R^c$, and $R^d$ are independently of each other selected from $C_1$-$C_4$-alkyl, or $R^a$ and $R^b$ and/or $R^c$ and $R^d$ may together with the nitrogen atom to which they are bound form a 5- to 10-membered, preferably 5- to 6-membered heterocyclic ring, wherein the heterocycle may comprise 1, 2, or 3 additional heteroatoms selected from N, O, and S, wherein the N atom if present is further substituted by $C_1$-$C_4$-alkyl. Preferably, $R^a$, $R^b$, $R^c$, and $R^d$ are independently of each other selected from $C_1$-$C_4$-alkyl.

In one embodiment of the invention, the at least one high-boiling solvent is selected from N,N,N',N'-tetramethyl-1,6-hexanediamine, N,N,N',N'-tetramethyl-1,3-propanediamine, N,N',N"-tris(dimethylaminopropyl)hexahydrotriazine, and triethylendiamine (DABCO).

In one preferred embodiment of the invention, the at least one high-boiling solvent is N,N,N',N'-tetramethyl-1,6-hexanediamine (CAS [111-18-2]).

In one preferred embodiment of the invention, the at least one high-boiling solvent is N,N,N',N'-tetramethyl-1,3-propanediamine (CAS [110-95-2]).

In one preferred embodiment of the invention, the at least one high-boiling solvent is N,N',N''-tris(dimethylaminopropyl)hexahydrotriazine.

In one preferred embodiment of the invention, the at least one high-boiling solvent is triethylendiamine (DABCO, available as Lupragen® N201 from BASF).

Subgroup (viii):

In one preferred embodiment of the invention, the at least one high-boiling solvent is a carboxylic acid amide.

Carboxylic acid amides are generally characterized by the functional group —C(=O)NR$^A$R$^B$, wherein R$^A$ and R$^B$ may preferably be each individually selected from H and $C_1$-$C_4$-alkyl, or wherein one of R$^A$ and R$^B$ forms together with the carbon atom of the —C(=O) moiety a carboxylic ring. Such cyclic carboxylic acid amides are referred to as lactams. Preferred are 5- or 6-membered lactams, especially 5-membered lactams, e.g. 2-pyrrolidones. Furthermore, it is preferred that the nitrogen atom of such lactams is further substituted by $C_1$-$C_4$-alkyl, C(=O)H, or C(=O)$C_1$-$C_4$-alkyl.

It is to be understood that the term "carboxylic acid amide" not only covers monoamides, i.e. organic compounds with one functional group —C(=O)ONR$^A$R$^B$, but also diamides, i.e. organic compounds with two functional groups —C(=O)ONR$^A$R$^B$, and triamides, i.e. organic compounds with three functional groups —C(=O)ONR$^A$R$^B$. In case of acyclic carboxylic acid amides, the one, two or three amide groups are preferably bound to a $C_1$-$C_{20}$-alkyl group or to a $C_6$-aryl group. In this connection, it is preferred that R$^A$ and R$^B$ are each individually selected from $C_1$-$C_8$-alkyl.

In one preferred embodiment of the invention, the at least one high-boiling solvent is N,N-dimethylbutyramide.

In one preferred embodiment of the invention, the at least one high-boiling solvent is N-formylpyrrolidone or N-methylpyrrolidone, which may serve as low-temperature stabilizers.

Subgroup (ix):

In one preferred embodiment of the invention, the at least one high-boiling solvent is a carboxylic acid ester.

Carboxylic acid esters are generally characterized by the functional group —C(=O)OR$^A$, wherein R$^A$ may preferably be selected from $C_1$-$C_{20}$-alkyl, or wherein one of R$^A$ forms together with the carbon atom of the —C(=O) moiety a carboxylic ring. Such cyclic carboxylic acid amides are referred to as lactones. Preferred are 5- or 6-membered lactones, especially 5-membered lactones.

It is to be understood that the term "carboxylic acid ester" not only covers monoesters, i.e. organic compounds with one functional group —C(=O)OR$^A$, but also diesters, i.e. organic compounds with two functional groups —C(=O)OR$^A$, and triesters, i.e. organic compounds with three functional groups —C(=O)OR$^A$. In case of acyclic carboxylic acid esters, the one, two or three ester groups are preferably bound to a $C_1$-$C_{20}$-alkyl group or to a $C_6$-aryl group. In this connection, it is preferred that R$^A$ is selected from $C_1$-$C_8$-alkyl.

In one preferred embodiment of the invention, the at least one high-boiling solvent is a carboxylic acid diester of the formula $C_1$-$C_8$-alkyl-OC(=O)—($C_1$-$C_{10}$-alkylene)-C(=O)O—$C_1$-$C_8$-alkyl. Preferred in this connection is di(2-ethylhexyl)adipate, dimethylsuccinate, or dimethyl 2-methylpentandioate.

Preferred acyclic esters include monoesters such octyl acetate, methyl phenylacetate, and diesters such as dimethyl 2-methylpentandioate.

In one preferred embodiment of the invention, the at least one high-boiling solvent is a carboxylic acid diester of the formula $C_1$-$C_8$-alkyl-OC(=O)-(phenylene)-C(=O)O—$C_1$-$C_8$-alkyl, $C_1$-$C_4$-alkyl-OC(=O)-(phenylene)-C(=O)O—$C_1$-$C_4$-alkyl. Preferred in this connection is diethylphthalate.

In one preferred embodiment of the invention, the at least one high-boiling solvent is a carboxylic acid ester of the formula $C_5$-$C_{20}$-alkyl-C(=O)O—$C_1$-$C_4$-alkyl, preferably $C_5$-$C_{20}$-alkyl-C(=O)O—$C_2$-alkyl. In a more preferred embodiment, the at least one high-boiling solvent is a $C_6$-$C_{14}$-alkylacetate, preferably a $C_6$-$C_{12}$-alkylacetate, more preferably a $C_6$-$C_{10}$-alkylacetate, most preferably a $C_7$-$C_{10}$-alkylacetate. Particularly preferred $C_5$-$C_{20}$-alkylacetates are hexyl acetate, heptyl acetate, octyl acetate, nonyl acetate, decyl acetate, in particular octyl acetate.

In one preferred embodiment of the invention, the at least one high-boiling solvent is a lactone. A preferred lactone is, e.g., epsilon-caprolactone.

Subgroup (x):

In one preferred embodiment of the invention, the at least one high-boiling solvent is a ketone.

Ketones are generally characterized by the functional group C(=O). Preferred are $C_5$-$C_{20}$-alkyl ketones, wherein the keto group C=O may be present at any position of the alkyl chain. Furthermore, preferred are cyclic ketones, preferably 5- or 6-membered cyclic ketones.

A preferred cyclic ketone is cyclohexanone.

Subgroup (xi):

In one preferred embodiment of the invention, the at least one high-boiling solvent is a carbonate ester or a urea. Preferred are cyclic carbonate esters, wherein the oxygen atoms of the carbonate group —O—C(=O)—O— are linked by a $C_2$-$C_3$-alkylene chain. Furthermore, preferred are cyclic urea compounds, wherein the nitrogen atoms of the urea group —NR$^A$—C(=O)—NR$^B$— are linked by a $C_2$-$C_3$-alkylene chain, and wherein R$^A$ and R$^B$ are independently selected from H and $C_1$-$C_4$-alkyl.

A preferred cyclic carbonate is propylene carbonate.

A preferred cyclic urea is N,N-dimethylethylene urea.

Subgroup (xii):

In one preferred embodiment of the invention, the at least one high-boiling solvent is a sulfoxide.

Preferred sulfoxides are represented by the formula R$^A$S(O)$_x$R$^B$, wherein R$^A$ and R$^B$ are each independently selected from $C_1$-$C_6$-alkyl, $C_6$-aryl, and $C_6$-aryl-$C_1$-$C_4$-alkyl or R$^A$ and R$^B$ together with the sulfur atom to which they are bound form a 4- to 8-membered ring wherein R$^A$ and R$^b$ together represent a $C_1$-$C_6$-alkylene group which optionally contains one or more atoms selected from the group consisting of O, S, Se, Te, N, and P in the ring, and wherein x is 1 or 2.

A preferred sulfoxide is dimethylsulfoxide, which may serve as low-temperature stabilizer.

In one embodiment of the invention, the at least one high-boiling solvent of component (1b) of mixture (1) is selected from the group consisting of polyethylene imine, $C_5$-$C_{20}$-alkyl acetates, propylene glycol, diethylene glycol, glycerin, triethyleneglycol-n-butylether, thiodiglycol, diethanolisopropanolamine, N,N,N'-trimethylaminoethylethanolamine, N,N,N',N'-tetrakis(2-hydroxypropyl)ethylenediamine, dimorpholinodiethylether, bis(2-dimethyl-aminoethyl)ether, N-acetyl morpholine, N,N,N',N'-tetramethyl-1,6-hexanediamine, N,N,N',N'-tetramethyl-1,3-propanediamine, N,N',N''-tris(dimethylaminopropyl)

hexahydrotriazine, triethylendiamine (DABCO), N,N-dimethylbutyramide, N-formyl pyrrolidone, N-methyl pyrrolidone, dimethyl-2-methylpentandioate, 2-ethylhexyl lactate, dimethylsulfoxide, benzyl alcohol, cyclohexanone, propylene carbonate, N,N-dimethyl octanamide, N,N-dimethyl decanamide, 2-ethylhexanol, N,N-dimethylethylene urea, methyl oleate, tocopherol acetate, N,N-dimethyllauric amide, N,N-dimethylmyristic amide, N-[2-(acetyloxy)ethyl]-N-methyl acetamide, methyl caprylate, methyl laurate, methyl palmitate, capric/caprylic triglyceride, N,N-dimethyl lactamide, triethanolamine, 1,1',1",1"'-ethylenedinitrilotetrapropan-2-ol, N,N,N',N',N",N"-hexamethyl-1,3,5-triazin-1,3,5(2H,4H,6H)-tripropanamin, 2-propylheptan-1-ol, n-acetylmorpholine, isopropanol, n-formylmorpholine, dimethyl succinate, di(2-ethylhexyl) adipate, and diethyl phthalate.

In one embodiment of the invention, the at least one high-boiling solvent of component (1b) of mixture (1) is
- an amino alcohol, preferably diethanolisopropanolamine or triethanolamine; or
- propylene glycol; or
- a polyalkyleneimine, preferably polyethyleneimine; or
- a $C_5$-$C_{20}$-alkylacetate, preferably a $C_6$-$C_{20}$-alkylacetate, more preferably a $C_7$-$C_{20}$-alkylacetate; or
- a tertiary amine or an etheramine or a tertiary lactam; or
- dimethylsulfoxide.

In one embodiment of the invention, the at least one high-boiling solvent of component (1b) of mixture (1) is selected from the group consisting of triethanolamine, dimethylsulfoxide, propylene glycol, polyalkyleneimine, and $C_5$-$C_{20}$-alkylacetate.

In one preferred embodiment of the invention, the at least one high-boiling solvent of component (1b) of mixture (1) is a polyalkyleneimine, preferably polyethylene imine. As already indicated above, polyethyleneimines may function as stabilizers of the (thio)phosphoric acid derivative after application on the urea, and are therefore of particular advantage in a formulation of the (thio)phosphoric acid derivative of the invention.

In one preferred embodiment of the invention, the at least one high-boiling solvent of component (1b) of mixture (1) is triethanolamine, dimethylsulfoxide, or propylene glycol, preferably triethanolamine. Triethanolamine is particularly advantageous due to its high boiling point of 360° C., and as it may also function as a stabilizer of the (thio)phosphoric acid derivative after application on the urea fertilizer, and is therefore of particular advantage in a formulation of the (thio)phosphoric acid derivative of the invention.

In one embodiment of the invention, the at least one high-boiling solvent of component (1b) of mixture (1) is a $C_5$-$C_{20}$-alkylacetate, preferably a $C_6$-$C_{20}$-alkylacetate, more preferably a $C_7$-$C_{20}$-alkylacetate.

These long chain acyclic esters are characterized by rather high boiling points in comparison to e.g. ethyl acetate. The use of these high-boiling alkylacetates is advantageous not only for the recovery process of the invention, but also as these compounds may function as fragrances in a formulation of the (thio)phosphoric acid derivative according to the invention, so that there is no need to separate these compounds from the (thio)phosphoric acid derivative. In addition, these high-boiling solvents may already be used as co-solvents in the preparation of the (thio)phosphoric acid derivative.

As used herein, the term "alkylacetate" refers to an alkyl ester of acetic acid. As already indicated above, the term "alkyl" includes straight-chain or branched alkyl groups. The prefix $C_n$-$C_m$ indicates in each case the possible number of carbon atoms of the alkyl group, which may be in the range of from 5 to 20, preferably 6 to 20, more preferably 7 to 20 in connection with the above mentioned alkylacetates for use as high-boiling solvents.

In a preferred embodiment, the at least one high-boiling solvent of component (1b) of mixture (1) is a $C_6$-$C_{14}$-alkylacetate, preferably a $C_6$-$C_{12}$-alkylacetate, more preferably a $C_6$-$C_{10}$-alkylacetate, most preferably a $C_7$-$C_{10}$-alkylacetate.

Particularly preferred $C_5$-$C_{20}$-alkylacetates are hexyl acetate, heptyl acetate, octyl acetate, nonyl acetate, decyl acetate, in particular octyl acetate.

In one embodiment of the invention, the at least one high-boiling solvent of component (1b) of mixture (1) is a solvent, which does not comprise a hydroxyl or primary amino group, and is preferably a tertiary amine or an ether amine or a tertiary lactam. Thus, the high-boiling solvent may preferably be aprotic and may act as a base. Preferably, these high-boiling solvents can act as HCl scavengers.

Preferred ether amines in this connection include morpholine derivatives, in particular N-acetyl morpholine or N-formyl morpholine. Preferred tertiary lactams include pyrrolidone derivatives, in particular N-methylpyrrolidone or N-formylpyrrolidone. As already indicated above, these high-boiling solvents are particularly advantageous not only for the recovery process of the invention, but also as these compounds may serve as low-temperature stabilizers in a formulation of the (thio)phosphoric acid derivative(s). In addition, these high-boiling solvents may already be used as HCl scavengers in the preparation of the (thio)phosphoric acid derivative(s).

Preferred ether amines further include, e.g., dimorpholinodiethylether (available as Lupragen® N106 from BASF SE) and bis(2-dimethyl-aminoethyl)ether. Also these etheramines provide the advantage that they can be used as HCl scavengers in the preparation of the (thio)phosphoric acid derivative(s), are suitable for the recovery process according to the present invention, and represent suitable solvents, additives, or auxiliaries in the formulation of the (thio)phosphoric acid derivative(s).

Preferred tertiary amines include N,N,N',N'-Tetramethyl-1,6-hexanediamine, N,N,N',N'-Tetramethyl-1,3-propanediamine, and Triethylendiamine (DABCO). These tertiary amines can also be used as HCl scavengers in the preparation of the (thio)phosphoric acid derivative(s), are suitable for the recovery process according to the present invention, and represent suitable solvents, additives, or auxiliaries in the formulation of the (thio)phosphoric acid derivative(s).

The following high-boiling solvents as defined in table HBS are particularly preferred according to the invention, and the numbering will be used hereinafter. Thus, in one embodiment of the present invention, the at least one high-boiling solvent is selected from any one of the high-boiling solvents listed in the following table HBS.

TABLE HBS

| No. | High-boiling solvent |
|---|---|
| HBS-1 | Polyethyleneimine |
| HBS-2 | Benzyl alcohol |
| HBS-3 | Glycerin |
| HBS-4 | Propylene glycol |
| HBS-5 | Diethylene glycol |
| HBS-6 | Triethyleneglycol-n-butylether |
| HBS-7 | Thiodiglycol |
| HBS-8 | Triethanolamine |

TABLE HBS-continued

| No. | High-boiling solvent |
|---|---|
| HBS-9 | Diethanolisopropanolamine (DEIPA) |
| HBS-10 | N,N,N'-Trimethylaminoethylethanolamine |
| HBS-11 | N,N,N',N'-Tetrakis(2-hydroxypropyl)ethylenediamine |
| HBS-12 | Dimorpholinodiethylether |
| HBS-13 | Bis(2-dimethyl-aminoethyl)ether |
| HBS-14 | N-Formyl morpholine |
| HBS-15 | N-Acetyl morpholine |
| HBS-16 | N,N,N',N'-Tetramethyl-1,6-hexanediamine |
| HBS-17 | N,N,N',N'-Tetramethyl-1,3-propanediamine |
| HBS-18 | N,N',N''-tris(dimethylaminopropyl)hexahydrotriazine |
| HBS-19 | Triethylendiamine (DABCO) |
| HBS-20 | N,N-Dimethylbutyramide |
| HBS-21 | N-Formyl pyrrolidone |
| HBS-22 | N-Methyl pyrrolidone |
| HBS-23 | Di(2-ethylhexyl)adipate |
| HBS-24 | Dimethylsuccinate |
| HBS-25 | Dimethyl-2-methylpentandioate |
| HBS-26 | Diethylphthalate |
| HBS-27 | Hexyl acetate |
| HBS-28 | Heptyl acetate |
| HBS-29 | Octyl acetate |
| HBS-30 | Epsilon-caprolactone |
| HBS-31 | Dimethylsulfoxide |
| HBS-32 | Methyl phenylacetate |

It is to be understood that the above preferences with regard to component (1a) of mixture (1) and with regard to component (1b) of mixture (1) are also preferred in combination. For example, the following combinations of components (1a) and (1b) according to Table 1 are preferred for mixture (1) according to the present invention:

TABLE 1

| M (1) | Comp. (1a) | Comp. (1b) |
|---|---|---|
| (1)-1 | NBPT | HBS-1 |
| (1)-2 | NPPT | HBS-1 |
| (1)-3 | NBPT + NPPT | HBS-1 |
| (1)-4 | NBPT | HBS-2 |
| (1)-5 | NPPT | HBS-2 |
| (1)-6 | NBPT + NPPT | HBS-2 |
| (1)-7 | NBPT | HBS-3 |
| (1)-8 | NPPT | HBS-3 |
| (1)-9 | NBPT + NPPT | HBS-3 |
| (1)-10 | NBPT | HBS-4 |
| (1)-11 | NPPT | HBS-4 |
| (1)-12 | NBPT + NPPT | HBS-4 |
| (1)-13 | NBPT | HBS-5 |
| (1)-14 | NPPT | HBS-5 |
| (1)-15 | NBPT + NPPT | HBS-5 |
| (1)-16 | NBPT | HBS-6 |
| (1)-17 | NPPT | HBS-6 |
| (1)-18 | NBPT + NPPT | HBS-6 |
| (1)-19 | NBPT | HBS-7 |
| (1)-20 | NPPT | HBS-7 |
| (1)-21 | NBPT + NPPT | HBS-7 |
| (1)-22 | NBPT | HBS-8 |
| (1)-23 | NPPT | HBS-8 |
| (1)-24 | NBPT + NPPT | HBS-8 |
| (1)-25 | NBPT | HBS-9 |
| (1)-26 | NPPT | HBS-9 |
| (1)-27 | NBPT + NPPT | HBS-9 |
| (1)-28 | NBPT | HBS-10 |
| (1)-29 | NPPT | HBS-10 |
| (1)-30 | NBPT + NPPT | HBS-10 |
| (1)-31 | NBPT | HBS-11 |
| (1)-32 | NPPT | HBS-11 |
| (1)-33 | NBPT + NPPT | HBS-11 |
| (1)-34 | NBPT | HBS-12 |
| (1)-35 | NPPT | HBS-12 |
| (1)-36 | NBPT + NPPT | HBS-12 |
| (1)-37 | NBPT | HBS-13 |
| (1)-38 | NPPT | HBS-13 |
| (1)-39 | NBPT + NPPT | HBS-13 |
| (1)-40 | NBPT | HBS-14 |
| (1)-41 | NPPT | HBS-14 |
| (1)-42 | NBPT + NPPT | HBS-14 |
| (1)-43 | NBPT | HBS-15 |
| (1)-44 | NPPT | HBS-15 |
| (1)-45 | NBPT + NPPT | HBS-15 |
| (1)-46 | NBPT | HBS-16 |
| (1)-47 | NPPT | HBS-16 |
| (1)-48 | NBPT + NPPT | HBS-16 |
| (1)-49 | NBPT | HBS-17 |
| (1)-50 | NPPT | HBS-17 |
| (1)-51 | NBPT + NPPT | HBS-17 |
| (1)-52 | NBPT | HBS-18 |
| (1)-53 | NPPT | HBS-18 |
| (1)-54 | NBPT + NPPT | HBS-18 |
| (1)-55 | NBPT | HBS-19 |
| (1)-56 | NPPT | HBS-19 |
| (1)-57 | NBPT + NPPT | HBS-19 |
| (1)-58 | NBPT | HBS-20 |
| (1)-59 | NPPT | HBS-20 |
| (1)-60 | NBPT + NPPT | HBS-20 |
| (1)-61 | NBPT | HBS-21 |
| (1)-62 | NPPT | HBS-21 |
| (1)-63 | NBPT + NPPT | HBS-21 |
| (1)-64 | NBPT | HBS-22 |
| (1)-65 | NPPT | HBS-22 |
| (1)-66 | NBPT + NPPT | HBS-22 |
| (1)-67 | NBPT | HBS-23 |
| (1)-68 | NPPT | HBS-23 |
| (1)-69 | NBPT + NPPT | HBS-23 |
| (1)-70 | NBPT | HBS-24 |
| (1)-71 | NPPT | HBS-24 |
| (1)-72 | NBPT + NPPT | HBS-24 |
| (1)-73 | NBPT | HBS-25 |
| (1)-74 | NPPT | HBS-25 |
| (1)-75 | NBPT + NPPT | HBS-25 |
| (1)-76 | NBPT | HBS-26 |
| (1)-77 | NPPT | HBS-26 |
| (1)-78 | NBPT + NPPT | HBS-26 |
| (1)-79 | NBPT | HBS-27 |
| (1)-80 | NPPT | HBS-27 |
| (1)-81 | NBPT + NPPT | HBS-27 |
| (1)-82 | NBPT | HBS-28 |
| (1)-83 | NPPT | HBS-28 |
| (1)-84 | NBPT + NPPT | HBS-28 |
| (1)-85 | NBPT | HBS-29 |
| (1)-86 | NPPT | HBS-29 |
| (1)-87 | NBPT + NPPT | HBS-29 |
| (1)-88 | NBPT | HBS-30 |
| (1)-89 | NPPT | HBS-30 |
| (1)-90 | NBPT + NPPT | HBS-30 |
| (1)-91 | NBPT | HBS-31 |
| (1)-92 | NPPT | HBS-31 |
| (1)-93 | NBPT + NPPT | HBS-31 |
| (1)-94 | NBPT | HBS-32 |
| (1)-95 | NPPT | HBS-32 |
| (1)-96 | NBPT + NPPT | HBS-32 |

NBPT = N-(n-butyl)thiophosphoric acid triamide
NPPT = N-(n-propyl)thiophosphoric acid triamide In one embodiment of the invention, components (1a) and (1b) of mixture (1), which have been defined in detail above, are together present in an amount of at least 75 wt.-%, preferably at least 85 wt.-%, more preferably at least 90 wt.-%, most preferably at least 95 wt.-%, based on the total weight of mixture (1). It is especially preferred that components (1a) and (1b) of mixture (1) are together present in an amount of at least 95 wt.-%, based on the total weight of mixture (1).

In one embodiment of the invention, components (1a) and (1b) of mixture (1) are present in a weight ratio of from 90:10 to 10:90, preferably 90:10 to 30:70, more preferably 80:20 to 40:60, most preferably from 70:30 to 40:60.

Secondly, mixture (2), from which components (2c) and (2d) are evaporated to recover mixture (1) according to the process of the invention, is described in further detail. As already indicated above, mixture (2) comprises as component (2a) component (1a) of mixture (1) as defined above; as component (2b) components (1b) of mixture (1) as defined above; as component (2c) at least one solvent having a boiling point, which is at least 30° C. lower than the boiling point of the at least one high-boiling solvent of component (1b) of mixture (1); and as component (2d) optionally at least one HCl scavenger having a boiling point, which is at least 30° C. lower than the boiling point of the at least one high-boiling solvent of component (1b) of mixture (1).

Typically, mixture (2) can be formed from the product mixture obtained after the two reactions, which are typically performed in the preparation of (thio)phosphoric acid derivatives, and which are described above. As outlined above, the two reactions are preferably performed such that the solvent(s) of the two reactions, and also the HCl scavenger of the first reaction may be contained in the resulting product mixture. With regard to the preparation of (thio) phosphoric acid derivatives in the form of such mixture with solvent and base, it is again referred to the prior art references cited above, i.e. U.S. Pat. No. 5,770,771 A, DE 10 2005 053 541 A1, and WO 2009/121786, which are herewith incorporated by reference. The preparation of (thio)phosphoric acid derivatives may be performed as a continuous or batch-wise process, preferably as a batch-wise process. After the first reaction, a mixture comprising a solvent, the HCl scavenger in protonated form, and, e.g., the N-hydrocarbylamino(thio)phosphoryl dichloride is obtained. To said mixture, additional solvent and ammonia may then be added to perform the second reaction. The formed ammonium chloride may be removed by washing the organic phase comprising the desired (thio)phosphoric acid derivative with water. Due to the excess of ammonia used in the second reaction, the HCl scavenger of the first reaction will again be present in deprotonated form, and may therefore at least partly be maintained in the organic phase (for details reference is made to WO 2007/054392). The excess ammonia may be removed by distillation. Thus, the resulting product mixture comprises the desired product, at least one solvent, and optionally at least one HCl scavenger. At least parts of the solvent and optionally residual ammonia may be removed by distillation to provide a concentrated product mixture. According to the present invention, at least one high-boiling solvent may then be added to said concentrated product mixture to form a mixture corresponding to mixture (2) and to perform the recovery process as described herein to obtain mixture (1). It is noted that, alternatively, the high-boiling solvent may already be present in the concentrated product mixture, if the high-boiling solvent was already added in the preparation process of the (thio)phosphoric acid ester, e.g., for use as a co-solvent or as an HCl scavenger.

The following definitions and preferred embodiments apply with regard to components (2a), (2b), (2c), and (2d) of mixture (2). It is to be understood that in particular the preferences regarding the at least one solvent having a boiling point, which is at least 30° C. lower than the boiling point of the at least one high-boiling solvent, and regarding the at least one HCl scavenger having a boiling point, which is at least 30° C. lower than the boiling point of the at least one high-boiling solvent apply to the above defined use and the above defined process of the invention as well as to the above defined mixture (2) of the invention, irrespective of whether it is explicitly referred to components (2c) and (2d), respectively.

Preferred embodiments of component (2a) of mixture (2) correspond to the preferred embodiments of component (1a) of mixture (1).

Preferred embodiments of component (2b) of mixture (2) correspond to the preferred embodiments of component (1b) of mixture (1).

As used herein, the term "solvent" in connection with component (2c) of mixture (2) refers to an organic solvent, preferably an aprotic solvent. As mixture (2) is typically obtained after the two reactions of preparing the (thio) phosphoric acid derivatives as described above, the solvent, which is component (2c) of mixture (2) is preferably a solvent, which is suitable for the performed esterification and amidation reactions, respectively.

It is to be understood that component (2c) of mixture (2) may comprise either one or more than one, e.g. two or three, solvents, which is indicated by the expression "at least one solvent".

Thus, one solvent or a mixture of solvents may be present in mixture (2). However, it is preferred that component (2c) of mixture (2) comprises only one solvent. Accordingly, in preferred embodiments of the invention the term "at least one solvent" is to be understood as "a solvent" or "one solvent".

In one embodiment of the invention, the at least one solvent of component (2c) of mixture (2) has a boiling point of at most 130° C., preferably at most 100° C., more preferably at most 85° C.

As used herein above and below, the boiling points are to be understood as boiling points under atmospheric pressure.

In one embodiment, the at least one solvent has a boiling point of at most 130° C.

In one embodiment, the at least one solvent has a boiling point of at most 120° C.

In one embodiment, the at least one solvent has a boiling point of at most 110° C.

In one embodiment, the at least one solvent has a boiling point of at most 100° C.

In one embodiment, the at least one solvent has a boiling point of at most 90° C.

In one embodiment, the at least one solvent has a boiling point of at most 85° C.

In one embodiment of the invention, the at least one solvent of component (2c) of mixture (2) has a boiling point of from 40° C. to 120° C., preferably from 55° C. to 90° C., more preferably 60 to 85° C.

In one embodiment of the invention, the at least one solvent of component (2c) of mixture (2) has a boiling point, which is at least 40° C., preferably at least 50° C., more preferably at least 60° C., most preferably at least 80° C., lower than the boiling point of the at least one high-boiling solvent of component (1b) of mixture (1). In one embodiment of the invention, the at least one solvent of component (2c) of mixture (2) is an aprotic solvent, preferably a polar aprotic solvent. Furthermore, the solvent is preferably chemically inert, so that it does not chemically react with other compounds, e.g. under the reaction conditions of the preparation of the (thio)phosphoric acid derivative, or under the conditions of the recovery of mixture (1) according to the present invention.

In one preferred embodiment of the invention, the at least one solvent of component (2c) of mixture (2) is selected from liquid paraffinic, cycloparaffinic, and/or aromatic hydrocarbons, liquid halocarbons and halohydrocarbons, ethers, esters, and other organic liquids. Ethers, especially cyclic ethers, such as 1,4-dioxane, 1,3-dioxolane, tetrahydrofuran, methyltetrahydrofuran, and tetrahydropyran, are preferred. Furthermore, esters, in particular acyclic carboxylic acid esters, preferably $C_1$-$C_4$-alkylacetates, such as ethylacetate, are preferred.

In a particularly preferred embodiment of the invention, the at least one solvent of component (2c) of mixture (2) is an ether or a carboxylic acid ester, preferably a cyclic ether or an acyclic carboxylic acid ester, more preferably tetrahydrofuran, 2-methyltetrahydrofuran, or ethyl acetate. Alternatively, combinations of any of these solvents may be present as component (2c) of mixture (2), for example tetrahydrofuran and 2-methyltetrahydrofuran, tetrahydrofuran and ethyl acetate, or 2-methyltetrahydrofuran and ethyl acetate.

In one particularly preferred embodiment, the at least one solvent of component (2c) of mixture (2) is tetrahydrofuran.

In one particularly preferred embodiment, the at least one solvent of component (2c) of mixture (2) is 2-methyltetrahydrofuran.

In one particularly preferred embodiment, the at least one solvent of component (2c) of mixture (2) is ethylacetate.

As already indicated above, the at least one high-boiling solvent, which is provided in mixture (2) to obtain mixture (1), is selected as such that the required difference between the boiling points of the volatile components of mixture (2) and the at least one high-boiling solvent of at least 30° C. is obtained. Typical combinations A of high-boiling solvents according to component (2b) of mixture (2) and solvents according to component (2c) of mixture (2) are defined in the following table A.

TABLE A

| A | Comp. (2b) | Comp. (2c) |
|---|---|---|
| (A)-1 | HBS-1 | EtOAc |
| (A)-2 | HBS-1 | THF |
| (A)-3 | HBS-1 | $CH_3$—THF |
| (A)-4 | HBS-2 | EtOAc |
| (A)-5 | HBS-2 | THF |
| (A)-6 | HBS-2 | $CH_3$—THF |
| (A)-7 | HBS-3 | EtOAc |
| (A)-8 | HBS-3 | THF |
| (A)-9 | HBS-3 | $CH_3$—THF |
| (A)-10 | HBS-4 | EtOAc |
| (A)-11 | HBS-4 | THF |
| (A)-12 | HBS-4 | $CH_3$—THF |
| (A)-13 | HBS-5 | EtOAc |
| (A)-14 | HBS-5 | THF |
| (A)-15 | HBS-5 | $CH_3$—THF |
| (A)-16 | HBS-6 | EtOAc |
| (A)-17 | HBS-6 | THF |
| (A)-18 | HBS-6 | $CH_3$—THF |
| (A)-19 | HBS-7 | EtOAc |
| (A)-20 | HBS-7 | THF |
| (A)-21 | HBS-7 | $CH_3$—THF |
| (A)-22 | HBS-8 | EtOAc |
| (A)-23 | HBS-8 | THF |
| (A)-24 | HBS-8 | $CH_3$—THF |
| (A)-25 | HBS-9 | EtOAc |
| (A)-26 | HBS-9 | THF |
| (A)-27 | HBS-9 | $CH_3$—THF |
| (A)-28 | HBS-10 | EtOAc |
| (A)-29 | HBS-10 | THF |
| (A)-30 | HBS-10 | $CH_3$—THF |
| (A)-31 | HBS-11 | EtOAc |
| (A)-32 | HBS-11 | THF |
| (A)-33 | HBS-11 | $CH_3$—THF |
| (A)-34 | HBS-12 | EtOAc |
| (A)-35 | HBS-12 | THF |
| (A)-36 | HBS-12 | $CH_3$—THF |
| (A)-37 | HBS-13 | EtOAc |

TABLE A-continued

| A | Comp. (2b) | Comp. (2c) |
|---|---|---|
| (A)-38 | HBS-13 | THF |
| (A)-39 | HBS-13 | $CH_3$—THF |
| (A)-40 | HBS-14 | EtOAc |
| (A)-41 | HBS-14 | THF |
| (A)-42 | HBS-14 | $CH_3$—THF |
| (A)-43 | HBS-15 | EtOAc |
| (A)-44 | HBS-15 | THF |
| (A)-45 | HBS-15 | $CH_3$—THF |
| (A)-46 | HBS-16 | EtOAc |
| (A)-47 | HBS-16 | THF |
| (A)-48 | HBS-16 | $CH_3$—THF |
| (A)-49 | HBS-17 | EtOAc |
| (A)-50 | HBS-17 | THF |
| (A)-51 | HBS-17 | $CH_3$—THF |
| (A)-52 | HBS-18 | EtOAc |
| (A)-53 | HBS-18 | THF |
| (A)-54 | HBS-18 | $CH_3$—THF |
| (A)-55 | HBS-19 | EtOAc |
| (A)-56 | HBS-19 | THF |
| (A)-57 | HBS-19 | $CH_3$—THF |
| (A)-58 | HBS-20 | EtOAc |
| (A)-59 | HBS-20 | THF |
| (A)-60 | HBS-20 | $CH_3$—THF |
| (A)-61 | HBS-21 | EtOAc |
| (A)-62 | HBS-21 | THF |
| (A)-63 | HBS-21 | $CH_3$—THF |
| (A)-64 | HBS-22 | EtOAc |
| (A)-65 | HBS-22 | THF |
| (A)-66 | HBS-22 | $CH_3$—THF |
| (A)-67 | HBS-23 | EtOAc |
| (A)-68 | HBS-23 | THF |
| (A)-69 | HBS-23 | $CH_3$—THF |
| (A)-70 | HBS-24 | EtOAc |
| (A)-71 | HBS-24 | THF |
| (A)-72 | HBS-24 | $CH_3$—THF |
| (A)-73 | HBS-25 | EtOAc |
| (A)-74 | HBS-25 | THF |
| (A)-75 | HBS-25 | $CH_3$—THF |
| (A)-76 | HBS-26 | EtOAc |
| (A)-77 | HBS-26 | THF |
| (A)-78 | HBS-26 | $CH_3$—THF |
| (A)-79 | HBS-27 | EtOAc |
| (A)-80 | HBS-27 | THF |
| (A)-81 | HBS-27 | $CH_3$—THF |
| (A)-82 | HBS-28 | EtOAc |
| (A)-83 | HBS-28 | THF |
| (A)-84 | HBS-28 | $CH_3$—THF |
| (A)-85 | HBS-29 | EtOAc |
| (A)-86 | HBS-29 | THF |
| (A)-87 | HBS-29 | $CH_3$—THF |
| (A)-88 | HBS-30 | EtOAc |
| (A)-89 | HBS-30 | THF |
| (A)-90 | HBS-30 | $CH_3$—THF |
| (A)-91 | HBS-31 | EtOAc |
| (A)-92 | HBS-31 | THF |
| (A)-93 | HBS-31 | $CH_3$—THF |
| (A)-94 | HBS-32 | EtOAc |
| (A)-95 | HBS-32 | THF |
| (A)-96 | HBS-32 | $CH_3$—THF |

EtOAc = Ethylacetate
THF = Tetrahydrofurane
$CH_3$—THF = 2-methyltetrahydrofuran As used herein, the term "HCl scavenger" in connection with component (2d) of mixture (2) refers to base, which may be present in mixture (2) for the reasons outlined above. Typically, the HCl scavenger is present in its deprotonated form in mixture (2).

A skilled person understands that the term "HCl scavenger" covers any compound, which is suitable for taking up protons, in the present case protons, which are set free in the preparation of the (thio)phosphoric acid derivatives. In other words, a HCl scavenger is preferably to be understood as a base, and is preferably a tertiary amine.

It is to be understood that component (2d) of mixture (2) may comprise either one or more than one, e.g. two or three, HCl scavenger, which is indicated by the expression "at least one HCl scavenger". Thus, one HCl scavenger or a mixture of HCl scavengers may be present in mixture (2). However, it is preferred that component (2d) of mixture (2) comprises only one HCl scavenger. Accordingly, in preferred embodiments of the invention the term "at least one HCl scavenger" is to be understood as "a HCl scavenger" or "one HCl scavenger".

In one embodiment of the invention, the at least one HCl scavenger of component (2d) of mixture (2) has a boiling point, which is at most 180° C., preferably at most 160° C.

In one embodiment of the invention, the at least one HCl scavenger of component (2d) of mixture (2) has a boiling point, which is at least 40° C., preferably at least 50° C., more preferably at least 60° C., most preferably at least 80° C., lower than the boiling point of the at least one high-boiling solvent of component (1b) of mixture (1).

In one embodiment of the invention, the at least one HCl scavenger of component (2d) of mixture (2) has a boiling point of from 40° C. to 160° C., preferably from 80° C. to 160° C.

In one embodiment of the invention, the at least one HCl scavenger of component (2d) of mixture (2) has a boiling point, which is at least 40° C., preferably at least 50° C., more preferably at least 60° C., most preferably at least 80° C., lower than the boiling point of the at least one high-boiling solvent of component (1b) of mixture (1).

Suitable HCl scavengers according to the invention include heterocyclic tertiary amines, such as pyridine, 4-chloropyridine, 3-ethynylpyridine, 4-ethylpyridine, 2-picoline, 3-picoline, 4-picoline, or trialkyl amines selected from N,N-diethylmethylamine, triethylamine, tri-n-propylamine, and tri-sec-butylamine. Relatively low-boiling tertiary amines such as pyridine, 2-picoline, N,N-diethylmethylamine, and triethylamine, especially triethylamine, can be preferred. In addition, tri-n-propylamine is particularly preferred according to the present invention.

In one embodiment of the invention, the at least one HCl scavenger of component (2d) of mixture (2) is therefore a tertiary amine, preferably triethylamine or tri-n-propylamine, more preferably tri-n-propylamine.

As already indicated above, the at least one high-boiling solvent, which is provided in mixture (2) to obtain mixture (1), is selected as such that the required difference between the boiling points of the volatile components of mixture (2) and the at least one high-boiling solvent of at least 30° C. is obtained. It is noted that, as component (2d) of mixture (2) typically has a higher boiling point than component (2c) of mixture (2), component (2d), if present, will typically predetermine the high-boiling solvent as component (2b) of mixture (2), in order to establish the required difference in terms of the boiling points. Typical combinations B of high-boiling solvents according to component (2b) of mixture (2) and HCl scavengers according to component (2d) of mixture (2) are defined in the following table B.

TABLE B

| B | Comp. (2b) | Comp. (2d) |
|---|---|---|
| (B)-1 | HBS-1 | $N(CH_2CH_3)_3$ |
| (B)-2 | HBS-1 | $N(CH_2CH_2CH_3)_3$ |
| (B)-3 | HBS-1 | $N(CH_2CH_2CH_2CH_3)_3$ |
| (B)-4 | HBS-2 | $N(CH_2CH_3)_3$ |
| (B)-5 | HBS-2 | $N(CH_2CH_2CH_3)_3$ |
| (B)-6 | HBS-2 | $N(CH_2CH_2CH_2CH_3)_3$ |
| (B)-7 | HBS-3 | $N(CH_2CH_3)_3$ |
| (B)-8 | HBS-3 | $N(CH_2CH_2CH_3)_3$ |
| (B)-9 | HBS-3 | $N(CH_2CH_2CH_2CH_3)_3$ |
| (B)-10 | HBS-4 | $N(CH_2CH_3)_3$ |
| (B)-11 | HBS-4 | $N(CH_2CH_2CH_3)_3$ |
| (B)-12 | HBS-4 | $N(CH_2CH_2CH_2CH_3)_3$ |
| (B)-13 | HBS-5 | $N(CH_2CH_3)_3$ |
| (B)-14 | HBS-5 | $N(CH_2CH_2CH_3)_3$ |
| (B)-15 | HBS-5 | $N(CH_2CH_2CH_2CH_3)_3$ |
| (B)-16 | HBS-6 | $N(CH_2CH_3)_3$ |
| (B)-17 | HBS-6 | $N(CH_2CH_2CH_3)_3$ |
| (B)-18 | HBS-6 | $N(CH_2CH_2CH_2CH_3)_3$ |
| (B)-19 | HBS-7 | $N(CH_2CH_3)_3$ |
| (B)-20 | HBS-7 | $N(CH_2CH_2CH_3)_3$ |
| (B)-21 | HBS-7 | $N(CH_2CH_2CH_2CH_3)_3$ |
| (B)-22 | HBS-8 | $N(CH_2CH_3)_3$ |
| (B)-23 | HBS-8 | $N(CH_2CH_2CH_3)_3$ |
| (B)-24 | HBS-8 | $N(CH_2CH_2CH_2CH_3)_3$ |
| (B)-25 | HBS-9 | $N(CH_2CH_3)_3$ |
| (B)-26 | HBS-9 | $N(CH_2CH_2CH_3)_3$ |
| (B)-27 | HBS-9 | $N(CH_2CH_2CH_2CH_3)_3$ |
| (B)-28 | HBS-10 | $N(CH_2CH_3)_3$ |
| (B)-29 | HBS-10 | $N(CH_2CH_2CH_3)_3$ |
| (B)-30 | HBS-10 | $N(CH_2CH_2CH_2CH_3)_3$ |
| (B)-31 | HBS-11 | $N(CH_2CH_3)_3$ |
| (B)-32 | HBS-11 | $N(CH_2CH_2CH_3)_3$ |
| (B)-33 | HBS-11 | $N(CH_2CH_2CH_2CH_3)_3$ |
| (B)-34 | HBS-12 | $N(CH_2CH_3)_3$ |
| (B)-35 | HBS-12 | $N(CH_2CH_2CH_3)_3$ |
| (B)-36 | HBS-12 | $N(CH_2CH_2CH_2CH_3)_3$ |
| (B)-37 | HBS-13 | $N(CH_2CH_3)_3$ |
| (B)-38 | HBS-13 | $N(CH_2CH_2CH_3)_3$ |
| (B)-39 | HBS-13 | $N(CH_2CH_2CH_2CH_3)_3$ |
| (B)-40 | HBS-14 | $N(CH_2CH_3)_3$ |
| (B)-41 | HBS-14 | $N(CH_2CH_2CH_3)_3$ |
| (B)-42 | HBS-14 | $N(CH_2CH_2CH_2CH_3)_3$ |
| (B)-43 | HBS-15 | $N(CH_2CH_3)_3$ |
| (B)-44 | HBS-15 | $N(CH_2CH_2CH_3)_3$ |
| (B)-45 | HBS-15 | $N(CH_2CH_2CH_2CH_3)_3$ |
| (B)-46 | HBS-16 | $N(CH_2CH_3)_3$ |
| (B)-47 | HBS-16 | $N(CH_2CH_2CH_3)_3$ |
| (B)-48 | HBS-16 | $N(CH_2CH_2CH_2CH_3)_3$ |
| (B)-49 | HBS-17 | $N(CH_2CH_3)_3$ |
| (B)-50 | HBS-17 | $N(CH_2CH_2CH_3)_3$ |
| (B)-51 | HBS-17 | $N(CH_2CH_2CH_2CH_3)_3$ |
| (B)-52 | HBS-18 | $N(CH_2CH_3)_3$ |
| (B)-53 | HBS-18 | $N(CH_2CH_2CH_3)_3$ |
| (B)-54 | HBS-18 | $N(CH_2CH_2CH_2CH_3)_3$ |
| (B)-55 | HBS-19 | $N(CH_2CH_3)_3$ |
| (B)-56 | HBS-19 | $N(CH_2CH_2CH_3)_3$ |
| (B)-57 | HBS-19 | $N(CH_2CH_2CH_2CH_3)_3$ |
| (B)-58 | HBS-20 | $N(CH_2CH_3)_3$ |
| (B)-59 | HBS-20 | $N(CH_2CH_2CH_3)_3$ |
| (B)-60 | HBS-20 | $N(CH_2CH_2CH_2CH_3)_3$ |
| (B)-61 | HBS-21 | $N(CH_2CH_3)_3$ |
| (B)-62 | HBS-21 | $N(CH_2CH_2CH_3)_3$ |
| (B)-63 | HBS-21 | $N(CH_2CH_2CH_2CH_3)_3$ |
| (B)-64 | HBS-22 | $N(CH_2CH_3)_3$ |
| (B)-65 | HBS-22 | $N(CH_2CH_2CH_3)_3$ |
| (B)-66 | HBS-22 | $N(CH_2CH_2CH_2CH_3)_3$ |
| (B)-67 | HBS-23 | $N(CH_2CH_3)_3$ |
| (B)-68 | HBS-23 | $N(CH_2CH_2CH_3)_3$ |
| (B)-69 | HBS-23 | $N(CH_2CH_2CH_2CH_3)_3$ |
| (B)-70 | HBS-24 | $N(CH_2CH_3)_3$ |
| (B)-71 | HBS-24 | $N(CH_2CH_2CH_3)_3$ |
| (B)-72 | HBS-24 | $N(CH_2CH_2CH_2CH_3)_3$ |
| (B)-73 | HBS-25 | $N(CH_2CH_3)_3$ |
| (B)-74 | HBS-25 | $N(CH_2CH_2CH_3)_3$ |
| (B)-75 | HBS-25 | $N(CH_2CH_2CH_2CH_3)_3$ |
| (B)-76 | HBS-26 | $N(CH_2CH_3)_3$ |
| (B)-77 | HBS-26 | $N(CH_2CH_2CH_3)_3$ |
| (B)-78 | HBS-26 | $N(CH_2CH_2CH_2CH_3)_3$ |
| (B)-79 | HBS-27 | $N(CH_2CH_3)_3$ |
| (B)-80 | HBS-27 | $N(CH_2CH_2CH_3)_3$ |
| (B)-81 | HBS-27 | $N(CH_2CH_2CH_2CH_3)_3$ |
| (B)-82 | HBS-28 | $N(CH_2CH_3)_3$ |
| (B)-83 | HBS-28 | $N(CH_2CH_2CH_3)_3$ |
| (B)-84 | HBS-28 | $N(CH_2CH_2CH_2CH_3)_3$ |

TABLE B-continued

| B | Comp. (2b) | Comp. (2d) |
|---|---|---|
| (B)-85 | HBS-29 | N(CH$_2$CH$_3$)$_3$ |
| (B)-86 | HBS-29 | N(CH$_2$CH$_2$CH$_3$)$_3$ |
| (B)-87 | HBS-29 | N(CH$_2$CH$_2$CH$_2$CH$_3$)$_3$ |
| (B)-88 | HBS-30 | N(CH$_2$CH$_3$)$_3$ |
| (B)-89 | HBS-30 | N(CH$_2$CH$_2$CH$_3$)$_3$ |
| (B)-90 | HBS-30 | N(CH$_2$CH$_2$CH$_2$CH$_3$)$_3$ |
| (B)-91 | HBS-31 | N(CH$_2$CH$_3$)$_3$ |
| (B)-92 | HBS-31 | N(CH$_2$CH$_2$CH$_3$)$_3$ |
| (B)-93 | HBS-31 | N(CH$_2$CH$_2$CH$_2$CH$_3$)$_3$ |
| (B)-94 | HBS-32 | N(CH$_2$CH$_3$)$_3$ |
| (B)-95 | HBS-32 | N(CH$_2$CH$_2$CH$_3$)$_3$ |
| (B)-96 | HBS-32 | N(CH$_2$CH$_2$CH$_2$CH$_3$)$_3$ |

N(CH$_2$CH$_3$)$_3$ = Triethylamine
N(CH$_2$CH$_2$CH$_3$)$_3$ = Tri-n-propylamine
N(CH$_2$CH$_2$CH$_2$CH$_3$)$_3$ = Tri-n-butylamine It is to be understood that the above preferences with regard to components (2a), (2b), (2c), and (2d) of mixture (2) are also preferred in combination. In particular, the following combinations are preferred for mixture (2) according to the invention.

1) Combination, wherein mixture (2) comprises as components (2a) and (2b) the components (1a) and (1b) according to mixture (1)-1 as defined above in table 1, and as components (2c) and (2d) any one of the combinations according to the following table 2.

2) Combination, wherein mixture (2) comprises as components (2a) and (2b) the components (1a) and (1b) according to mixture (1)-2 as defined above in table 1, and as components (2c) and (2d) any one of the combinations according to the following table 2.

3) Combination, wherein mixture (2) comprises as components (2a) and (2b) the components (1a) and (1b) according to mixture (1)-3 as defined above in table 1, and as components (2c) and (2d) any one of the combinations according to the following table 2.

4) Combination, wherein mixture (2) comprises as components (2a) and (2b) the components (1a) and (1b) according to mixture (1)-4 as defined above in table 1, and as components (2c) and (2d) any one of the combinations according to the following table 2.

5) Combination, wherein mixture (2) comprises as components (2a) and (2b) the components (1a) and (1b) according to mixture (1)-5 as defined above in table 1, and as components (2c) and (2d) any one of the combinations according to the following table 2.

6) Combination, wherein mixture (2) comprises as components (2a) and (2b) the components (1a) and (1b) according to mixture (1)-6 as defined above in table 1, and as components (2c) and (2d) any one of the combinations according to the following table 2.

7) Combination, wherein mixture (2) comprises as components (2a) and (2b) the components (1a) and (1b) according to mixture (1)-7 as defined above in table 1, and as components (2c) and (2d) any one of the combinations according to the following table 2.

8) Combination, wherein mixture (2) comprises as components (2a) and (2b) the components (1a) and (1b) according to mixture (1)-8 as defined above in table 1, and as components (2c) and (2d) any one of the combinations according to the following table 2.

9) Combination, wherein mixture (2) comprises as components (2a) and (2b) the components (1a) and (1b) according to mixture (1)-9 as defined above in table 1, and as components (2c) and (2d) any one of the combinations according to the following table 2.

10) Combination, wherein mixture (2) comprises as components (2a) and (2b) the components (1a) and (1b) according to mixture (1)-10 as defined above in table 1, and as components (2c) and (2d) any one of the combinations according to the following table 2.

11) Combination, wherein mixture (2) comprises as components (2a) and (2b) the components (1a) and (1b) according to mixture (1)-11 as defined above in table 1, and as components (2c) and (2d) any one of the combinations according to the following table 2.

12) Combination, wherein mixture (2) comprises as components (2a) and (2b) the components (1a) and (1b) according to mixture (1)-12 as defined above in table 1, and as components (2c) and (2d) any one of the combinations according to the following table 2.

13) Combination, wherein mixture (2) comprises as components (2a) and (2b) the components (1a) and (1b) according to mixture (1)-13 as defined above in table 1, and as components (2c) and (2d) any one of the combinations according to the following table 2.

14) Combination, wherein mixture (2) comprises as components (2a) and (2b) the components (1a) and (1b) according to mixture (1)-14 as defined above in table 1, and as components (2c) and (2d) any one of the combinations according to the following table 2.

15) Combination, wherein mixture (2) comprises as components (2a) and (2b) the components (1a) and (1b) according to mixture (1)-15 as defined above in table 1, and as components (2c) and (2d) any one of the combinations according to the following table 2.

16) Combination, wherein mixture (2) comprises as components (2a) and (2b) the components (1a) and (1b) according to mixture (1)-16 as defined above in table 1, and as components (2c) and (2d) any one of the combinations according to the following table 2.

17) Combination, wherein mixture (2) comprises as components (2a) and (2b) the components (1a) and (1b) according to mixture (1)-17 as defined above in table 1, and as components (2c) and (2d) any one of the combinations according to the following table 2.

18) Combination, wherein mixture (2) comprises as components (2a) and (2b) the components (1a) and (1b) according to mixture (1)-18 as defined above in table 1, and as components (2c) and (2d) any one of the combinations according to the following table 2.

19) Combination, wherein mixture (2) comprises as components (2a) and (2b) the components (1a) and (1b) according to mixture (1)-19 as defined above in table 1, and as components (2c) and (2d) any one of the combinations according to the following table 2.

20) Combination, wherein mixture (2) comprises as components (2a) and (2b) the components (1a) and (1b) according to mixture (1)-20 as defined above in table 1, and as components (2c) and (2d) any one of the combinations according to the following table 2.

21) Combination, wherein mixture (2) comprises as components (2a) and (2b) the components (1a) and (1b) according to mixture (1)-21 as defined above in table 1, and as components (2c) and (2d) any one of the combinations according to the following table 2.

22) Combination, wherein mixture (2) comprises as components (2a) and (2b) the components (1a) and (1b) according to mixture (1)-22 as defined above in table 1, and as components (2c) and (2d) any one of the combinations according to the following table 2.

23) Combination, wherein mixture (2) comprises as components (2a) and (2b) the components (1a) and (1b) according to mixture (1)-23 as defined above in table 1, and as components (2c) and (2d) any one of the combinations according to the following table 2.

24) Combination, wherein mixture (2) comprises as components (2a) and (2b) the components (1a) and (1b) according to mixture (1)-24 as defined above in table 1, and as components (2c) and (2d) any one of the combinations according to the following table 2.

25) Combination, wherein mixture (2) comprises as components (2a) and (2b) the components (1a) and (1b) according to mixture (1)-25 as defined above in table 1, and as components (2c) and (2d) any one of the combinations according to the following table 2.

26) Combination, wherein mixture (2) comprises as components (2a) and (2b) the components (1a) and (1b) according to mixture (1)-26 as defined above in table 1, and as components (2c) and (2d) any one of the combinations according to the following table 2.

27) Combination, wherein mixture (2) comprises as components (2a) and (2b) the components (1a) and (1b) according to mixture (1)-27 as defined above in table 1, and as components (2c) and (2d) any one of the combinations according to the following table 2.

28) Combination, wherein mixture (2) comprises as components (2a) and (2b) the components (1a) and (1b) according to mixture (1)-28 as defined above in table 1, and as components (2c) and (2d) any one of the combinations according to the following table 2.

29) Combination, wherein mixture (2) comprises as components (2a) and (2b) the components (1a) and (1b) according to mixture (1)-29 as defined above in table 1, and as components (2c) and (2d) any one of the combinations according to the following table 2.

30) Combination, wherein mixture (2) comprises as components (2a) and (2b) the components (1a) and (1b) according to mixture (1)-30 as defined above in table 1, and as components (2c) and (2d) any one of the combinations according to the following table 2.

31) Combination, wherein mixture (2) comprises as components (2a) and (2b) the components (1a) and (1b) according to mixture (1)-31 as defined above in table 1, and as components (2c) and (2d) any one of the combinations according to the following table 2.

32) Combination, wherein mixture (2) comprises as components (2a) and (2b) the components (1a) and (1b) according to mixture (1)-32 as defined above in table 1, and as components (2c) and (2d) any one of the combinations according to the following table 2.

33) Combination, wherein mixture (2) comprises as components (2a) and (2b) the components (1a) and (1b) according to mixture (1)-33 as defined above in table 1, and as components (2c) and (2d) any one of the combinations according to the following table 2.

34) Combination, wherein mixture (2) comprises as components (2a) and (2b) the components (1a) and (1b) according to mixture (1)-34 as defined above in table 1, and as components (2c) and (2d) any one of the combinations according to the following table 2.

35) Combination, wherein mixture (2) comprises as components (2a) and (2b) the components (1a) and (1b) according to mixture (1)-35 as defined above in table 1, and as components (2c) and (2d) any one of the combinations according to the following table 2.

36) Combination, wherein mixture (2) comprises as components (2a) and (2b) the components (1a) and (1b) according to mixture (1)-36 as defined above in table 1, and as components (2c) and (2d) any one of the combinations according to the following table 2.

37) Combination, wherein mixture (2) comprises as components (2a) and (2b) the components (1a) and (1b) according to mixture (1)-37 as defined above in table 1, and as components (2c) and (2d) any one of the combinations according to the following table 2.

38) Combination, wherein mixture (2) comprises as components (2a) and (2b) the components (1a) and (1b) according to mixture (1)-38 as defined above in table 1, and as components (2c) and (2d) any one of the combinations according to the following table 2.

39) Combination, wherein mixture (2) comprises as components (2a) and (2b) the components (1a) and (1b) according to mixture (1)-39 as defined above in table 1, and as components (2c) and (2d) any one of the combinations according to the following table 2.

40) Combination, wherein mixture (2) comprises as components (2a) and (2b) the components (1a) and (1b) according to mixture (1)-40 as defined above in table 1, and as components (2c) and (2d) any one of the combinations according to the following table 2.

41) Combination, wherein mixture (2) comprises as components (2a) and (2b) the components (1a) and (1b) according to mixture (1)-41 as defined above in table 1, and as components (2c) and (2d) any one of the combinations according to the following table 2.

42) Combination, wherein mixture (2) comprises as components (2a) and (2b) the components (1a) and (1b) according to mixture (1)-42 as defined above in table 1, and as components (2c) and (2d) any one of the combinations according to the following table 2.

43) Combination, wherein mixture (2) comprises as components (2a) and (2b) the components (1a) and (1b) according to mixture (1)-43 as defined above in table 1, and as components (2c) and (2d) any one of the combinations according to the following table 2.

44) Combination, wherein mixture (2) comprises as components (2a) and (2b) the components (1a) and (1b) according to mixture (1)-44 as defined above in table 1, and as components (2c) and (2d) any one of the combinations according to the following table 2.

45) Combination, wherein mixture (2) comprises as components (2a) and (2b) the components (1a) and (1b) according to mixture (1)-45 as defined above in table 1, and as components (2c) and (2d) any one of the combinations according to the following table 2.

46) Combination, wherein mixture (2) comprises as components (2a) and (2b) the components (1a) and (1b) according to mixture (1)-46 as defined above in table 1, and as components (2c) and (2d) any one of the combinations according to the following table 2.

47) Combination, wherein mixture (2) comprises as components (2a) and (2b) the components (1a) and (1b) according to mixture (1)-47 as defined above in table 1, and as components (2c) and (2d) any one of the combinations according to the following table 2.

48) Combination, wherein mixture (2) comprises as components (2a) and (2b) the components (1a) and (1b) according to mixture (1)-48 as defined above in table 1, and as components (2c) and (2d) any one of the combinations according to the following table 2.

49) Combination, wherein mixture (2) comprises as components (2a) and (2b) the components (1a) and (1b) according to mixture (1)-49 as defined above in table 1, and as components (2c) and (2d) any one of the combinations according to the following table 2.

50) Combination, wherein mixture (2) comprises as components (2a) and (2b) the components (1a) and (1b) according to mixture (1)-50 as defined above in table 1, and as components (2c) and (2d) any one of the combinations according to the following table 2.

51) Combination, wherein mixture (2) comprises as components (2a) and (2b) the components (1a) and (1b) according to mixture (1)-51 as defined above in table 1, and as components (2c) and (2d) any one of the combinations according to the following table 2.

52) Combination, wherein mixture (2) comprises as components (2a) and (2b) the components (1a) and (1b) according to mixture (1)-52 as defined above in table 1, and as components (2c) and (2d) any one of the combinations according to the following table 2.

53) Combination, wherein mixture (2) comprises as components (2a) and (2b) the components (1a) and (1b) according to mixture (1)-53 as defined above in table 1, and as components (2c) and (2d) any one of the combinations according to the following table 2.

54) Combination, wherein mixture (2) comprises as components (2a) and (2b) the components (1a) and (1b) according to mixture (1)-54 as defined above in table 1, and as components (2c) and (2d) any one of the combinations according to the following table 2.

55) Combination, wherein mixture (2) comprises as components (2a) and (2b) the components (1a) and (1b) according to mixture (1)-55 as defined above in table 1, and as components (2c) and (2d) any one of the combinations according to the following table 2.

56) Combination, wherein mixture (2) comprises as components (2a) and (2b) the components (1a) and (1b) according to mixture (1)-56 as defined above in table 1, and as components (2c) and (2d) any one of the combinations according to the following table 2.

57) Combination, wherein mixture (2) comprises as components (2a) and (2b) the components (1a) and (1b) according to mixture (1)-57 as defined above in table 1, and as components (2c) and (2d) any one of the combinations according to the following table 2.

58) Combination, wherein mixture (2) comprises as components (2a) and (2b) the components (1a) and (1b) according to mixture (1)-58 as defined above in table 1, and as components (2c) and (2d) any one of the combinations according to the following table 2.

59) Combination, wherein mixture (2) comprises as components (2a) and (2b) the components (1a) and (1b) according to mixture (1)-59 as defined above in table 1, and as components (2c) and (2d) any one of the combinations according to the following table 2.

60) Combination, wherein mixture (2) comprises as components (2a) and (2b) the components (1a) and (1b) according to mixture (1)-60 as defined above in table 1, and as components (2c) and (2d) any one of the combinations according to the following table 2.

61) Combination, wherein mixture (2) comprises as components (2a) and (2b) the components (1a) and (1b) according to mixture (1)-61 as defined above in table 1, and as components (2c) and (2d) any one of the combinations according to the following table 2.

62) Combination, wherein mixture (2) comprises as components (2a) and (2b) the components (1a) and (1b) according to mixture (1)-62 as defined above in table 1, and as components (2c) and (2d) any one of the combinations according to the following table 2.

63) Combination, wherein mixture (2) comprises as components (2a) and (2b) the components (1a) and (1b) according to mixture (1)-63 as defined above in table 1, and as components (2c) and (2d) any one of the combinations according to the following table 2.

64) Combination, wherein mixture (2) comprises as components (2a) and (2b) the components (1a) and (1b) according to mixture (1)-64 as defined above in table 1, and as components (2c) and (2d) any one of the combinations according to the following table 2.

65) Combination, wherein mixture (2) comprises as components (2a) and (2b) the components (1a) and (1b) according to mixture (1)-65 as defined above in table 1, and as components (2c) and (2d) any one of the combinations according to the following table 2.

66) Combination, wherein mixture (2) comprises as components (2a) and (2b) the components (1a) and (1b) according to mixture (1)-66 as defined above in table 1, and as components (2c) and (2d) any one of the combinations according to the following table 2.

67) Combination, wherein mixture (2) comprises as components (2a) and (2b) the components (1a) and (1b) according to mixture (1)-67 as defined above in table 1, and as components (2c) and (2d) any one of the combinations according to the following table 2.

68) Combination, wherein mixture (2) comprises as components (2a) and (2b) the components (1a) and (1b) according to mixture (1)-68 as defined above in table 1, and as components (2c) and (2d) any one of the combinations according to the following table 2.

69) Combination, wherein mixture (2) comprises as components (2a) and (2b) the components (1a) and (1b) according to mixture (1)-69 as defined above in table 1, and as components (2c) and (2d) any one of the combinations according to the following table 2.

70) Combination, wherein mixture (2) comprises as components (2a) and (2b) the components (1a) and (1b) according to mixture (1)-70 as defined above in table 1, and as components (2c) and (2d) any one of the combinations according to the following table 2.

71) Combination, wherein mixture (2) comprises as components (2a) and (2b) the components (1a) and (1b) according to mixture (1)-71 as defined above in table 1, and as components (2c) and (2d) any one of the combinations according to the following table 2.

72) Combination, wherein mixture (2) comprises as components (2a) and (2b) the components (1a) and (1b) according to mixture (1)-72 as defined above in table 1, and as components (2c) and (2d) any one of the combinations according to the following table 2.

73) Combination, wherein mixture (2) comprises as components (2a) and (2b) the components (1a) and (1b) according to mixture (1)-73 as defined above in table 1, and as components (2c) and (2d) any one of the combinations according to the following table 2.

74) Combination, wherein mixture (2) comprises as components (2a) and (2b) the components (1a) and (1b) according to mixture (1)-74 as defined above in table 1, and as components (2c) and (2d) any one of the combinations according to the following table 2.

75) Combination, wherein mixture (2) comprises as components (2a) and (2b) the components (1a) and (1b) according to mixture (1)-75 as defined above in table 1, and as components (2c) and (2d) any one of the combinations according to the following table 2.

76) Combination, wherein mixture (2) comprises as components (2a) and (2b) the components (1a) and (1b) according to mixture (1)-76 as defined above in table 1, and as components (2c) and (2d) any one of the combinations according to the following table 2.

77) Combination, wherein mixture (2) comprises as components (2a) and (2b) the components (1a) and (1b) according to mixture (1)-77 as defined above in table 1, and as components (2c) and (2d) any one of the combinations according to the following table 2.

78) Combination, wherein mixture (2) comprises as components (2a) and (2b) the components (1a) and (1b) according to mixture (1)-78 as defined above in table 1, and as components (2c) and (2d) any one of the combinations according to the following table 2.

79) Combination, wherein mixture (2) comprises as components (2a) and (2b) the components (1a) and (1b) according to mixture (1)-79 as defined above in table 1, and as components (2c) and (2d) any one of the combinations according to the following table 2.

80) Combination, wherein mixture (2) comprises as components (2a) and (2b) the components (1a) and (1b) according to mixture (1)-80 as defined above in table 1, and as components (2c) and (2d) any one of the combinations according to the following table 2.

81) Combination, wherein mixture (2) comprises as components (2a) and (2b) the components (1a) and (1b) according to mixture (1)-81 as defined above in table 1, and as components (2c) and (2d) any one of the combinations according to the following table 2.

82) Combination, wherein mixture (2) comprises as components (2a) and (2b) the components (1a) and (1b) according to mixture (1)-82 as defined above in table 1, and as components (2c) and (2d) any one of the combinations according to the following table 2.

83) Combination, wherein mixture (2) comprises as components (2a) and (2b) the components (1a) and (1b) according to mixture (1)-83 as defined above in table 1, and as components (2c) and (2d) any one of the combinations according to the following table 2.

84) Combination, wherein mixture (2) comprises as components (2a) and (2b) the components (1a) and (1b) according to mixture (1)-84 as defined above in table 1, and as components (2c) and (2d) any one of the combinations according to the following table 2.

85) Combination, wherein mixture (2) comprises as components (2a) and (2b) the components (1a) and (1b) according to mixture (1)-85 as defined above in table 1, and as components (2c) and (2d) any one of the combinations according to the following table 2.

86) Combination, wherein mixture (2) comprises as components (2a) and (2b) the components (1a) and (1b) according to mixture (1)-86 as defined above in table 1, and as components (2c) and (2d) any one of the combinations according to the following table 2.

87) Combination, wherein mixture (2) comprises as components (2a) and (2b) the components (1a) and (1b) according to mixture (1)-87 as defined above in table 1, and as components (2c) and (2d) any one of the combinations according to the following table 2.

88) Combination, wherein mixture (2) comprises as components (2a) and (2b) the components (1a) and (1b) according to mixture (1)-88 as defined above in table 1, and as components (2c) and (2d) any one of the combinations according to the following table 2.

89) Combination, wherein mixture (2) comprises as components (2a) and (2b) the components (1a) and (1b) according to mixture (1)-89 as defined above in table 1, and as components (2c) and (2d) any one of the combinations according to the following table 2.

90) Combination, wherein mixture (2) comprises as components (2a) and (2b) the components (1a) and (1b) according to mixture (1)-90 as defined above in table 1, and as components (2c) and (2d) any one of the combinations according to the following table 2.

91) Combination, wherein mixture (2) comprises as components (2a) and (2b) the components (1a) and (1b) according to mixture (1)-91 as defined above in table 1, and as components (2c) and (2d) any one of the combinations according to the following table 2.

92) Combination, wherein mixture (2) comprises as components (2a) and (2b) the components (1a) and (1b) according to mixture (1)-92 as defined above in table 1, and as components (2c) and (2d) any one of the combinations according to the following table 2.

93) Combination, wherein mixture (2) comprises as components (2a) and (2b) the components (1a) and (1b) according to mixture (1)-93 as defined above in table 1, and as components (2c) and (2d) any one of the combinations according to the following table 2.

94) Combination, wherein mixture (2) comprises as components (2a) and (2b) the components (1a) and (1b) according to mixture (1)-94 as defined above in table 1, and as components (2c) and (2d) any one of the combinations according to the following table 2.

95) Combination, wherein mixture (2) comprises as components (2a) and (2b) the components (1a) and (1b) according to mixture (1)-95 as defined above in table 1, and as components (2c) and (2d) any one of the combinations according to the following table 2.

96) Combination, wherein mixture (2) comprises as components (2a) and (2b) the components (1a) and (1b) according to mixture (1)-96 as defined above in table 1, and as components (2c) and (2d) any one of the combinations according to the following table 2.

TABLE 2

| Combination | Component (2c) | Component (2d) |
| --- | --- | --- |
| (2)-1 | THF | $N(CH_2CH_3)_3$ |
| (2)-2 | $CH_3$—THF | $N(CH_2CH_3)_3$ |
| (2)-3 | EtOAc | $N(CH_2CH_3)_3$ |
| (2)-4 | THF | $N(CH_2CH_2CH_3)_3$ |
| (2)-5 | $CH_3$—THF | $N(CH_2CH_2CH_3)_3$ |
| (2)-6 | EtOAc | $N(CH_2CH_2CH_3)_3$ |
| (2)-7 | THF | $N(CH_2CH_2CH_2CH_3)_3$ |
| (2)-8 | $CH_3$—THF | $N(CH_2CH_2CH_2CH_3)_3$ |
| (2)-9 | EtOAc | $N(CH_2CH_2CH_2CH_3)_3$ |

EtOAc = Ethylacetate
THF = Tetrahydrofuran
$CH_3$—THF = 2-methyltetrahydrofuran
$N(CH_2CH_3)_3$ = Triethylamine
$N(CH_2CH_2CH_3)_3$ = Tri-n-propylamine
$N(CH_2CH_2CH_2CH_3)_3$ = Tri-n-butylamine In one embodiment of the invention, components (2a), (2b), (2c), and (2d) of mixture (2), which have been defined in detail above, are together present in an amount of at least 95 wt.-%, preferably at least 97 wt.-%, more preferably at least 98 wt.-%, most preferably at least 99 wt.-%, based on the total weight of mixture (2). If component (2d) is present, the wt.-% amount in mixture (2) typically depends on the fact that about equimolar amounts of the HCl scavenger and the (thio)phosphoric acid derivative(s) are typically present. Preferred weight ratios of component (2a) to (2d) are in the range of from 10:1 to 1:10, e.g. in the range of from 5:1 to 1:1.

The weight ratio of component (2a) to (2c) is preferably from 50:1 to 1:2, preferably from 10:1 to 1:1.

In general, the process of the invention comprises evaporating components (2c) and (2d) of mixture (2) and collecting mixture (1) as the bottom product. In this connection, the following evaporators can be used.

In one embodiment, an evaporator selected from the group consisting of flash evaporator, short tube evaporator (also known as Calandria evaporator), long tube evaporator, forced circulation evaporator, forced circulation flash evaporator, natural circulation evaporator, plate evaporator, agitated vessel evaporator, coiled tube evaporator (also known as helical coil evaporator or helical tube evaporator), kettle type evaporator, tube shell-side evaporator, and thin film evaporators. It is to be understood that these evaporator types may be used in combination, i.e. sequentially.

A skilled person understands that the operation temperatures and pressures of the evaporators depend on the components (2c) and (2d) to be evaporated. Suitable temperatures may generally be in the range of from 40° C. to 160° C., preferably from 70° C. to 110° C., more preferably from 80° C. to 100° C. The pressure will depend on the volatility of the components (2c) and (2d) at the applied temperatures. The pressure may generally be in the range of from 5 mbar to 300 mbar (0.5 kPa to 30 kPa).

Preferably, the process of the invention uses the technique of thin film evaporation for recovering mixture (1) from mixture (2).

As used herein, the term "thin film evaporation", describes the thermal separation of products in a mechanically generated, thin liquid film.

Examples of thin film evaporators include falling film evaporator, climbing film evaporator (also known as rising film evaporator), short path evaporator, and wiped film evaporator (also known as agitated thin film evaporator). A preferred thin film evaporator is the wiped film evaporator.

In a preferred embodiment of the invention, the process comprising evaporating components (2c) and (2d) of mixture (2) and collecting mixture (1) as the bottom product is performed by:

(i) continuously introducing a stream of the mixture (2) into at least one thin film evaporator operating at a temperature of from 40° C. to 160° C. and at a pressure of from 5 mbar to 300 mbar (0.5 kPa to 30 kPa), and (ii) continuously collecting the bottom product.

As indicated by the term "at least one thin film evaporator", the recovery process of the present invention may be performed by not only using one, but also by using two or more thin film evaporators one after the other.

In one embodiment, the recovery process of the invention is performed by using only one thin film evaporator. According to this embodiment, step (i) of the above described process of the invention is to be understood as such that a stream of mixture (2) is introduced into one thin film evaporator, and the bottom product obtained is collected, i.e. withdrawn from the thin film evaporator, in step (ii). In other words, the process of the invention may preferably comprise the steps of (i) continuously introducing a stream of the mixture (2) into one thin film evaporator operating at a temperature of from 40° C. to 160° C. and at a pressure of from 5 mbar to 300 mbar (0.5 kPa to 30 kPa), and (ii) continuously collecting the bottom product.

In another embodiment, the recovery process of the invention is performed by using two or more, preferably two or three, in particular two thin film evaporators one after the other. According to this embodiment, step (i) of the above described process of the invention is to be understood as such that a stream of mixture (2) is introduced into a first thin film evaporator, and the bottom product obtained is then introduced into a second thin film evaporator, to obtain a further purified bottom product, which may optionally be introduced into a third thin film evaporator, and so on. In step (ii), the bottom product resulting from the two or more, preferably two or three, in particular two thin film evaporation steps is then collected. In other words, the process of the invention may preferably comprise the steps of (i) a) continuously introducing a stream of the mixture (2) into a first thin film evaporator operating at a temperature of from 60° C. to 140° C. and at a pressure of from 10 mbar to 300 mbar (1 kPa to 30 kPa), b) continuously collecting the bottom product, c) continuously introducing a stream of the bottom product obtained in step (i) b) into a second thin film evaporator operating at a temperature of from 40° C. to 160° C. and at a pressure of from 5 mbar to 300 mbar (0.5 kPa to 30 kPa), and (ii) continuously collecting the bottom product.

A skilled person will understand that it can be preferred that different temperatures and pressures are selected in the two or more thin film evaporators. For example, the temperature may be increased from the first to the second thin film evaporator by at least 10° C., preferably at least 20° C. Alternatively or additionally, the pressure may be further reduced in the second thin film evaporator compared to the first thin film evaporator by at least 20 mbar (2 kPa), more preferably by at least 50 mbar (5 kPa).

In a preferred embodiment of the invention, the thin film evaporator is a wiped film evaporator also known as agitated thin film evaporator.

Methods for the design and construction of wiped film evaporators are well known to those skilled in the art of wiped film manufacture. See, for example, Chem. Eng., 1965, 72, pages 175-190 and Chemical Engineering Progress, December 1989, pages 12-15. There are also vendors, such as Buss-SMS-Canzeler, Pfaudler and Pope Scientific, who manufacture wiped film evaporators and who can supply assistance in obtaining a satisfactory design of apparatus for the particular operations to be conducted therewith. Furthermore, wiped film evaporation is described in U.S. Pat. No. 5,955,630.

It is noted that wiped film evaporators are not limited to vertical wiped film evaporators, but also covers, e.g., the use of horizontal wiped film evaporators, although vertical wiped film evaporators are preferred.

Preferably, wiped film evaporation with a vertical wiped film evaporator works as follows. After being introduced into the wiped film evaporator, the mixture, which shall be separated (i.e. mixture (2) in case of the present invention) comes into contact with the rotor: it is uniformly spread on the periphery by a distribution ring, then picked up by rotor blades and immediately formed into a film (preferably 0.5-3.5 mm) on the heating surface. In front of each rotor blade, the fluid creates a bow wave. The fluid in the gap between the heating surface and the rotor blade tip is highly turbulent and this leads to intensive heat and mass transfer rates. This turbulence produces high heat transfer coefficients even with highly viscous products. The volatile components of the feed stock are therefore very quickly evaporated and flow out of the evaporator in to the condensation stage, column or to another downstream process step. The non volatile components of the feed stock (high boilers) flow in a spiral path down the heating surface to the bottom of the evaporator and arrive at the bottom part of the heating zone in a single pass within a matter of seconds and leave the evaporator. According to the present invention, said non volatile components are collected as the so-called "bottom product".

It is to be understood that the term "bottom product" preferably refers to the distillation residue or the distillation bottoms of a thermal separation process, i.e. the non-volatile components, which are not evaporated during thermal separation of a mixture comprising volatile and non-volatile components by thin film evaporation. Particularly preferably, the term "bottom product" refers to the non-volatile components of the feed stock obtained by wiped film evaporation, if a wiped film evaporator is used as the thin film evaporator. Although the part of the wiped film evaporator, from which these non-volatile components may be collected, is not decisive, it is preferred that the non-volatile components are obtained at the bottom part of the wiped film evaporator as outlined above.

In the context of the present invention, the bottom product of the at least one thin film evaporator is of interest, as the bottom product, which is collected, comprises the desired mixture (1).

In a preferred embodiment, step (ii) of the process of the invention provides mixture (1) as the bottom product. Thus, the term "collecting the bottom product" in the process of the present invention preferably means "collecting mixture (1)".

The operating conditions of the at least one thin film evaporator depend on the boiling points of the volatile components of mixture (2), i.e. components (2c) and optionally (2d), which are to be separated from mixture (2) to obtain mixture (1). In addition, the operating temperature depends on the operating pressure and vice versa, as the operating temperature may be reduced, if a stronger vacuum is applied and vice versa. In any case, solids formation of the desired product, namely the (thio)phosphoric acid derivative (component (2a) of mixture (2)), can be avoided in the recovery process of the present invention due to the presence of component (2b) in mixture (2).

In general, the at least one thin film evaporator may be operated at a temperature in the range of from 60° C. to 140° C. and at a pressure of from 10 mbar to 300 mbar (2 kPa to 20 kPa) according to the present invention.

In one embodiment of the invention, the at least one thin film evaporator is operated at a temperature in the range of from 70° C. to 110° C., e.g. 70 to 90° C. or 90 to 110° C.

In a preferred embodiment of the invention, the at least one thin film evaporator is operated at a temperature in the range of from 80° C. to 100° C., e.g. 80 to 90° C. or 90 to 100° C.

In one embodiment of the invention, the at least one thin film evaporator is operated at a pressure in the range of from 10 mbar to 200 mbar, e.g. from 10 mbar to 120 mbar or from 60 mbar to 200 mbar.

In one embodiment of the invention, the at least one thin film evaporator is operated at a pressure in the range of from 20 mbar to 100 mbar. In one embodiment of the invention, the at least one thin film evaporator is operated at a temperature in the range of from 50° C. to 110° C. and at a pressure of from 5 mbar to 250 mbar (0.5 kPa to 25 kPa).

In one embodiment of the invention, the at least one thin film evaporator is operated at a temperature in the range of from 80° C. to 100° C. and at a pressure of from 20 mbar to 100 mbar (2 kPa to 10 kPa).

A skilled person will understand that the temperatures and pressured depend on the volatile components to be removed and the temperature stability of the non-volatile components to be isolated as bottom product.

In one preferred embodiment of the invention, thin film evaporation is performed under a nitrogen countercurrent. This is particularly preferred for the second thin film evaporator, if two thin film evaporators are used. The nitrogen stream is advantageous for the removal of the volatile compounds.

A constant and short residence time of mixture (2) in the at least one thin film evaporator is preferred in view of the low thermal stability of the (thio)phosphoric acid derivatives to be recovered in the form of mixture (1). Preferably, the residence time is below one minute.

Figure 2:
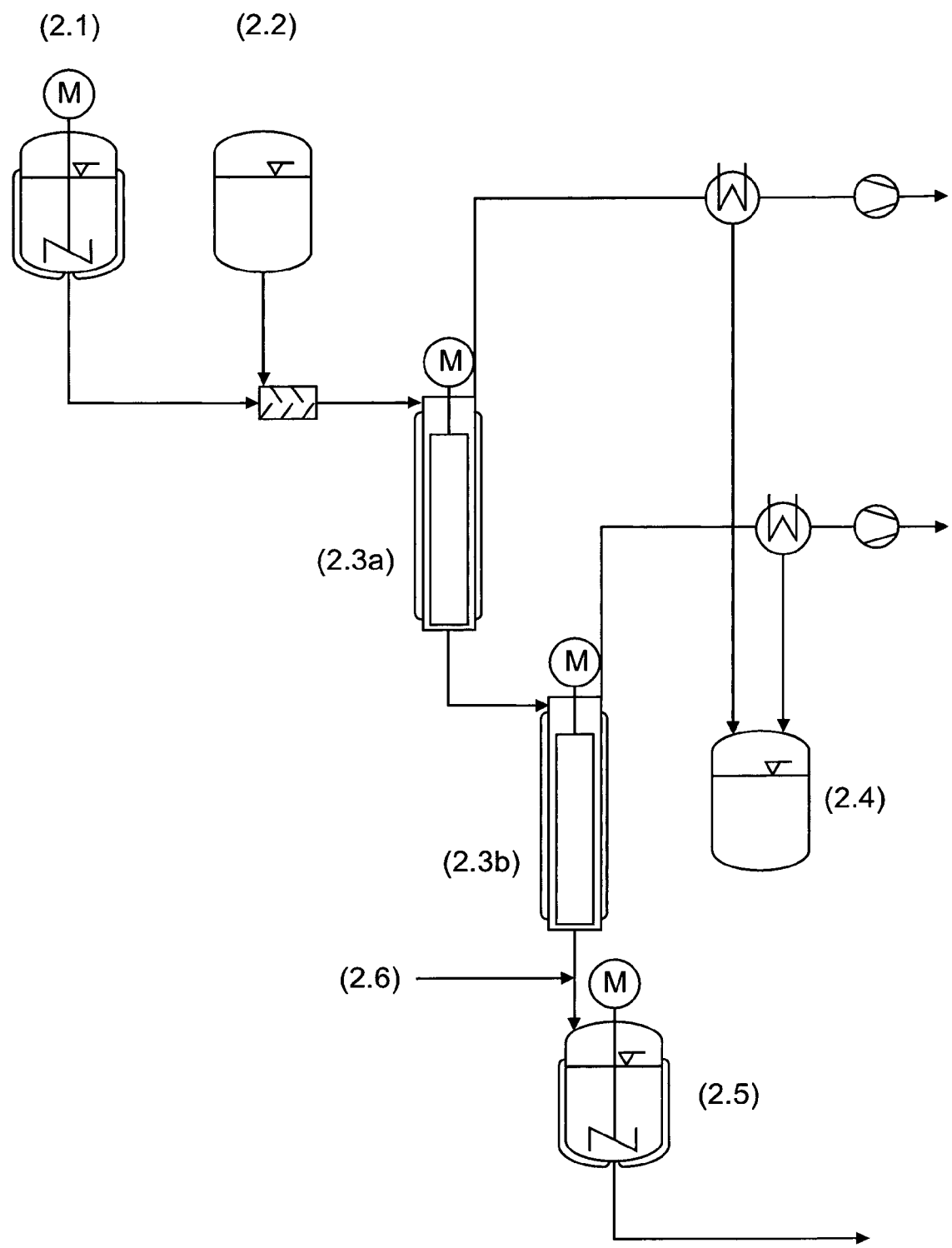
FIG. 2 is a schematic of another exemplary process for obtaining mixtures.

The invention is further illustrated in FIGS. 1 and 2.

In FIG. 1, the following reference signs are used:
(1.1)=vessel comprising product mixture with components (2a), (2c), and optionally (2d)
(1.2)=vessel comprising component (2b)
(1.3)=evaporator
(1.4)=vessel comprising components (2c)/(2d)
(1.5)=vessel comprising components (2a)/(2b), i.e. components (1a)/(1b) of mixture (1)

In FIG. 2, the following reference signs are used:
(2.1)=vessel comprising product mixture with components (2a), (2c), and optionally (2d)
(2.2)=vessel comprising component (2b)
(2.3a)=$1^{st}$ wiped film evaporator
(2.3b)=$2^{nd}$ wiped film evaporator
(2.4)=vessel comprising components (2c)/(2d)
(2.5)=vessel comprising components (2a)/(2b), i.e. components (1a)/(1b) of mixture (1)
(2.6)=nitrogen stream As already indicated above, a concentrated product mixture comprising the at least one (thio)phosphoric acid derivative, at least one solvent, and optionally at least one HCl scavenger may be obtained after the two reactions, which are typically performed in the preparation of (thio) phosphoric acid derivatives. As already indicated above, the work-up of the product mixture obtained after the second reaction may include distillation of ammonia, removal of ammonium chloride by washing the organic phase with an aqueous phase, and concentrating the mixture by a distillation step.

FIG. 1 shows that the thus obtained concentrated product mixture comprising the at least one (thio)phosphoric acid derivative (component (2a)), at least one solvent (component (2c)), and optionally at least one HCl scavenger (component (2d)), is preferably mixed with at least one high-boiling solvent (component (2b)) via a continuously operated mixer, for example a static mixture, to provide mixture (2), which is then introduced into an evaporator to evaporate components (2c) and (2d) and recover mixture (1). The volatile components (2c) and (2d) may be condensed in a heat exchanger, and the condensed solvent may be recycled in the preparation process of the (thio)phosphoric acid derivative. The bottom product of the evaporator is then fed into a storage vessel, in which it can e.g. be mixed with further formulation components.

FIG. 2 shows that the thus obtained concentrated product mixture comprising the at least one (thio)phosphoric acid derivative (component (2a)), at least one solvent (component (2c)), and optionally at least one HCl scavenger (component (2d)), is preferably mixed with at least one high-boiling solvent (component (2b)) via a continuously operated mixer, for example a static mixer, to provide mixture (2), which is then introduced sequentially into two wiped film evaporators to recover mixture (1). The volatile components (2c) and (2d) may be condensed in one or two heat exchangers, and the condensed solvent may be recycled in the preparation process of the (thio)phosphoric acid derivative. The bottom product of the second wiped film evaporator is then fed into a storage vessel, in which it can e.g. be mixed with further formulation components.

As can be derived from FIGS. 1 and 2, according to one embodiment, the process of the invention comprises a step of adding the at least one high-boiling solvent (component (2d)) to a concentrated mixture comprising the at least one (thio)phosphoric acid derivative (component (2a)), at least one solvent (component (2c)), and optionally at least one HCl scavenger (component (2d)) to provide mixture (2) as defined herein. It is to be understood that this step is performed before the evaporation of components (2c) and (2d) to recover mixture (1).

However, in alternative embodiments as indicated above, the at least one high-boiling solvent may already be added to the reaction mixture when preparing the at least one (thio)phosphoric acid derivative (component (2a)), so that the concentrated reaction mixture comprising the at least one (thio)phosphoric acid derivative (component (2a)), at least one solvent (component (2c)), and optionally at least one HCl scavenger (component (2d)) already contains the at least one high-boiling solvent (component (2b)). It is emphasized that the at least one high-boiling solvent may be added either in the first or in the second reaction step of the preparation of the at least one (thio)phosphoric acid derivative as defined above.

The present invention also relates to a mixture (2) as defined herein, which comprises as components (2a) a product comprising at least one (thio)phosphoric acid derivative, which is selected from
(i)
(thio)phosphoric acid triamides according to general formula (I)

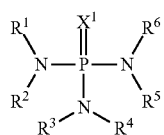
(I)

wherein
$X^1$ is O or S;
$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
$R^2$ is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or
$R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and
$R^3$, $R^4$, $R^5$, and $R^6$ are independently of each other selected from the group consisting of H and $C_1$-$C_4$-alkyl;
and
(ii)
(thio)phosphoric acid ester amides according to any one of general formula (IIa)

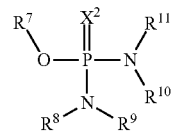
(IIa)

wherein
$X^2$ is O or S;
$R^7$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and
$R^8$, $R^9$, $R^{10}$, and $R^{11}$ are independently of each other selected from the group consisting of H and $C_1$-$C_4$-alkyl;
or general formula (IIb)

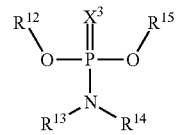
(IIb)

wherein
$X^3$ is O or S;
$R^{12}$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
$R^{15}$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and
$R^{13}$ and $R^{14}$ are independently of each other selected from the group consisting of H and $C_1$-$C_4$-alkyl;
(2b) at least one high-boiling solvent;
(2c) at least one solvent having a boiling point, which is at least 30° C. lower than the boiling point of the at least one high-boiling solvent of component (2b); and
(2d) optionally at least one HCl scavenger having a boiling point, which is at least 30° C. lower than the boiling point of the at least one high-boiling solvent of component (2b).

Preferences with regard to the individual components of mixture (2) have already been provided above.

In summary, the present invention relates to the following embodiments.

1. A process for separating or recovering
a mixture (1) comprising as components
(1a) a product comprising at least one (thio)phosphoric acid derivative, which is selected from
(i)
(thio)phosphoric acid triamides according to general formula (I)

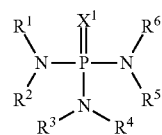
(I)

wherein

X$^1$ is O or S;

R$^1$ is C$_1$-C$_{20}$-alkyl, C$_3$-C$_{20}$-cycloalkyl, C$_6$-C$_{20}$-aryl, C$_6$-C$_{20}$-aryl-C$_1$-C$_4$-alkyl, or C$_1$-C$_6$-(di)alkylaminocarbonyl;

R$^2$ is H, C$_1$-C$_{20}$-alkyl, C$_3$-C$_{20}$-cycloalkyl, C$_6$-C$_{20}$-aryl, C$_6$-C$_2$O-aryl-C$_1$-C$_4$-alkyl, or C$_1$-C$_6$-(di)alkylaminocarbonyl; or R$^1$ and R$^2$ together with the nitrogen atom linking them define a 5- or 6-membered saturated or unsaturated heterocyclic radical, which optionally comprises 1 or 2 further heteroatoms selected from the group consisting of N, O, and S; and R$^3$, R$^4$, R$^5$, and R$^6$ are independently of each other selected from the group consisting of H and C$_1$-C$_4$-alkyl;

and (ii)

(thio)phosphoric acid ester amides according to any one of general formula (IIa)

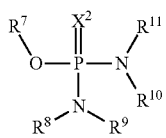

(IIa)

wherein

X$^2$ is O or S;

R$^7$ is C$_1$-C$_{20}$-alkyl, C$_3$-C$_{20}$-cycloalkyl, C$_6$-C$_{20}$-aryl, C$_6$-C$_{20}$-aryl-C$_1$-C$_4$-alkyl, or C$_1$-C$_6$-(di)alkylaminocarbonyl; and R$^8$, R$^9$, R$^{10}$, and R$^{11}$ are independently of each other selected from the group consisting of H and C$_1$-C$_4$-alkyl;

or general formula (IIb)

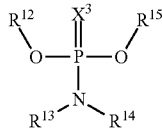

(IIb)

wherein

X$^3$ is O or S;

R$^{12}$ is C$_1$-C$_{20}$-alkyl, C$_3$-C$_{20}$-cycloalkyl, C$_6$-C$_{20}$-aryl, C$_6$-C$_{20}$-aryl-C$_1$-C$_4$-alkyl, or C$_1$-C$_6$-(di)alkylaminocarbonyl;

R$^{15}$ is C$_1$-C$_{20}$-alkyl, C$_3$-C$_{20}$-cycloalkyl, C$_6$-C$_{20}$-aryl, C$_6$-C$_{20}$-aryl-C$_1$-C$_4$-alkyl, or C$_1$-C$_6$-(di)alkylaminocarbonyl; and R$^{13}$ and R$^{14}$ are independently of each other selected from the group consisting of H and C$_1$-C$_4$-alkyl;

and (1b) at least one high-boiling solvent;

from a mixture (2) comprising as components (2a) component (1a) of mixture (1);

(2b) component (1b) of mixture (1);

(2c) at least one solvent having a boiling point, which is at least 30° C. lower than the boiling point of the at least one high-boiling solvent of component (1b) of mixture (1); and (2d) optionally at least one HCl scavenger having a boiling point, which is at least 30° C. lower than the boiling point of the at least one high-boiling solvent of component (1b) of mixture (1);

wherein the process comprises evaporating components (2c) and (2d) of mixture (2) and collecting mixture (1) as the bottom product.

2. The process of embodiment 1, wherein component (1a) of mixture (1) comprises at least one (thio)phosphoric acid derivative, which is selected from (i)

(thio)phosphoric acid triamides according to general formula (I)

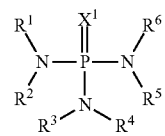

(I)

wherein

X$^1$ is O or S;

R$^1$ is C$_1$-C$_8$-alkyl, C$_5$-C$_6$-cycloalkyl, phenyl, or benzyl;

R$^2$ is H, or C$_1$-C$_4$-alkyl; and

R$^3$, R$^4$, R$^5$, and R$^6$ are each H;

and (ii)

(thio)phosphoric acid ester amides according to any one of general formula (IIa)

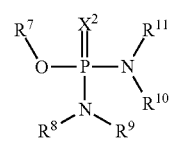

(IIa)

wherein

X$^2$ is O or S;

R$^7$ is C$_1$-C$_8$-alkyl, C$_5$-C$_6$-cycloalkyl, phenyl, or benzyl; and

R$^8$, R$^9$, R$^{10}$, and R$^{11}$ are each H;

or general formula (IIb)

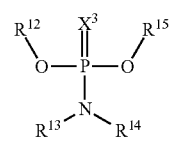

(IIb)

wherein

X$^3$ is O or S;

R$^{12}$ is C$_1$-C$_8$-alkyl, C$_5$-C$_6$-cycloalkyl, phenyl, or benzyl;

R$^{15}$ is C$_1$-C$_8$-alkyl, C$_5$-C$_6$-cycloalkyl, phenyl, or benzyl; and

R$^{13}$ and R$^{14}$ are each H.

3. The process of embodiment 1 or 2, wherein component (1a) of mixture (1) comprises at least one (thio)phosphoric acid derivative, which has a melting point of at least 40° C., preferably at least 50° C.

4. The process of any one of embodiments 1 to 3, wherein component (1a) of mixture (1) comprises at least one (thio)phosphoric acid derivative, which is selected from the group consisting of N-benzyl-N-methylthiophosphoric acid triamide, N,N-diethylthiophosphoric acid triamide, N-(n-butyl)thiophosphoric acid triamide, N-isopropylphosphoric acid triamide, N-(n-hexyl)thiophosphoric acid triamide, N-(sec-butyl)thiophosphoric acid triamide, N,N-diethylphosphoric acid triamide, N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide;

O-ethylphosphoric acid ester diamide, O-phenylthiophosphoric acid ester diamide, O,O-diphenylphosphoric acid diester amide, and O-phenylphosphoric acid ester diamide;

and which is preferably selected from the group consisting of

N,N-diethylthiophosphoric acid triamide, N-(n-butyl)thiophosphoric acid triamide, N-isopropylphosphoric acid triamide, N-(n-hexyl)thiophosphoric acid triamide, N-(sec-butyl)thiophosphoric acid triamide, N,N-diethylphosphoric acid triamide, N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide;

O-ethylphosphoric acid ester diamide, O-phenylthiophosphoric acid ester diamide, O,O-diphenylphosphoric acid diester amide, and O-phenylphosphoric acid ester diamide.

5. The process of any one of embodiments 1 to 4, wherein component (1a) of mixture (1) comprises N-(n-butyl)thiophosphoric acid triamide, N-(n-propyl)thiophosphoric acid triamide, or the combination thereof, preferably the combination of N-(n-butyl)thiophosphoric acid triamide and N-(n-propyl)thiophosphoric acid triamide.

6. The process of any one of embodiments 1 to 5, wherein component (1a) of mixture (1) comprises at least one (thio)phosphoric acid derivative, which has a melting point of at least 60° C., preferably at least 80° C., more preferably at least 85° C.

7. The process of any one of embodiments 1 to 4 or 6, wherein component (1a) of mixture (1) comprises at least one (thio)phosphoric acid derivative, which is selected from the group consisting of N-isopropylphosphoric acid triamide, N-(n-hexyl)thiophosphoric acid triamide, N-(sec-butyl)thiophosphoric acid triamide, N,N-diethylphosphoric acid triamide, N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide;

O-ethylphosphoric acid ester diamide, O-phenylthiophosphoric acid ester diamide, O,O-diphenylphosphoric acid diester amide, and O-phenylphosphoric acid ester diamide;

and which is preferably selected from the group consisting of

N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide;

O-ethylphosphoric acid ester diamide, O-phenylthiophosphoric acid ester diamide, O,O-diphenylphosphoric acid diester amide, and O-phenylphosphoric acid ester diamide.

8. The process of any one of embodiments 1 to 7, wherein component (1a) of mixture (1) comprises N-(n-propyl)thiophosphoric acid triamide, and wherein mixture (1) preferably does not comprise N-(n-butyl)thiophosphoric acid triamide.

9. The process of any one of embodiments 1 to 8, wherein the at least one high-boiling solvent of component (1b) of mixture (1) has a boiling point of at least 130° C., preferably at least 160° C., more preferably at least 190° C., most preferably at least 220° C., particularly preferably at least 250° C.

10. The process of any one of embodiments 1 to 9, wherein the at least one high-boiling solvent of component (1b) of mixture (1) is a polar protic or a polar aprotic high-boiling solvent.

11. The process of any one of embodiments 1 to 10, wherein the at least one high-boiling solvent of component (1b) of mixture (1) is selected from the group consisting of
(i) polyamines;
(ii) alcohols;
(iii) glycol ethers;
(iv) glycol thioethers;
(v) amino alcohols;
(vi) ether amines;
(vii) amines;
(viii) carboxylic acid amides;
(ix) carboxylic acid esters;
(x) ketones;
(xi) carbonate esters and ureas; and
(xii) sulfoxides.

12. The process of any one of embodiments 1 to 11, wherein the at least one high-boiling solvent of component (1b) of mixture (1) is selected from the group consisting of polyethylene imine, $C_5$-$C_{20}$-alkyl acetates, propylene glycol, diethylene glycol, glycerin, triethyleneglycol-n-butylether, thiodiglycol, diethanolisopropanolamine, N,N,N'-trimethylaminoethylethanolamine, N,N,N',N'-tetrakis(2-hydroxypropyl)ethylenediamine, dimorpholinodiethylether, bis(2-dimethylaminoethyl)ether, N-acetyl morpholine, N,N,N',N'-tetramethyl-1,6-hexanediamine, N,N,N',N'-tetramethyl-1,3-propanediamine, N,N',N''-tris(dimethylaminopropyl)hexahydrotriazine, triethylendiamine (DABCO), N,N-dimethylbutyramide, N-formyl pyrrolidone, N-methyl pyrrolidone, dimethyl-2-methylpentandioate, 2-ethylhexyl lactate, dimethylsulfoxide, benzyl alcohol, cyclohexanone, propylene carbonate, N,N-dimethyl octanamide, N,N-dimethyl decanamide, 2-ethylhexanol, N,N-dimethylethylene urea, methyl oleate, tocopherol acetate, N,N-dimethyllauric amide, N,N-dimethylmyristic amide, N-[2-(acetyloxy)

ethyl]-N-methyl acetamide, methyl caprylate, methyl laurate, methyl palmitate, capric/caprylic triglyceride, N,N-dimethyl lactamide, triethanolamine, 1,1',1'',1'''-ethylenedinitrilotetrapropan-2-ol, N,N,N',N',N'',N''-hexamethyl-1,3,5-triazin-1,3,5(2H,4H,6H)-tripropanamin, 2-propylheptan-1-ol, n-acetylmorpholine, n-formylmorpholine, dimethyl succinate, di(2-ethylhexyl) adipate, and diethyl phthalate.

13. The process of any one of embodiments 1 to 12, wherein the at least one high-boiling solvent of component (1b) of mixture (1) is an amino alcohol, preferably diethanolisopropanolamine or triethanolamine; or propylene glycol; or dimethylsulfoxide;

and wherein preferably the at least one high-boiling solvent of component (1b) of mixture (1) is triethanolamine.

14. The process of any one of embodiments 1 to 12, wherein the at least one high-boiling solvent of component (1b) of mixture (1) is a polyalkyleneimine, preferably polyethyleneimine.

15. The process of any one of embodiments 1 to 12, wherein the at least one high-boiling solvent of component (1b) of mixture (1) is a $C_5$-$C_{20}$-alkylacetate, preferably a $C_6$-$C_{20}$-alkylacetate, more preferably a $C_7$-$C_{20}$-alkylacetate.

16. The process of any one of embodiments 1 to 12, wherein the at least one high-boiling solvent of component (1b) of mixture (1) is a solvent, which does not comprise a hydroxyl or primary amino group, and is preferably a tertiary amine or an ether amine or a tertiary lactam.

17. The process of any one of the embodiments 1 to 16, wherein components (1a) and (1b) of mixture (1) are together present in an amount of at least 75 wt.-%, preferably at least 85 wt. %, more preferably at least 90 wt.-%, most preferably at least 95 wt.-%, based on the total weight of mixture (1).

18. The process of any one of embodiments 1 to 17, wherein components (1a) and (1b) of mixture (1) are present in a weight ratio of from 90:10 to 10:90, preferably 90:10 to 30:70, more preferably 80:20 to 40:60, most preferably from 70:30 to 40:60.

19. The process of any one of embodiments 1 to 18, wherein the at least one solvent of component (2c) of mixture (2) has a boiling point of at most 130° C., preferably at most 100° C., more preferably at most 85° C.

20. The process of any one of embodiments 1 to 19, wherein the at least one solvent of component (2c) of mixture (2) has a boiling point, which is at least 40° C., preferably at least 50° C., more preferably at least 60° C., most preferably at least 80° C., lower than the boiling point of the at least one high-boiling solvent of component (1b) of mixture (1).

21. The process of any one of embodiments 1 to 20, wherein the at least one solvent of component (2c) of mixture (2) is an aprotic solvent, preferably a polar aprotic solvent.

22. The process of any one of embodiments 1 to 21, wherein the at least one solvent of component (2c) of mixture (2) is an ether or a carboxylic acid ester, preferably a cyclic ether or an acyclic carboxylic acid ester, more preferably tetrahydrofuran, 2-methyltetrahydrofuran, or ethyl acetate.

23. The process of any one of embodiments 1 to 22, wherein the at least one HCl scavenger of component (2d) of mixture (2) has a boiling point of at most 180° C., preferably at most 160° C.

24. The process of any one of embodiments 1 to 23, wherein the at least one HCl scavenger of component (2d) of mixture (2) has a boiling point, which is at least 40° C., preferably at least 50° C., more preferably at least 60° C., most preferably at least 80° C., lower than the boiling point of the at least one high-boiling solvent of component (1b) of mixture (1).

25. The process of any one of embodiments 1 to 24, wherein the at least one HCl scavenger of component (2d) of mixture (2) is a tertiary amine, preferably triethylamine or tri-n-propylamine, more preferably tri-n-propylamine.

26. The process of any one of embodiments 1 to 25, wherein components (2a), (2b), (2c), and (2d) of mixture (2) are together present in an amount of at least 95 wt.-%, preferably at least 97 wt.-%, more preferably at least 98 wt.-%, most preferably at least 99 wt.-%, based on the total weight of mixture (2).

27. The process of any one of the embodiments 1 to 26, wherein the process comprising evaporating components (2c) and (2d) of mixture (2) and collecting mixture (1) as the bottom product is performed by:

(i) continuously introducing a stream of the mixture (2) into at least one thin film evaporator operating at a temperature of from 40° C. to 160° C. and at a pressure of from 5 mbar to 300 mbar (0.5 kPa to 30 kPa), and (ii) continuously collecting the bottom product.

28. The process of embodiment 27, wherein the at least one thin film evaporator is operated at a temperature in the range of from 50° C. to 110° C. and at a pressure of from 5 mbar to 250 mbar (2 kPa to 10 kPa).

29. A mixture (2), which comprises as components (2a) a product comprising at least one (thio)phosphoric acid derivative, which is selected from (i)

(thio)phosphoric acid triamides according to general formula (I)

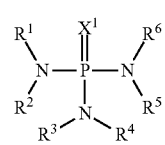

wherein $X^1$ is O or S;

$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;

$R^2$ is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or $R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and $R^3$, $R^4$, $R^5$, and $R^6$ are independently of each other selected from the group consisting of H and $C_1$-$C_4$-alkyl;

and (ii)

(thio)phosphoric acid ester amides according to any one of general formula (IIa)

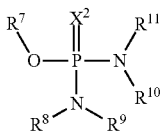

(IIa)

wherein
X² is O or S;
R⁷ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and
R⁸, R⁹, R¹⁰, and R¹¹ are independently of each other selected from the group consisting of H and $C_1$-$C_4$-alkyl;
or general formula (IIb)

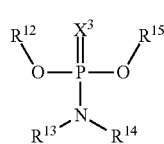

(IIb)

wherein
X³ is O or S;
R¹² is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
R¹⁵ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and
R¹³ and R¹⁴ are independently of each other selected from the group consisting of H and $C_1$-$C_4$-alkyl;
(2b) at least one high-boiling solvent;
(2c) at least one solvent having a boiling point, which is at least 30° C. lower than the boiling point of the at least one high-boiling solvent of component (2b); and
(2d) optionally at least one HCl scavenger having a boiling point, which is at least 30° C. lower than the boiling point of the at least one high-boiling solvent of component (2b).

30. The mixture of embodiment 29, wherein component (2a) comprises at least one (thio)phosphoric acid derivative, which is selected from
(i)
(thio)phosphoric acid triamides according to general formula (I)

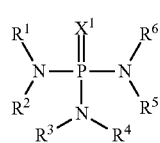

(I)

wherein
X¹ is O or S;
R¹ is $C_1$-$C_8$-alkyl, $C_5$-$C_6$-cycloalkyl, phenyl, or benzyl;
R² is H, or $C_1$-$C_4$-alkyl; and
R³, R⁴, R⁵, and R⁶ are each H;

and
(ii)
(thio)phosphoric acid ester amides according to any one of general formula (IIa)

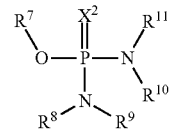

(IIa)

wherein
X² is O or S;
R⁷ is $C_1$-$C_8$-alkyl, $C_5$-$C_6$-cycloalkyl, phenyl, or benzyl; and
R⁸, R⁹, R¹⁰, and R¹¹ are each H;
or general formula (IIb)

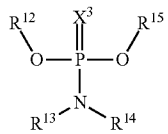

(IIb)

wherein
X³ is O or S;
R¹² is $C_1$-$C_8$-alkyl, $C_5$-$C_6$-cycloalkyl, phenyl, or benzyl;
R¹⁵ is $C_1$-$C_8$-alkyl, $C_5$-$C_6$-cycloalkyl, phenyl, or benzyl; and
R¹³ and R¹⁴ are each H.

31. The mixture of embodiment 29 or 30, wherein component (2a) comprises at least one (thio)phosphoric acid derivative, which has a melting point of at least 40° C., preferably at least 50° C.

32. The mixture of any one of embodiments 29 to 31, wherein component (2a) comprises at least one (thio)phosphoric acid derivative, which is selected from the group consisting of
N-benzyl-N-methylthiophosphoric acid triamide, N,N-diethylthiophosphoric acid triamide, N-(n-butyl)thiophosphoric acid triamide, N-isopropylphosphoric acid triamide, N-(n-hexyl)thiophosphoric acid triamide, N-(sec-butyl)thiophosphoric acid triamide, N,N-diethylphosphoric acid triamide, N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide;
O-ethylphosphoric acid ester diamide, O-phenylthiophosphoric acid ester diamide, O,O-diphenylphosphoric acid diester amide, and O-phenylphosphoric acid ester diamide;
and which is preferably selected from the group consisting of
N,N-diethylthiophosphoric acid triamide, N-(n-butyl) thiophosphoric acid triamide, N-isopropylphosphoric acid triamide, N-(n-hexyl)thiophosphoric acid triamide, N-(sec-butyl)thiophosphoric acid triamide, N,N-diethylphosphoric acid triamide, N-(n-propyl)

thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide;

O-ethylphosphoric acid ester diamide, O-phenylthiophosphoric acid ester diamide, O,O-diphenylphosphoric acid diester amide, and O-phenylphosphoric acid ester diamide.

33. The mixture of any one of embodiments 29 to 32, wherein component (2a) comprises N-(n-butyl)thiophosphoric acid triamide, N-(n-propyl)thiophosphoric acid triamide, or the combination thereof, preferably the combination of N-(n-butyl)thiophosphoric acid triamide and N-(n-propyl)thiophosphoric acid triamide.

34. The mixture of any one of embodiments 29 to 33, wherein component (2a) comprises at least one (thio)phosphoric acid derivative, which has a melting point of at least 60° C., preferably at least 80° C., more preferably at least 85° C.

35. The mixture of any one of embodiments 29 to 32 or 34, wherein component (2a) of mixture (1) comprises at least one (thio)phosphoric acid derivative, which is selected from the group consisting of N-isopropylphosphoric acid triamide, N-(n-hexyl)thiophosphoric acid triamide, N-(sec-butyl)thiophosphoric acid triamide, N,N-diethylphosphoric acid triamide, N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide;

O-ethylphosphoric acid ester diamide, O-phenylthiophosphoric acid ester diamide, O,O-diphenylphosphoric acid diester amide, and O-phenylphosphoric acid ester diamide;

and which is preferably selected from the group consisting of

N-(n-propyl)thiophosphoric acid triamide, N,N-diisopropylthiophosphoric acid triamide, N,N-dimethylthiophosphoric acid triamide, N-(n-octyl)phosphoric acid triamide, N-(n-butyl)phosphoric acid triamide, N-cyclohexylphosphoric acid triamide, N-benzyl-N-methylphosphoric acid triamide, N,N-dimethylphosphoric acid triamide, N-cyclohexylthiophosphoric acid triamide;

O-ethylphosphoric acid ester diamide, O-phenylthiophosphoric acid ester diamide, O,O-diphenylphosphoric acid diester amide, and O-phenylphosphoric acid ester diamide.

36. The mixture of any one of embodiments 29 to 35, wherein component (2a) comprises N-(n-propyl)thiophosphoric acid triamide, and wherein mixture (2) preferably does not comprise N-(n-butyl)thiophosphoric acid triamide.

37. The mixture of any one of embodiments 29 to 36, wherein the at least one high-boiling solvent of component (2b) has a boiling point of at least 130° C., preferably at least 160° C., more preferably at least 190° C., most preferably at least 220° C., particularly preferably at least 250° C.

38. The mixture of any one of embodiments 29 to 37, wherein the at least one high-boiling solvent of component (2b) is a polar protic or a polar aprotic high-boiling solvent.

39. The mixture of any one of embodiments 29 to 38, wherein the at least one high-boiling solvent of component (2b) is selected from the group consisting of
(i) polyamines;
(ii) alcohols;
(iii) glycol ethers;
(iv) glycol thioethers;
(v) amino alcohols;
(vi) ether amines;
(vii) amines;
(viii) carboxylic acid amides;
(ix) carboxylic acid esters;
(x) ketones;
(xi) carbonate esters and ureas; and
(xii) sulfoxides.

40. The mixture of any one of embodiments 29 to 39, wherein the at least one high-boiling solvent of component (2b) is selected from the group consisting of polyethylene imine, $C_5$-$C_{20}$-alkyl acetates, propylene glycol, diethylene glycol, glycerin, triethyleneglycol-n-butylether, thiodiglycol, diethanolisopropanolamine, N,N,N'-trimethylaminoethylethanolamine, N,N,N',N'-tetrakis(2-hydroxypropyl) ethylenediamine, dimorpholinodiethylether, bis(2-dimethylaminoethyl)ether, N-acetyl morpholine, N,N,N',N'-tetramethyl-1,6-hexanediamine, N,N,N',N'-tetramethyl-1,3-propanediamine, N,N',N''-tris(dimethylaminopropyl) hexahydrotriazine, triethylendiamine (DABCO), N,N-dimethylbutyramide, N-formyl pyrrolidone, N-methyl pyrrolidone, dimethyl-2-methylpentandioate, 2-ethylhexyl lactate, dimethylsulfoxide, benzyl alcohol, cyclohexanone, propylene carbonate, N,N-dimethyl octanamide, N,N-dimethyl decanamide, 2-ethylhexanol, N,N-dimethylethylene urea, methyl oleate, tocopherol acetate, N,N-dimethyllauric amide, N,N-dimethylmyristic amide, N-[2-(acetyloxy) ethyl]-N-methyl acetamide, methyl caprylate, methyl laurate, methyl palmitate, capric/caprylic triglyceride, N,N-dimethyl lactamide, triethanolamine, 1,1',1'',1'''-ethylenedinitrilotetrapropan-2-ol, N,N,N',N',N'',N''-hexamethyl-1,3,5-triazin-1,3,5(2H,4H,6H)tripropanamin, 2-propylheptan-1-ol, n-acetylmorpholine, n-formylmorpholine, dimethyl succinate, di(2-ethylhexyl) adipate, and diethyl phthalate.

41. The mixture of any one of embodiments 29 to 40, wherein the at least one high-boiling solvent of component (2b) is
an amino alcohol, preferably diethanolisopropanolamine or triethanolamine; or
propylene glycol; or
dimethylsulfoxide;
and wherein preferably the at least one high-boiling solvent of component (1b) of mixture (1) is triethanolamine.

42. The mixture of any one of embodiments 29 to 40, wherein the at least one high-boiling solvent of component (2b) is a polyalkyleneimine, preferably polyethyleneimine.

43. The mixture of any one of embodiments 29 to 40, wherein the at least one high-boiling solvent of component (2b) is a $C_5$-$C_{20}$-alkylacetate, preferably a $C_6$-$C_{20}$-alkylacetate, more preferably a $C_7$-$C_{20}$-alkylacetate.

44. The mixture of any one of embodiments 29 to 40, wherein the at least one high-boiling solvent of component (2b) is a solvent, which does not comprise a hydroxyl or primary amino group, and is preferably a tertiary amine or an ether amine or a tertiary lactam.

45. The mixture of any one of embodiments 29 to 44, wherein components (2a) and (2b) of mixture (2) are present in a weight ratio of from 90:10 to 10:90, preferably 90:10 to 30:70, more preferably 80:20 to 40:60, most preferably from 70:30 to 40:60.

46. The mixture of any one of embodiments 29 to 45, wherein the at least one solvent of component (2c) has a boiling point of at most 130° C., preferably at most 100° C., more preferably at most 85° C.

47. The mixture of any one of embodiments 29 to 46, wherein the at least one solvent of component (2c) has a boiling point, which is at least 40° C., preferably at least 50° C., more preferably at least 60° C., most preferably at least 80° C., lower than the boiling point of the at least one high-boiling solvent of component (2b).

48. The mixture of any one of embodiments 29 to 47, wherein the at least one solvent of component (2c) is an aprotic solvent, preferably a polar aprotic solvent.

49. The mixture of any one of embodiments 29 to 48, wherein the at least one solvent of component (2c) is an ether or a carboxylic acid ester, preferably a cyclic ether or an acyclic carboxylic acid ester, more preferably tetrahydrofuran, 2-methyltetrahydrofuran, or ethyl acetate.

50. The mixture of any one of embodiments 29 to 49, wherein the at least one HCl scavenger of component (2d) has a boiling point of at most 180° C., preferably at most 160° C.

51. The mixture of any one of embodiments 29 to 50, wherein the at least one HCl scavenger of component (2d) has a boiling point, which is at least 40° C., preferably at least 50° C., more preferably at least 60° C., most preferably at least 80° C., lower than the boiling point of the at least one high-boiling solvent of component (1b) of mixture (1).

52. The mixture of any one of embodiments 29 to 51, wherein the at least one HCl scavenger of component (2d) is a tertiary amine, preferably triethylamine or tri-n-propylamine, more preferably tri-n-propylamine.

53. The mixture of any one of embodiments 29 to 52, wherein components (2a), (2b), (2c), and (2d) of mixture (2) are together present in an amount of at least 95 wt.-%, preferably at least 97 wt.-%, more preferably at least 98 wt.-%, most preferably at least 99 wt.-%, based on the total weight of mixture (2).

54. Use of at least one high-boiling solvent in a mixture comprising at least one (thio)phosphoric acid derivative and at least one volatile component for preventing decomposition or solids formation of the at least one (thio)phosphoric acid derivative in an evaporation process, wherein in said evaporation process the at least one (thio)phosphoric acid derivative is separated from the at least one volatile component and recovered as the bottom product in the form of a mixture (1) comprising as components
  (1a) the at least one (thio)phosphoric acid derivative; and
  (1b) the at least one high-boiling solvent.

55. The use according to embodiment 54, wherein the at least one volatile component comprises at least one solvent having a boiling point, which is at least 30° C. lower than the boiling point of the at least one high-boiling solvent, and optionally at least one HCl scavenger having a boiling point, which is at least 30° C. lower than the boiling point of the at least one high-boiling solvent.

56. The use according to embodiment 55, wherein by using the at least one high-boiling solvent in a mixture comprising at least one (thio)phosphoric acid derivative and at least one volatile component, a mixture (2) is formed, which comprises
  (2a) at least one (thio)phosphoric acid derivative;
  (2b) at least one high-boiling solvent;
  (2c) at least one solvent having a boiling point, which is at least 30° C. lower than the boiling point of the at least one high-boiling solvent; and
  (2d) optionally at least one HCl scavenger having a boiling point, which is at least 30° C. lower than the boiling point of the at least one high-boiling solvent,
  and from this mixture (2) mixture (1) is then recovered in said evaporation process.

57. The use according to embodiment 54, 55, or 56, wherein the at least one high-boiling solvent is further used as a formulation agent for the at least one (thio)phosphoric acid derivative in the recovered mixture (1).

58. A process for recovering at least one (thio)phosphoric acid derivative from a mixture comprising the at least one (thio)phosphoric acid derivative, at least one solvent and optionally at least one HCl scavenger, wherein the process comprises
  adding at least one high-boiling solvent to the mixture so as to form a mixture (2) comprising as components
  (2a) at least one (thio)phosphoric acid derivative;
  (2b) at least one high-boiling solvent;
  (2c) at least one solvent having a boiling point, which is at least 30° C. lower than the boiling point of the at least one high-boiling solvent; and
  (2d) optionally at least one HCl scavenger having a boiling point, which is at least 30° C. lower than the boiling point of the at least one high-boiling solvent;
  and separating a mixture (1) from said mixture (2), wherein said mixture (1) comprises as components
  (1a) the at least one (thio)phosphoric acid derivative; and
  (1b) the at least one high-boiling solvent;
  by evaporating components (2c) and (2d) of mixture (2) and collecting mixture (1) as the bottom product.

59. The process according to embodiment 58, wherein evaporating components (2c) and (2d) of mixture (2) and collecting mixture (1) as the bottom product is performed by:
  (i) continuously introducing a stream of the mixture (2) into at least one thin film evaporator operating at a temperature of from 40° C. to 160° C. and at a pressure of from 5 mbar to 300 mbar (0.5 kPa to 30 kPa), and
  (ii) continuously collecting the bottom product,
  wherein preferably the at least one thin film evaporator is operated at a temperature in the range of from 50° C. to 110° C. and at a pressure of from 5 mbar to 250 mbar (0.5 kPa to 25 kPa).

60. The process according to embodiment 58 or 59, wherein mixture (2) and mixture (1) as well as its components are defined as in any one of embodiments 2 to 26.

61. The process according to any one of embodiments 1 to 28 or the process according to any one of embodiments 58 to 60, wherein the at least one high-boiling solvent is further used as a formulation agent for the at least one (thio)phosphoric acid derivative in the recovered mixture (1).

62. The mixture according to any one of embodiments 29 to 53, wherein the at least one high-boiling solvent is further used as a formulation agent for the at least one (thio)phosphoric acid derivative in the recovered mixture (1).

The present invention is further illustrated by the following examples.

EXAMPLES

Example 1: Preparation of NPPT (Raw Product)

169.4 g (1 mol) $PSCl_3$ and 333.3 g ethyl acetate were precharged at room temperature into a reaction flask and cooled to 0° C. The mixture of 59.7 g (1.01 mol) n-propylamine and 157.6 g (1.1 mol) tri-n-propylamine was added within 90 min. During the addition, the temperature was maintained between 0-2° C. by cooling. The suspension was stirred at 0° C. for additional 60 min and afterwards heated up to 40° C.

The prepared solution was added within 3 hours parallel to 102.2 g (6 mol) gaseous ammonia (via dip pipe) to 333.3 g ethyl acetate, which was cooled to 6° C. in advance. The temperature was maintained during the addition between 5-7° C.

The resulting suspension was heated up to 50° C. and filtered at this temperature. The filter cake was washed two times with 200 g ethyl acetate at 50° C.

After combining the washing solution and the filtrate the light boiler ethyl acetate was distilled off in a thin-film evaporator at 80° C. and 240 mbar. The resulting raw product contained 21% N-propyl thiophosphoryl triamide (NPPT).

Comparative Example 1

From the raw product obtained according to Example 1, tri-n-propylamine and remaining ethyl acetate were distilled off in a thin-film evaporator at 100° C. and 50 mbar. The raw product was carefully heated to 95° C. slightly above the melting temperature of NPPT for feeding the thin-film evaporator without solid content. At this temperature, the formation of $H_2S$ and a color change of the raw product solution was observed after a short time indicating a decomposition of the NPPT, and no NPPT could be obtained as isolated bottom product.

Comparative Example 2

From the raw product prepared according to Example 1, tri-n-propylamine and remaining ethyl acetate were removed by applying 1 mbar and 40° C. in a rotary evaporator and a solid product was obtained containing 83% of NPPT.

However, 1 mbar is not suitable for technical scale. Therefore, it was tested whether the addition of a high-boiling solvent would be suitable for preventing decomposition of NPPT in an evaporation process at higher temperatures.

Example 2

After recrystallization of the product obtained in Comparative Example 2 in ethyl acetate, the product was mixed with dimethyl sulfoxide to give a 47% NPPT solution, which was heated to 100° C. After keeping the solution for 3 hours at this temperature, no visible signs of NPPT decomposition were observed and the NPPT content was measured to be 47%.

A mixture comprising NPPT and dimethyl sulfoxide may therefore be used in an evaporation process operating at about 100° C. without decomposition of NPPT.

The product containing NPPT and dimethyl sulfoxide that will be recovered as a bottom product after an evaporation process is suitable for handling or storage or for being combined with further formulation auxiliaries to provide a suitable formulation of NPPT for treating urea-based fertilizers.

Example 3

After recrystallization of the product obtained in Comparative Example 2 in ethyl acetate, the product was mixed with propylene glycol to give a 47% NPPT solution, which was heated to 100° C. After keeping the solution for 3 hours at this temperature, no visible signs of NPPT decomposition were observed and the NPPT content was measured to be 47%.

A mixture comprising NPPT and propylene glycol may therefore be used in an evaporation process operating at about 100° C. without decomposition of NPPT.

The product containing NPPT and propylene glycol that will be recovered as a bottom product after an evaporation process is suitable for handling or storage or for being combined with further formulation auxiliaries to provide a suitable formulation of NPPT for treating urea-based fertilizers.

Example 4

After recrystallization of the product obtained in Comparative Example 2 in ethyl acetate, the product was mixed with polyethyleneimine (commercially available under the trade name Agnique® formerly known as Lupasol® from BASF SE) to give a 47% NPPT solution, which was heated to 100° C. After keeping the solution for 3 hours at this temperature no visible signs of NPPT decomposition were observed and the NPPT content was measured to be 47%.

A mixture comprising NPPT and polyethyleneimine may therefore be used in an evaporation process operating at about 100° C. without decomposition of NPPT.

The product containing NPPT and polyethyleneimine that will be recovered as a bottom product after an evaporation process is suitable for handling or storage or for being combined with further formulation auxiliaries to provide a suitable formulation of NPPT for treating urea-based fertilizers.

The polyethyleneimine used in the Example 4 and in the Example 6 is a polyethyleneimine with a weight average molecular weight of 800 g/mol as measured by GPC (dry substance, at pH 4.5).

Example 5

After recrystallization of the product obtained in Comparative Example 2 in ethyl acetate, the product was mixed with triethanolamine to give a 47% NPPT solution, which was heated to 100° C. After keeping the solution for 3 hours at this temperature no visible signs of NPPT decomposition were observed and the NPPT content was measured to be 47%.

A mixture comprising NPPT and triethanolamine may therefore be used in an evaporation process operating at about 100° C. without decomposition of NPPT.

The product containing NPPT and triethanolamine that will be recovered as a bottom product after an evaporation process is suitable for handling or storage or for being combined with further formulation auxiliaries to provide a suitable formulation of NPPT for treating urea-based fertilizers.

Example 6

315.2 g of raw product obtained according to Example 1 was mixed with 140.6 g of polyethyleneimine (commercially available under the trade name Agnique® formerly known as Lupasol® from BASF SE) and the mixture carefully heated to 95° C. Tri-n-propylamine and remaining ethyl acetate contained within the raw product were distilled off in a thin-film evaporator at 90-100° C. and 80-90 mbar.

No visible signs of NPPT decomposition were observed, and 298 g of product containing 48% NPPT and 47% polyethylene imine collected as the bottom product at the sump of the thin-film evaporator. The purity of NPPT in the resulting product (without consideration of polyethyleneimine) is about 91%.

The product containing NPPT and polyethyleneimine is suitable for handling or storage or for being combined with further formulation auxiliaries to provide a suitable formulation of NPPT for treating urea-based fertilizers.

The invention claimed is:

1. A method of using at least one high-boiling solvent having a boiling point of at least 130° C., in a mixture comprising at least one (thio)phosphoric acid derivative and at least one volatile component, for preventing decomposition or solids formation of the at least one (thio)phosphoric acid derivative in an evaporation process, wherein said evaporation process comprises:

separating the at least one (thio)phosphoric acid derivative from the at least one volatile component, wherein the at least one volatile component is selected from the group consisting of liquid paraffinic, cycloparaffinic, and/or aromatic hydrocarbons, liquid halocarbons and halohydrocarbons, ethers, and esters; and recovering as a bottom product a first mixture (1) comprising components:

(1a) the at least one (thio)phosphoric acid derivative; and (1b) the at least one high-boiling solvent, wherein the at least one (thio)phosphoric acid derivative is selected from the group consisting of: (thio)phosphoric acid triamides according to general formula (I) and (thio)phosphoric acid ester amides according to general formula (IIa) or (IIb);

wherein general formula (I) is

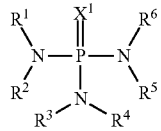

(I)

wherein
$X^1$ is O or S;
$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
$R^2$ is H, $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or
$R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and
$R^3$, $R^4$, $R^5$, and $R^6$ are independently of each other selected from the group consisting of H and $C_1$-$C_4$-alkyl;

and wherein general formula (IIa) is

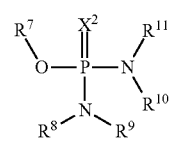

(IIa)

wherein
$X^2$ is O or S;
$R^7$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and
$R^8$, $R^9$, $R^{10}$, and $R^{11}$ are independently of each other selected from the group consisting of H and $C_1$-$C_4$-alkyl;
and wherein general formula (IIb) is

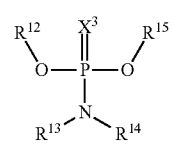

(IIb)

wherein
$X^3$ is O or S;
$R^{12}$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
$R^{15}$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and
$R^{13}$ and $R^{14}$ are independently of each other selected from the group consisting of H and $C_1$-$C_4$-alkyl, and
wherein the at least one high-boiling solvent is hydrophilic.

2. The method according to claim 1, wherein the at least one volatile component comprises at least one solvent having a boiling point of at least 30° C. lower than the boiling point of the at least one high-boiling solvent.

3. The method according to claim 1, wherein the at least one high-boiling solvent is further used as a formulation agent for the at least one (thio)phosphoric acid derivative in the recovered first mixture (1).

4. A process for recovering at least one (thio)phosphoric acid derivative from a first mixture comprising the at least one (thio)phosphoric acid derivative and at least one solvent, wherein the process comprises:

adding at least one high-boiling solvent having a boiling point of at least 130° C. to the first mixture so as to form a second mixture (2) comprising components:

(2a) the at least one (thio)phosphoric acid derivative;

(2b) the at least one high-boiling solvent; and (2c) the at least one solvent, the at least one solvent having a boiling point that is at least 30° C. lower than the boiling point of the at least one high-boiling solvent to be and is selected from liquid paraffinic, cycloparaffinic, and/or aromatic hydrocarbons, liquid halocarbons and halohydrocarbons, ethers, and esters; and and separating a third mixture (1) from said second mixture (2), wherein said third mixture (1) comprises components:

(1a) the at least one (thio)phosphoric acid derivative; and (1b) the at least one high-boiling solvent;

by evaporating the at least one solvent component (2c) of the second mixture (2) and collecting the third mixture (1) as a bottom product, wherein the at least one (thio)phosphoric acid derivative is selected from the group consisting of: (thio)phosphoric acid triamides according to general formula (I) and (thio)phosphoric acid ester amides according to general formula (IIa) or (IIb);

wherein general formula (I) is

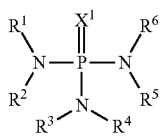

(I)

wherein
$X^1$ is O or S;
$R^1$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
$R^2$ is H, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; or
$R^1$ and $R^2$ together with the nitrogen atom linking them define a 5- or 6-membered saturated or unsaturated heterocyclic radical, which optionally comprises 1 or 2 further heteroatoms selected from the group consisting of N, O, and S; and
$R^3$, $R^4$, $R^5$, and $R^6$ are independently of each other selected from the group consisting of H and $C_1$-$C_4$-alkyl;

and wherein general formula (IIa) is

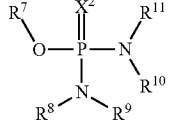

(IIa)

wherein
$X^2$ is O or S;
$R^7$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and
$R^8$, $R^9$, $R^{10}$, and $R^{11}$ are independently of each other selected from the group consisting of H and $C_1$-$C_4$-alkyl;

and wherein general formula (IIb) is

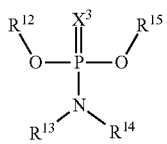

(IIb)

wherein
$X^3$ is O or S;
$R^{12}$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl;
$R^{15}$ is $C_1$-$C_{20}$-alkyl, $C_3$-$C_{20}$-cycloalkyl, $C_6$-$C_{20}$-aryl, $C_6$-$C_{20}$-aryl-$C_1$-$C_4$-alkyl, or $C_1$-$C_6$-(di)alkylaminocarbonyl; and
$R^{13}$ and $R^{14}$ are independently of each other selected from the group consisting of H and $C_1$-$C_4$-alkyl, and
wherein the at least one high-boiling solvent is hydrophilic.

5. The process according to claim 4, wherein
evaporating the at least one solvent component (2c) of the second mixture (2) and collecting the third mixture (1) as the bottom product is performed by:
(i) continuously introducing a stream of the second mixture (2) into at least one thin film evaporator operating at a temperature of from 40° C. to 160° C. and at a pressure of from 5 mbar to 300 mbar (0.5 kPa to 30 kPa); and
(ii) continuously collecting the bottom product.

6. The process according to claim 4, wherein the first mixture further comprises at least one HCl scavenger having a boiling point of at least 30° C. lower than the boiling point of the at least one high-boiling solvent.

* * * * *